US012368497B2

(12) United States Patent
Rofougaran et al.

(10) Patent No.: US 12,368,497 B2
(45) Date of Patent: Jul. 22, 2025

(54) REPEATER DEVICE FOR 5G NEW RADIO COMMUNICATION

(71) Applicant: Movandi Corporation, Irvine, CA (US)

(72) Inventors: Ahmadreza Rofougaran, Newport Beach, CA (US); Brima Ibrahim, Laguna Hills, CA (US); Raghu Mulagada, Irvine, CA (US); Walid Nabhane, Long Valley, NJ (US); Mohsen Pourkhaatoun, Irvine, CA (US); Wan-Jong Kim, Tustin, CA (US); Maryam Rofougaran, Rancho Palos Verdes, CA (US); Sam Gharavi, Irvine, CA (US)

(73) Assignee: Movandi Corporation, Irvine, CA (US)

(*) Notice: Subject to any disclaimer, the term of this patent is extended or adjusted under 35 U.S.C. 154(b) by 0 days.

(21) Appl. No.: 17/011,042

(22) Filed: Sep. 3, 2020

(65) Prior Publication Data

US 2020/0403689 A1 Dec. 24, 2020

Related U.S. Application Data

(63) Continuation-in-part of application No. 16/666,680, filed on Oct. 29, 2019, which is a continuation of
(Continued)

(51) Int. Cl.
*H04B 7/15* (2006.01)
*H04B 7/0413* (2017.01)
(Continued)

(52) U.S. Cl.
CPC ....... *H04B 7/15514* (2013.01); *H04B 7/0413* (2013.01); *H04B 7/0617* (2013.01);
(Continued)

(58) Field of Classification Search
CPC ............. H04B 7/15514; H04B 7/0413; H04B 7/0617; H04B 7/15; H04B 7/1555;
(Continued)

(56) References Cited

U.S. PATENT DOCUMENTS 3,835,469 A    9/1974  Chen et al.
4,799,062 A *  1/1989  Sanderford, Jr. ..... G01S 5/0009
                                                      340/8.1
(Continued)

FOREIGN PATENT DOCUMENTS

WO      2008027531 A3    12/2008

OTHER PUBLICATIONS

Corrected Notice of Allowance for U.S. Appl. No. 15/256,222 dated Oct. 28, 2020.
(Continued)

*Primary Examiner* — Kevin M Burd
(74) *Attorney, Agent, or Firm* — CHIP LAW GROUP

(57) ABSTRACT

A repeater device for New Radio (NR) communication, includes a baseband processor that establishes a communication link with a base station and decodes control information that is received from the base station through a control channel. The baseband processor further aligns a timing reference of the repeater device with that of an NR cell frame for an uplink or a downlink time division duplex (TDD) switching, based on the decoded control information. The baseband processor further selects and forms one or more donor beams of RF signals at a donor side of the repeater device and one or more service beams of RF signals at a service side of the repeater device, based on the decoded control information and the aligned timing reference with that of the NR cell frame for the uplink or the downlink TDD switching for communication in an NR frequency band.

24 Claims, 22 Drawing Sheets

Related U.S. Application Data application No. 16/032,617, filed on Jul. 11, 2018, now Pat. No. 10,560,179.

(60) Provisional application No. 62/531,161, filed on Jul. 11, 2017.

(51) Int. Cl.
| | |
|---|---|
| *H04B 7/06* | (2006.01) |
| *H04B 7/155* | (2006.01) |
| *H04B 7/165* | (2006.01) |
| *H04B 7/204* | (2006.01) |
| *H04B 17/318* | (2015.01) |
| *H04W 52/24* | (2009.01) |
| *H04W 52/46* | (2009.01) |
| *H04L 5/00* | (2006.01) |
| *H04L 5/14* | (2006.01) |

(52) U.S. Cl.
CPC ............. *H04B 7/15* (2013.01); *H04B 7/1555* (2013.01); *H04B 7/165* (2013.01); *H04B 7/2041* (2013.01); *H04B 17/318* (2015.01); *H04W 52/245* (2013.01); *H04W 52/46* (2013.01); *H04L 5/0023* (2013.01); *H04L 5/14* (2013.01)

(58) Field of Classification Search
CPC .... H04B 7/165; H04B 7/2041; H04B 17/318; H04L 5/14; H04L 5/0023; H04W 52/46; H04W 52/245
USPC ........................................................ 375/262
See application file for complete search history.

(56) References Cited

U.S. PATENT DOCUMENTS

| | | | |
|---|---|---|---|
| 5,479,651 A | 12/1995 | Nakaguchi | |
| 5,677,796 A | 10/1997 | Zimmerman et al. | |
| 5,724,337 A | 3/1998 | Kawano et al. | |
| 5,883,602 A | 3/1999 | Volman | |
| 6,731,904 B1 | 5/2004 | Judd | |
| 7,079,079 B2 | 7/2006 | Jo et al. | |
| 7,363,058 B2 | 4/2008 | Gustaf | |
| 7,480,486 B1* | 1/2009 | Oh .................. | H04B 7/1555 370/315 |
| 7,675,465 B2 | 3/2010 | Doan et al. | |
| 7,679,576 B2 | 3/2010 | Riedel et al. | |
| 7,715,466 B1 | 5/2010 | Oh et al. | |
| 8,045,638 B2 | 10/2011 | Grant et al. | |
| 9,130,262 B2 | 9/2015 | Park et al. | |
| 9,178,546 B1 | 11/2015 | Klemes | |
| 9,252,908 B1 | 2/2016 | Branlund | |
| 9,277,510 B2 | 3/2016 | Helmersson et al. | |
| 10,080,274 B2 | 9/2018 | Johnson | |
| 10,103,853 B2 | 10/2018 | Moshfeghi | |
| 10,199,717 B2 | 2/2019 | Rofougaran et al. | |
| 10,277,370 B2 | 4/2019 | Moshfeghi | |
| 10,320,090 B2 | 6/2019 | Zou et al. | |
| 10,355,720 B2 | 7/2019 | Shattil | |
| 10,389,041 B2 | 8/2019 | Yoon et al. | |
| 10,560,179 B2* | 2/2020 | Gharavi ............ | H04B 7/15528 |
| 10,854,995 B2 | 12/2020 | Rofougaran et al. | |
| 10,965,411 B2 | 3/2021 | Moshfeghi | |
| 11,018,816 B2 | 5/2021 | Moshfeghi | |
| 11,056,764 B2 | 7/2021 | Rofougaran et al. | |
| 11,075,724 B2 | 7/2021 | Moshfeghi | |
| 11,088,756 B2 | 8/2021 | Gharavi et al. | |
| 11,128,415 B2 | 9/2021 | Moshfeghi | |
| 11,342,968 B2 | 5/2022 | Yoon et al. | |
| 11,394,128 B2 | 7/2022 | Rofougaran et al. | |
| 11,637,664 B2 | 4/2023 | Moshfeghi | |
| 11,652,584 B2 | 5/2023 | Moshfeghi | |
| 11,715,890 B2 | 8/2023 | Rofougaran et al. | |

| | | | |
|---|---|---|---|
| 2004/0204114 A1 | 10/2004 | Brennan et al. | |
| 2005/0088260 A1 | 4/2005 | Ajioka et al. | |
| 2005/0134517 A1 | 6/2005 | Gottl | |
| 2005/0136943 A1 | 6/2005 | Banerjee et al. | |
| 2006/0040615 A1 | 2/2006 | Mohamadi | |
| 2006/0063487 A1 | 3/2006 | Cleveland et al. | |
| 2006/0170595 A1 | 8/2006 | Gustaf | |
| 2006/0205342 A1* | 9/2006 | McKay, Sr. ............. | H04B 3/36 455/11.1 |
| 2007/0001924 A1 | 1/2007 | Hirabayashi | |
| 2007/0115800 A1 | 5/2007 | Fonseka et al. | |
| 2007/0127360 A1 | 6/2007 | Song et al. | |
| 2008/0207259 A1 | 8/2008 | Rofougaran | |
| 2009/0046624 A1 | 2/2009 | Martinez et al. | |
| 2009/0066590 A1 | 3/2009 | Yamada et al. | |
| 2009/0092120 A1 | 4/2009 | Goto et al. | |
| 2009/0136227 A1 | 5/2009 | Lambert | |
| 2009/0156227 A1 | 6/2009 | Frerking et al. | |
| 2009/0175214 A1 | 7/2009 | Sfar et al. | |
| 2009/0191910 A1 | 7/2009 | Athalye et al. | |
| 2009/0197538 A1 | 8/2009 | Borran et al. | |
| 2010/0097976 A1* | 4/2010 | Agrawal ............... | H04L 1/1819 370/315 |
| 2010/0159859 A1 | 6/2010 | Rofougaran | |
| 2010/0167639 A1 | 7/2010 | Ranson et al. | |
| 2010/0265925 A1 | 10/2010 | Liu et al. | |
| 2010/0284446 A1* | 11/2010 | Mu ..................... | H04B 7/15521 375/211 |
| 2011/0039496 A1 | 2/2011 | Chueh et al. | |
| 2011/0109507 A1 | 5/2011 | Warnick | |
| 2011/0159801 A1 | 6/2011 | Maltsev et al. | |
| 2011/0190005 A1 | 8/2011 | Cheon et al. | |
| 2011/0256877 A1* | 10/2011 | Hoymann ............. | H04B 7/155 455/445 |
| 2011/0294415 A1 | 12/2011 | Jeon et al. | |
| 2012/0003925 A1 | 1/2012 | Coldrey et al. | |
| 2012/0026998 A1 | 2/2012 | O'Keeffe et al. | |
| 2012/0149300 A1 | 6/2012 | Forster | |
| 2012/0224651 A1 | 9/2012 | Murakami et al. | |
| 2012/0320874 A1 | 12/2012 | Li et al. | |
| 2013/0003645 A1 | 1/2013 | Shapira et al. | |
| 2013/0034128 A1 | 2/2013 | Gore et al. | |
| 2013/0039342 A1 | 2/2013 | Kazmi | |
| 2013/0072112 A1* | 3/2013 | Gunnarsson ......... | H04B 7/2606 455/9 |
| 2013/0072113 A1* | 3/2013 | Lee .................... | H04B 7/15535 455/9 |
| 2013/0122802 A1 | 5/2013 | Wang et al. | |
| 2013/0149300 A1 | 6/2013 | Hiatt et al. | |
| 2013/0341128 A1 | 12/2013 | Jordan et al. | |
| 2014/0077875 A1* | 3/2014 | Wang .................. | H03F 1/0205 330/127 |
| 2014/0079165 A1 | 3/2014 | Kludt et al. | |
| 2014/0104124 A1 | 4/2014 | Chernokalov et al. | |
| 2014/0210668 A1 | 7/2014 | Wang et al. | |
| 2015/0296344 A1 | 10/2015 | Trojer et al. | |
| 2015/0340765 A1 | 11/2015 | Dang et al. | |
| 2016/0049723 A1 | 2/2016 | Baks et al. | |
| 2016/0056946 A1 | 2/2016 | Moher | |
| 2016/0204513 A1 | 7/2016 | Yemelong et al. | |
| 2016/0359230 A1 | 12/2016 | Wang et al. | |
| 2017/0062944 A1 | 3/2017 | Zimmerman et al. | |
| 2017/0324171 A1 | 11/2017 | Shehan | |
| 2017/0353338 A1 | 12/2017 | Amadjikpe et al. | |
| 2018/0027471 A1* | 1/2018 | Zhang ................. | H04W 24/10 455/436 |
| 2018/0063139 A1 | 3/2018 | Day et al. | |
| 2018/0109303 A1 | 4/2018 | Yoo et al. | |
| 2018/0176799 A1 | 6/2018 | Lange et al. | |
| 2018/0183152 A1 | 6/2018 | Turpin et al. | |
| 2018/0191053 A1 | 7/2018 | Ndip et al. | |
| 2018/0191062 A1 | 7/2018 | Ndip et al. | |
| 2018/0231651 A1 | 8/2018 | Charvat | |
| 2018/0269576 A1 | 10/2018 | Scarborough et al. | |
| 2018/0316090 A1 | 11/2018 | Foo | |
| 2019/0020399 A1 | 1/2019 | Coutts | |
| 2019/0020402 A1* | 1/2019 | Gharavi ............... | H04B 17/318 |
| 2019/0020407 A1 | 1/2019 | Gharavi et al. | |

(56) References Cited

U.S. PATENT DOCUMENTS

| | | | |
|---|---|---|---|
| 2019/0089069 A1 | 3/2019 | Niroo et al. | |
| 2019/0123866 A1 | 4/2019 | Moshfeghi | |
| 2019/0139914 A1 | 5/2019 | Kirino et al. | |
| 2019/0230626 A1* | 7/2019 | Rune | H04W 72/046 |
| 2019/0297648 A1* | 9/2019 | Nagaraja | H04B 17/336 |
| 2019/0319756 A1 | 10/2019 | Moshfeghi | |
| 2019/0334253 A1 | 10/2019 | Corman et al. | |
| 2020/0036414 A1 | 1/2020 | Shattil | |
| 2020/0076491 A1 | 3/2020 | Zhang et al. | |
| 2020/0145079 A1 | 5/2020 | Marinier et al. | |
| 2020/0185299 A1 | 6/2020 | Chang et al. | |
| 2020/0204249 A1* | 6/2020 | Pyun | H04B 7/15557 |
| 2020/0322016 A1* | 10/2020 | Kim | H01Q 21/28 |
| 2020/0412519 A1* | 12/2020 | Krishnaswamy | H04B 7/15542 |
| 2021/0058140 A1 | 2/2021 | Schwab et al. | |
| 2021/0109145 A1* | 4/2021 | Haustein | H04B 17/318 |
| 2021/0203085 A1 | 7/2021 | Jordan et al. | |
| 2022/0158717 A1* | 5/2022 | Frenger | H04B 7/0695 |
| 2022/0159695 A1* | 5/2022 | Zheng | H04W 72/1263 |

OTHER PUBLICATIONS

Corrected Notice of Allowance for U.S. Appl. No. 15/836,198 dated Oct. 2, 2020.
Corrected Notice of Allowance for U.S. Appl. No. 16/129,413 dated Nov. 27, 2020.
Corrected Notice of Allowance for U.S. Appl. No. 16/153,735 dated Nov. 18, 2020.
Corrected Notice of Allowance for U.S. Appl. No. 16/377,980 dated Oct. 5, 2020.
Corrected Notice of Allowance for U.S. Appl. No. 16/526,544 dated Sep. 25, 2020.
Corrected Notice of Allowance for U.S. Appl. No. 16/684,789 dated Nov. 20, 2020.
Final Office Action for U.S. Appl. No. 16/364,956 dated Oct. 2, 2020.
Non-Final Office Action for U.S. Appl. No. 16/204,397 dated Sep. 17, 2020.
Non-Final Office Action for U.S. Appl. No. 16/233,044 dated Oct. 14, 2020.
Non-Final Office Action for U.S. Appl. No. 16/398,156 dated Oct. 15, 2020.
Non-Final Office Action for U.S. Appl. No. 16/451,998 dated Sep. 11, 2020.
Non-Final Office Action for U.S. Appl. No. 16/452,023 dated Sep. 9, 2020.
Non-Final Office Action for U.S. Appl. No. 16/461,980 dated Sep. 21, 2020.
Non-Final Office Action for U.S. Appl. No. 16/666,680 dated Nov. 13, 2020.
Non-Final Office Action for U.S. Appl. No. 16/689,758 dated Sep. 29, 2020.
Non-Final Office Action for U.S. Appl. No. 16/941,690 dated Nov. 12, 2020.
Notice of Allowability for U.S. Appl. No. 16/129,413 dated Nov. 9, 2020.
Notice of Allowance for U.S. Appl. No. 16/125,757 dated Oct. 28, 2020.
Notice of Allowance for U.S. Appl. No. 16/388,043 dated Nov. 5, 2020.
Notice of Allowance for U.S. Appl. No. 16/452,023 dated Nov. 16, 2020.
Notice of Allowance for U.S. Appl. No. 16/675,290 dated Aug. 10, 2020.
Notice of Allowance for U.S. Appl. No. 16/927,470 dated Oct. 29, 2020.
Supplemental Notice of Allowance for U.S. Appl. No. 16/153,735 dated Oct. 9, 2020.
Notice of Allowability for U.S. Appl. No. 16/129,413 dated Jan. 6, 2021.
Corrected Notice of Allowability for U.S. Appl. No. 16/684,789 dated Jan. 11, 2021.
Corrected Notice of Allowance for U.S. Appl. No. 16/125,757 dated Dec. 31, 2020.
Corrected Notice of Allowance for U.S. Appl. No. 16/125,757 dated Feb. 1, 2021.
Corrected Notice of Allowance for U.S. Appl. No. 16/364,956 dated Jan. 6, 2021.
Corrected Notice of Allowance for U.S. Appl. No. 16/388,043 dated Dec. 24, 2020.
Corrected Notice of Allowance for U.S. Appl. No. 16/388,043 dated Dec. 30, 2020.
Corrected Notice of Allowance for U.S. Appl. No. 16/675,290 dated Dec. 16, 2020.
Corrected Notice of Allowance for U.S. Appl. No. 16/927,470 dated Feb. 2, 2021.
Corrected Notice of Allowance for U.S. Appl. No. 16/927,470 dated Jan. 26, 2021.
Corrected Notice of Allowance for U.S. Appl. No. 16/388,043 dated Feb. 8, 2021.
International Preliminary Report on Patentability for International Application No. PCT/US2018/064184 dated Jan. 21, 2021.
Morgan et al., "A Same-Frequency Cellular Repeater Using Adaptive Feedback Cancellation," IEEE, Mar. 12, 2012, pp. 3825-3830.
Non-Final Office Action for U.S. Appl. No. 16/377,847 dated Dec. 14, 2020.
Notice of Allowability for U.S. Appl. No. 15/607,750 dated Jan. 11, 2021.
Notice of Allowability for U.S. Appl. No. 16/129,413 dated Feb. 18, 2021.
Notice of Allowance for U.S. Appl. No. 16/204,397 dated Jan. 12, 2021.
Notice of Allowance for U.S. Appl. No. 16/354,390 dated Feb. 25, 2021.
Notice of Allowance for U.S. Appl. No. 16/364,956 dated Dec. 11, 2020.
Notice of Allowance for U.S. Appl. No. 16/451,998 dated Jan. 14, 2021.
Notice of Allowance for U.S. Appl. No. 16/666,680 dated Mar. 2, 2021.
Notice of Allowance for U.S. Appl. No. 16/689,758 dated Jan. 22, 2021.
Notice of Allowance for U.S. Appl. No. 16/819,388 dated Jan. 25, 2021.
Notice of Allowance for U.S. Appl. No. 16/866,536 dated Jan. 29, 2021.
Supplemental Notice of Allowability for U.S. Appl. No. 16/153,735 dated Jan. 11, 2021.
Supplemental Notice of Allowance for U.S. Appl. No. 16/452,023 dated Feb. 18, 2021.
Supplemental Notice of Allowance for U.S. Appl. No. 16/153,735 dated Feb. 24, 2021.
Supplemental Notice of Allowance for U.S. Appl. No. 16/451,998 dated Mar. 2, 2021.
Corrected Notice of Allowability for U.S. Appl. No. 16/125,757 dated Mar. 11, 2021.
Corrected Notice of Allowability for U.S. Appl. No. 16/204,397 dated Mar. 11, 2021.
Corrected Notice of Allowance for U.S. Appl. No. 16/204,397 dated Apr. 28, 2021.
Corrected Notice of Allowance for U.S. Appl. No. 16/204,397 dated Jun. 7, 2021.
Corrected Notice of Allowance for U.S. Appl. No. 16/354,390 dated Apr. 9, 2021.
Corrected Notice of Allowance for U.S. Appl. No. 16/354,390 dated Jun. 3, 2021.
Corrected Notice of Allowance for U.S. Appl. No. 16/364,956 dated May 6, 2021.
Corrected Notice of Allowance for U.S. Appl. No. 16/388,043 dated Apr. 15, 2021.
Corrected Notice of Allowance for U.S. Appl. No. 16/689,758 dated Apr. 29, 2021.

(56) References Cited

OTHER PUBLICATIONS

Corrected Notice of Allowance for U.S. Appl. No. 16/689,758 dated Apr. 7, 2021.
Corrected Notice of Allowance for U.S. Appl. No. 16/689,758 dated May 27, 2021.
Corrected Notice of Allowance for U.S. Appl. No. 16/866,536 dated Apr. 29, 2021.
Corrected Notice of Allowance for U.S. Appl. No. 16/927,470 dated Apr. 26, 2021.
Final Office Action for U.S. Appl. No. 16/233,044 dated Apr. 19, 2021.
Final Office Action for U.S. Appl. No. 16/398,156 dated Apr. 19, 2021.
Notice of Allowability for U.S. Appl. No. 16/388,043 dated Mar. 11, 2021.
Notice of Allowability for U.S. Appl. No. 16/819,388 dated Apr. 28, 2021.
Notice of Allowability for U.S. Appl. No. 16/819,388 dated Apr. 5, 2021.
Notice of Allowability for U.S. Appl. No. 16/819,388 dated May 27, 2021.
Notice of Allowance for U.S. Appl. No. 16/233,044 dated Jun. 4, 2021.
Notice of Allowance for U.S. Appl. No. 16/377,847 dated Apr. 5, 2021.
Notice of Allowance for U.S. Appl. No. 16/388,043 dated May 7, 2021.
Notice of Allowance for U.S. Appl. No. 16/391,628 dated Mar. 17, 2021.
Notice of Allowance for U.S. Appl. No. 16/451,980 dated Mar. 23, 2021.
Notice of Allowance for U.S. Appl. No. 16/941,690 dated May 5, 2021.
Supplemental Notice of Allowance for U.S. Appl. No. 16/451,980 dated May 18, 2021.
Supplemental Notice of Allowance for U.S. Appl. No. 16/451,998 dated May 18, 2021.
Supplemental Notice of Allowance for U.S. Appl. No. 16/452,023 dated Apr. 30, 2021.
Supplemental Notice of Allowance for U.S. Appl. No. 16/666,680 dated Jun. 10, 2021.
Supplemental Notice of Allowance for U.S. Appl. No. 16/866,536 dated Jun. 7, 2021.
Supplemental Notice of Allowance for U.S. Appl. No. 16/866,536 dated Mar. 17, 2021.
Supplemental Notice of Allowance for U.S. Appl. No. 16/941,690 dated May 18, 2021.
Corrected Notice of Allowance for U.S. Appl. No. 16/125,757 dated Jul. 16, 2021.
Corrected Notice of Allowance for U.S. Appl. No. 16/125,757 dated Jun. 28, 2021.
Corrected Notice of Allowance for U.S. Appl. No. 16/233,044 dated Jun. 11, 2021.
Corrected Notice of Allowance for U.S. Appl. No. 16/233,044 dated Sep. 10, 2021.
Corrected Notice of Allowance for U.S. Appl. No. 16/354,390 dated Jul. 13, 2021.
Corrected Notice of Allowance for U.S. Appl. No. 16/364,956 dated Jun. 23, 2021.
Corrected Notice of Allowance for U.S. Appl. No. 16/377,847 dated Aug. 20, 2021.
Corrected Notice of Allowance for U.S. Appl. No. 16/377,847 dated Jul. 13, 2021.
Corrected Notice of Allowance for U.S. Appl. No. 16/377,847 dated Jul. 6, 2021.
Corrected Notice of Allowance for U.S. Appl. No. 16/388,043 dated Aug. 27, 2021.
Corrected Notice of Allowance for U.S. Appl. No. 16/391,628 dated Jul. 30, 2021.
Corrected Notice of Allowance for U.S. Appl. No. 16/391,628 dated Jun. 29, 2021.
Corrected Notice of Allowance for U.S. Appl. No. 16/398,156 dated Aug. 13, 2021.
Corrected Notice of Allowance for U.S. Appl. No. 16/689,758 dated Jul. 6, 2021.
Non-Final Office Action for U.S. Appl. No. 17/091,520 dated Jul. 8, 2021.
Notice of Allowance for U.S. Appl. No. 16/398,156 dated Jul. 6, 2021.
Supplemental Notice of Allowance for U.S. Appl. No. 16/451,980 dated Aug. 6, 2021.
Supplemental Notice of Allowance for U.S. Appl. No. 16/451,980 dated Jun. 30, 2021.
Supplemental Notice of Allowance for U.S. Appl. No. 16/451,998 dated Jun. 24, 2021.
Supplemental Notice of Allowance for U.S. Appl. No. 16/666,680 dated Jul. 9, 2021.
Supplemental Notice of Allowance for U.S. Appl. No. 16/866,536 dated Jul. 21, 2021.
Supplemental Notice of Allowance for U.S. Appl. No. 16/941,690 dated Aug. 9, 2021.
Corrected Notice of Allowance for U.S. Appl. No. 16/398,156 dated Nov. 17, 2021.
Corrected Notice of Allowance for U.S. Appl. No. 17/091,520 dated Dec. 14, 2021.
Non-Final Office Action for U.S. Appl. No. 16/920,191 dated Oct. 15, 2021.
Non-Final Office Action for U.S. Appl. No. 16/927,225 dated Dec. 22, 2021.
Notice of Allowance for U.S. Appl. No. 17/091,520 dated Oct. 27, 2021.
Corrected Notice of Allowance for U.S. Appl. No. 16/920,191 dated Feb. 15, 2022.
Corrected Notice of Allowance for U.S. Appl. No. 17/091,520 dated Feb. 2, 2022.
Corrected Notice of Allowance for U.S. Appl. No. 17/091,520 dated Jan. 28, 2022.
Corrected Notice of Allowance for U.S. Appl. No. 17/091,520 dated Mar. 17, 2022.
Non-Final Office Action for U.S. Appl. No. 16/935,422 dated Jan. 21, 2022.
Non-Final Office Action for U.S. Appl. No. 16/935,515 dated Jan. 21, 2022.
Non-Final Office Action for U.S. Appl. No. 17/004,373 dated Feb. 15, 2022.
Non-Final Office Action for U.S. Appl. No. 17/060,182 dated Feb. 25, 2022.
Non-Final Office Action for U.S. Appl. No. 17/208,984 dated Apr. 12, 2022.
Non-Final Office Action for U.S. Appl. No. 17/230,566 dated Apr. 12, 2022.
Non-Final Office Action for U.S. Appl. No. 17/337,529 dated Jan. 26, 2022.
Notice of Allowance for U.S. Appl. No. 16/920,191 dated Feb. 2, 2022.
Notice of Allowance for U.S. Appl. No. 17/171,521 dated Apr. 6, 2022.
Corrected Notice of Allowance for U.S. Appl. No. 16/920,191 dated Jun. 22, 2022.
Corrected Notice of Allowance for U.S. Appl. No. 16/920,191 dated May 10, 2022.
Corrected Notice of Allowance for U.S. Appl. No. 16/920,191 dated May 18, 2022.
Corrected Notice of Allowance for U.S. Appl. No. 16/935,422 dated Jun. 8, 2022.
Corrected Notice of Allowance for U.S. Appl. No. 16/935,515 dated Jun. 8, 2022.
Corrected Notice of Allowance for U.S. Appl. No. 17/091,520 dated Apr. 26, 2022.
Corrected Notice of Allowance for U.S. Appl. No. 17/171,521 dated Jul. 7, 2022.

(56) References Cited

OTHER PUBLICATIONS

Corrected Notice of Allowance for U.S. Appl. No. 17/171,521 dated Jul. 13, 2022.
Final Office Action for U.S. Appl. No. 16/927,225 dated Jun. 24, 2022.
Non-Final Office Action for U.S. Appl. No. 17/243,747 dated Jun. 6, 2022.
Notice of Allowance for U.S. Appl. No. 16/935,515 dated Jun. 1, 2022.
Notice of Allowance for U.S. Appl. No. 17/004,373 dated May 23, 2022.
Notice of Allowance for U.S. Appl. No. 17/329,276 dated Jun. 28, 2022.
Notice of Allowance for U.S. Appl. No. 16/935,422 dated May 31, 2022.
Notice of Allowance for U.S. Appl. No. 17/060,182 dated Jun. 8, 2022.
Notice of Allowance for U.S. Appl. No. 17/337,529 dated May 4, 2022.
Corrected Notice of Allowance for U.S. Appl. No. 16/935,422 dated Oct. 17, 2022.
Corrected Notice of Allowance for U.S. Appl. No. 16/935,422 dated Sep. 14, 2022.
Corrected Notice of Allowance for U.S. Appl. No. 16/935,515 dated Oct. 17, 2022.
Corrected Notice of Allowance for U.S. Appl. No. 16/935,515 dated Sep. 14, 2022.
Corrected Notice of Allowance for U.S. Appl. No. 17/171,521 dated Aug. 29, 2022.
Corrected Notice of Allowance for U.S. Appl. No. 17/329,276 dated Oct. 11, 2022.
Corrected Notice of Allowance for U.S. Appl. No. 17/337,529 dated Aug. 3, 2022.
Corrected Notice of Allowance for U.S. Appl. No. 17/337,529 dated Oct. 5, 2022.
Non-Final Office Action for U.S. Appl. No. 17/209,030 dated Oct. 14, 2022.
Non-Final Office Action for U.S. Appl. No. 17/230,696 dated Oct. 6, 2022.
Non-Final Office Action for U.S. Appl. No. 17/377,983 dated Oct. 26, 2022.
Non-Final Office Action for U.S. Appl. No. 17/382,398 dated Oct. 19, 2022.
Non-Final Office Action for U.S. Appl. No. 17/408,606 dated Aug. 16, 2022.
Non-Final Office Action for U.S. Appl. No. 17/536,235 dated Oct. 11, 2022.
Non-Final Office Action for U.S. Appl. No. 17/742,648 dated Oct. 5, 2022.
Notice of Allowability for U.S. Appl. No. 17/337,529 dated Aug. 10, 2022.
Notice of Allowability for U.S. Appl. No. 17/004,373 dated Aug. 17, 2022.
Notice of Allowability for U.S. Appl. No. 17/004,373 dated Aug. 31, 2022.
Notice of Allowability for U.S. Appl. No. 17/004,373 dated Oct. 24, 2022.
Notice of Allowability for U.S. Appl. No. 17/060,182 dated Aug. 19, 2022.
Notice of Allowability for U.S. Appl. No. 17/060,182 dated Oct. 20, 2022.
Notice of Allowability for U.S. Appl. No. 17/060,182 dated Sep. 20, 2022.
Notice of Allowance for U.S. Appl. No. 16/927,225 dated Oct. 3, 2022.
Notice of Allowance for U.S. Appl. No. 17/208,984 dated Aug. 16, 2022.
Notice of Allowance for U.S. Appl. No. 17/230,566 dated Aug. 25, 2022.
Notice of Allowance for U.S. Appl. No. 17/243,747 dated Sep. 27, 2022.
Notice of Allowance for U.S. Appl. No. 17/365,037 dated Aug. 10, 2022.
Corrected Notice of Allowance for U.S. Appl. No. 16/927,225 dated Feb. 1, 2023.
Corrected Notice of Allowance for U.S. Appl. No. 16/927,225 dated Nov. 23, 2022.
Corrected Notice of Allowance for U.S. Appl. No. 17/329,276 dated Nov. 23, 2022.
Corrected Notice of Allowance for U.S. Appl. No. 17/337,529 dated Nov. 10, 2022.
Corrected Notice of Allowance for U.S. Appl. No. 17/365,037 dated Jan. 5, 2023.
Corrected Notice of Allowance for U.S. Appl. No. 17/365,037 dated Nov. 15, 2022.
Corrected Notice of Allowance for U.S. Appl. No. 17/365,037 dated Nov. 25, 2022.
Corrected Notice of Allowance for U.S. Appl. No. 17/742,648 dated Feb. 1, 2023.
Corrected Notice of Allowance for U.S. Appl. No. 17/208,984 dated Nov. 23, 2022.
Non-Final Office Action for U.S. Appl. No. 17/887,672 dated Dec. 6, 2022.
Non-Final Office Action for U.S. Appl. No. 17/396,063 dated Jan. 18, 2023.
Non-Final Office Action for U.S. Appl. No. 17/408,583 dated Nov. 4, 2022.
Notice of Allowability for U.S. Appl. No. 17/230,566 dated Feb. 2, 2023.
Notice of Allowability for U.S. Appl. No. 17/243,747 dated Dec. 2, 2022.
Notice of Allowability for U.S. Appl. No. 17/243,747 dated Jan. 5, 2023.
Notice of Allowance for U.S. Appl. No. 17/230,696 dated Jan. 20, 2023.
Notice of Allowance for U.S. Appl. No. 17/408,606 dated Feb. 1, 2023.
Notice of Allowance for U.S. Appl. No. 17/742,648 dated Jan. 25, 2023.
Notice of Allowance for U.S. Appl. No. 17/863,874 dated Nov. 18, 2022.
Notice of Allowance for U.S. Appl. No. 17/946,734 dated Jan. 30, 2023.
Supplemental Notice of Allowability for U.S. Appl. No. 17/208,984 dated Nov. 10, 2022.
Supplemental Notice of Allowance for U.S. Appl. No. 17/208,984 dated Jan. 5, 2023.
Supplemental Notice of Allowance for U.S. Appl. No. 17/230,566 dated Jan. 5, 2023.
Corrected Notice of Allowability for U.S. Appl. No. 17/382,398 dated Mar. 13, 2023.
Final Office Action for U.S. Appl. No. 17/377,983 dated Feb. 10, 2023.
Final Office Action for U.S. Appl. No. 17/887,672 dated Mar. 30, 2023.
Non-Final Office Action for U.S. Appl. No. 17/898,706 dated Mar. 28, 2023.
Non-Final Office Action for U.S. Appl. No. 17/903,092 dated Feb. 16, 2023.
Non-Final Office Action for U.S. Appl. No. 17/903,130 dated Feb. 27, 2023.
Notice of Allowance for U.S. Appl. No. 17/208,893 dated Mar. 8, 2023.
Notice of Allowance for U.S. Appl. No. 17/209,030 dated Feb. 8, 2023.
Notice of Allowance for U.S. Appl. No. 17/377,983 dated Apr. 19, 2023.
Notice of Allowance for U.S. Appl. No. 17/382,398 dated Feb. 28, 2023.
Notice of Allowance for U.S. Appl. No. 17/408,583 dated Feb. 27, 2023.

(56) References Cited

OTHER PUBLICATIONS

Notice of Allowance for U.S. Appl. No. 17/536,235 dated Feb. 15, 2023.
Notice of Allowance for U.S. Appl. No. 17/978,565 dated Mar. 17, 2023.
Final Office Action for U.S. Appl. No. 17/903,092 dated Jun. 8, 2023.
Non-Final Office Action for U.S. Appl. No. 17/887,672 dated Jul. 10, 2023.
Non-Final Office Action for U.S. Appl. No. 17/988,827 dated Jun. 22, 2023.
Non-Final Office Action for U.S. Appl. No. 18/083,756 dated Jun. 21, 2023.
Non-Final Office Action for U.S. Appl. No. 18/175,408 dated Jun. 16, 2023.
Notice of Allowance for U.S. Appl. No. 17/396,063 dated May 26, 2023.
Notice of Allowance for U.S. Appl. No. 17/898,706 dated Aug. 8, 2023.
Final Office Action for U.S. Appl. No. 17/903,130 dated Nov. 9, 2023.
Non-Final Office Action for U.S. Appl. No. 17/903,092 dated Sep. 14, 2023.
Non-Final Office Action for U.S. Appl. No. 17/943,300 dated Sep. 27, 2023.
Notice of Allowance for U.S. Appl. No. 17/887,672 dated Oct. 17, 2023.
Notice of Allowance for U.S. Appl. No. 18/083,756 dated Nov. 14, 2023.
Final Office Action for U.S. Appl. No. 17/903,092 dated Mar. 29, 2024.
Non-Final Office Action for U.S. Appl. No. 18/323,002 dated Feb. 1, 2024.
Non-Final Office Action for U.S. Appl. No. 18/175,408 dated Jan. 5, 2024.
Non-Final Office Action for U.S. Appl. No. 18/321,114 dated Feb. 1, 2024.
Non-Final Office Action for U.S. Appl. No. 18/321,160 dated Feb. 15, 2024.
Notice of Allowance for U.S. Appl. No. 17/943,300 dated Jan. 18, 2024.
Notice of Allowance for U.S. Appl. No. 17/903,130 dated Mar. 25, 2024.
Notice of Allowance for U.S. Appl. No. 17/988,827 dated Feb. 22, 2024.
Final Office Action for U.S. Appl. No. 18/175,408 dated Jun. 10, 2024.
Final Office Action for U.S. Appl. No. 18/321,160 dated May 30, 2024.
Non-Final Office Action for U.S. Appl. No. 17/903,092 dated Jul. 5, 2024.
Non-Final Office Action for U.S. Appl. No. 18/321,114 dated May 17, 2024.
Non-Final Office Action for U.S. Appl. No. 18/326,222 dated Apr. 19, 2024.
Notice of Allowance for U.S. Appl. No. 17/903,130 dated Jul. 15, 2024.
Notice of Allowance for U.S. Appl. No. 18/323,002 dated May 15, 2024.
Notice of Allowance for U.S. Appl. No. 18/321,114 dated Oct. 18, 2024.
Notice of Allowance for U.S. Appl. No. 18/326,222 dated Jul. 29, 2024.

* cited by examiner

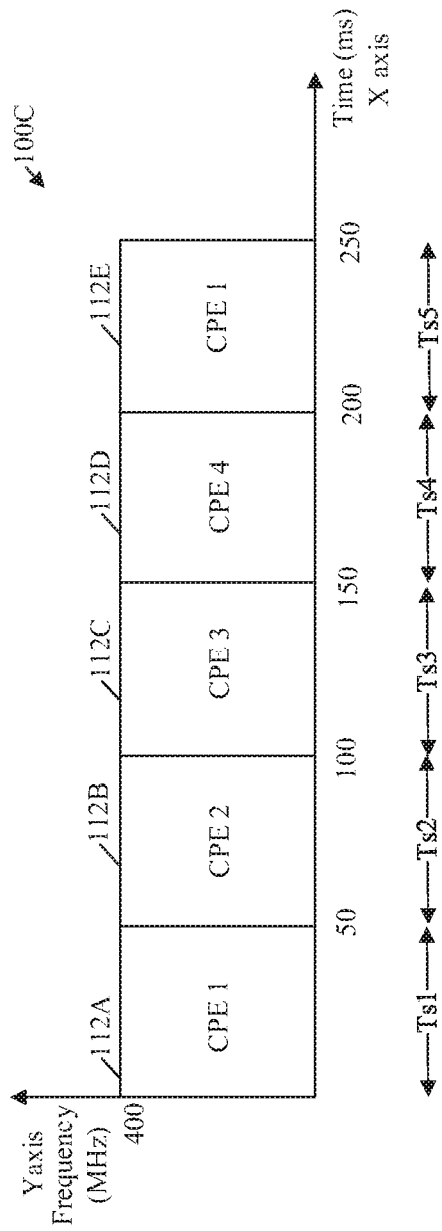
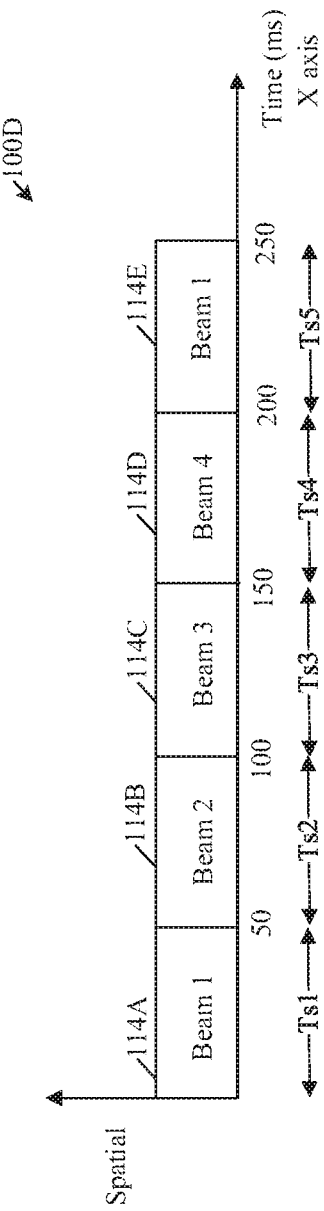
FIG. 1C
FIG. 1D

REPEATER DEVICE FOR 5G NEW RADIO COMMUNICATION

CROSS-REFERENCE TO RELATED APPLICATIONS/INCORPORATION BY REFERENCE

This application makes reference to, is a continuation-in-part of, and claims benefit of, co-pending U.S. patent application Ser. No. 16/666,680 filed on Oct. 29, 2019, which is a continuation of U.S. patent application Ser. No. 16/032,617 filed on Jul. 11, 2018, which claims priority to U.S. Provisional Patent Application Ser. No. 62/531,161 filed on Jul. 11, 2017, the entire content of which is incorporated herein by reference.

This patent application also makes reference to patent application Ser. No. 16/031,007 filed on Jul. 10, 2018.

Each of the above referenced applications, and patent is hereby incorporated herein by reference in its entirety.

FIELD OF TECHNOLOGY

Certain embodiments of the disclosure relate to an active repeater device in a wireless system. More specifically, various embodiments of the disclosure relate to an active repeater device for beam widening to communicate with a plurality of user equipment and a repeater device for 5G New Radio (NR) communication.

BACKGROUND

Wireless telecommunication in modern times has witnessed advent of various signal transmission techniques and methods, such as use of beam forming and beam steering techniques, for enhancing capacity of radio channels. A radio frequency (RF) transmitter device may be configured to radiate radio waves in form of beams of RF signals to a variety of RF receiver devices. In conventional systems, a base station may transmit RF signals to a user equipment (UE) via a pencil-beam. The pencil-beam may be highly directional, have limited coverage area, and may only support line-of-sight (LOS) communication. Therefore, the base station may be required to constantly track location of the UE. Further, the base station may be required to frequently steer the pencil beam to the tracked location of the UE. In conventional systems, a process of constantly tracking location of the UE may consume a large portion of communication bandwidth, which may not be desirable.

Emergence of 5G NR networks in cm-wave and mm-wave bands is introducing new opportunities as well as new technical challenges, and conventional repeater devices may not be suitable for 5G NR communication. For example, in certain scenarios, the UE may be in motion in a certain trajectory of motion. Therefore, the location of the UE may vary frequently. In such cases, it may be difficult for the base station to track the constantly varying location of the UE accurately. The base station may thus fail to steer the pencil beam frequently and accurately towards the UE. The UE may intermittently move out of the coverage area of the pencil beam and the UE may not receive the RF signals transmitted by the base station. In other scenarios, signal-obstructing physical objects or materials may partially block or impair the pencil beam of RF signals communicated between the base station and the UE. Such signal-obstructing physical objects may obstruct the pencil beam from passing through it even in the LOS transmission path. Moreover, the RF signals transmitted by the base station may bounce off the obstructing physical objects, such as tall buildings and hills, and may scatter. Thus, an advanced repeater device may be desired that facilitates and contributes in provisioning of full coverage in 5G NR cellular network deployments without any adverse user experience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A repeater device for 5G New Radio (NR) communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIG. 1C illustrates a timing profile of resource block utilization of an exemplary active repeater device for switching multi-beam to communicate with a plurality of customer premises equipment (CPEs), in accordance with an exemplary embodiment of the disclosure.

FIG. 1D illustrates a timing profile of beams of an exemplary active repeater device for switching multi-beam to communicate with a plurality of CPEs, in accordance with an exemplary embodiment of the disclosure.

DETAILED DESCRIPTION OF THE DISCLOSURE

Figure 1A:
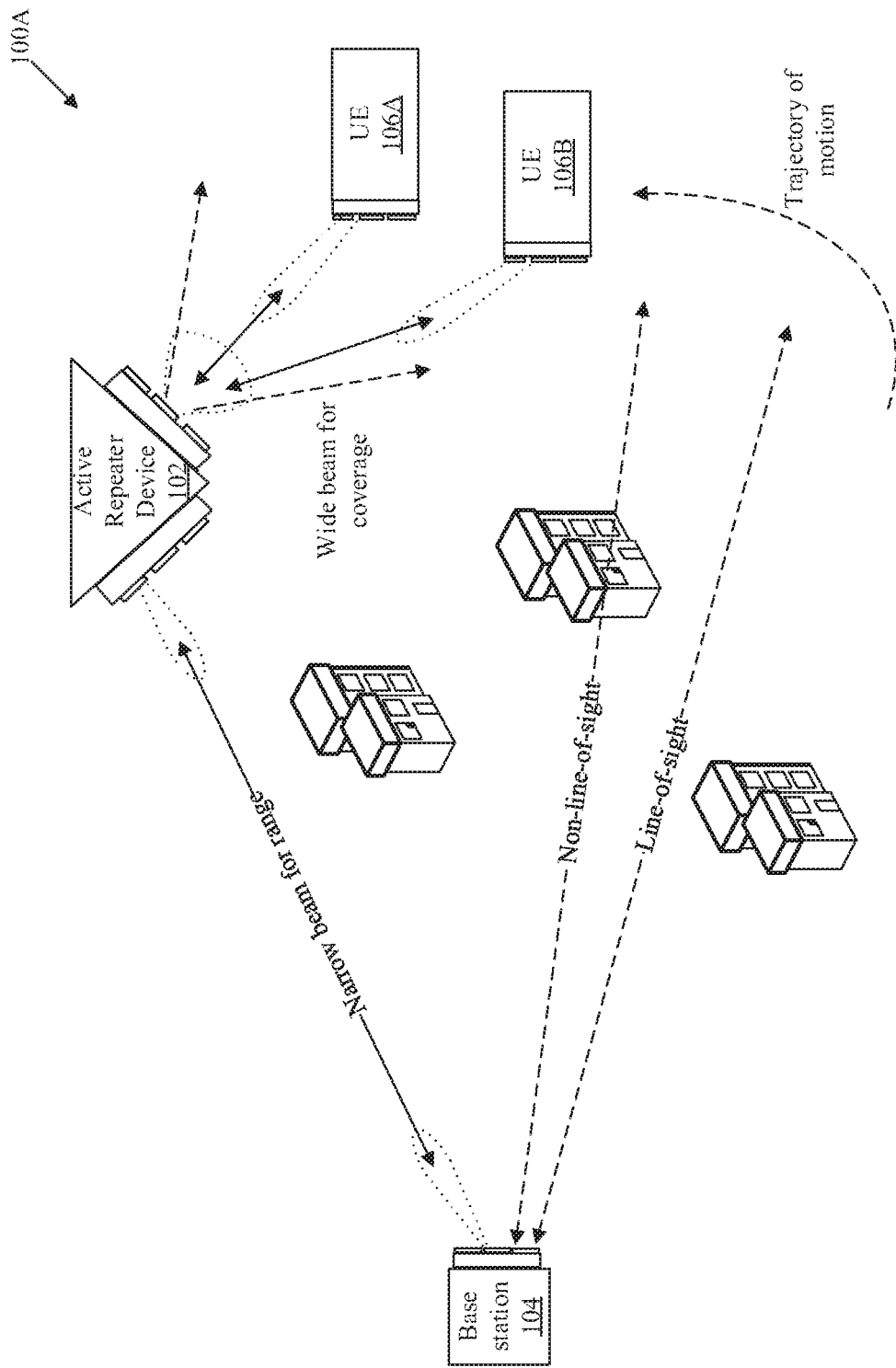
FIG. 1A is a network environment diagram that illustrates an exemplary active repeater device communicatively coupled to a base station and a plurality of user equipment, in accordance with an exemplary embodiment of the disclosure.

Certain embodiments of the disclosure may be found a repeater device, for example, an active repeater device, for 5G New Radio (NR) communication and a method implemented in a repeater device for (NR) communication. Emergence of 5G NR networks in cm-wave and mm-wave bands provides new opportunities as well as new technical challenges, and conventional repeater devices may not be suitable for efficient 5G NR communication. Unlike a conventional RF repeater device or other conventional network nodes that enhance the coverage of base stations, the repeater device of the present disclosure performs various intelligent processing of incoming and outgoing signals without adding to any increase or at least any noticeable increase in latency. In other words, smart amplify-and-forward operations are executed by the repeater device. In a first case, only header portion of the received signal may be decoded in the control path by the repeater device to extract control information and not data portion. This may be done to achieve near-zero-latency while maintaining a final error vector magnitude (EVM) target at end destination point without relying on complete demodulation or re-modulation at an intermediate point, such as the deployment location of the repeater device, for boosting EVM. In some embodiments, where latency of demodulation and re-modulation of data stream can be afforded (i.e. acceptable), and/or the quality (i.e. the SNR) of the received stream is not sufficient for re-transmission as is, the repeater device may de-modulate, de-code, re-encode, re-modulate the stream before re-transmitting the stream through a transmitting antenna array. Thus, the repeater device acts as an intelligent device, which is highly configurable and performs intelligent processing of incoming and outgoing signals based on deployment needs, such as expected latency, and network conditions, network traffic, presence of echo signals or interference, and the like. And accordingly, the repeater device 802 has the capability to dynamically select and form one or more donor beams of RF signals at the donor side of the repeater device and one or more service beams of RF signals at the service side of the repeater device, based on decoded control information received via a control channel and aligned timing reference with that of a NR cell frame for uplink or downlink TDD switching for communication in an NR frequency band. Thus, the disclosed repeater device enables in provisioning of full coverage in 5G NR cellular network deployments without any adverse user experience.

In one aspect, the repeater device comprises a baseband processor that may be configured to establish a communication link with a base station. The baseband processor may be further configured to decode control information that may be received from the base station through a control channel. The baseband processor may be further configured to align a timing reference of the repeater device with that of an NR cell frame for an uplink or a downlink time division duplex (TDD) switching, based on the decoded control information. The baseband processor may be further configured to select and form one or more donor beams of RF signals at a donor side of the repeater device and one or more service beams of RF signals at a service side of the repeater device, based on the decoded control information and the aligned timing reference with that of the NR cell frame for the uplink or the downlink TDD switching for communication in an NR frequency band. This enables the disclosed repeater device in provisioning of full coverage in 5G NR cellular network deployments without any adverse user experience.

In an implementation, the communication link may be established with the base station may be one of: an in-band link, an out-of-band link, or a sidelink. In a further implementation, the baseband processor may be further configured to obtain the control information associated with the TDD switching from the base station as a modulated pulse through the control channel in order to align the timing reference for the uplink or the downlink TDD switching. In a further implementation, the baseband processor may be further configured to decode NR synchronization signals and Physical Broadcast Channels (PBCHs) as a part of the decoded control information in order to align the timing reference for the uplink or the downlink TDD switching.

In a further implementation, the decoded control information in addition to the NR synchronization signals and the Physical Broadcast Channels (PBCHs) further comprises one or more of: a periodicity and a downlink/uplink cycle ratio, a TDD pattern, a NR TDD slot format, or a plurality of NR TDD slot formats in a periodic sequence. In a further implementation, the baseband processor may be further configured to obtain a physical cell identifier (PCID), an absolute radio-frequency channel number (ARFCN), and other properties of the base station through the control channel in order to automatically align one donor beam of the one or more donor beams of the RF signals towards the base station.

In a further implementation, the baseband processor may be further configured to form a plurality of donor beams of RF signals concurrently towards a plurality of target base stations or a plurality of other repeater devices, based on a plurality of requested donor beam identifiers, where the plurality of requested donor beam identifiers are shared by one or the plurality of target base stations through the control channel to reach the repeater device. In a further implementation, the baseband processor may be further configured to form a plurality of service beams of RF signals concurrently towards a plurality of user equipment (UEs) or a plurality of other repeater devices, based on a plurality of requested service beam identifiers. The plurality of requested service beam identifiers may be shared to the repeater device via one or more control messages by one or a plurality of base stations, or the plurality of UEs. In other words, beneficially, the repeater device is able to automatically align its donor beams towards the target gNBs.

In a further implementation, the baseband processor may be further configured to adjust a forward end-to-end gain of the repeater device for a downlink or an uplink communication based on a request received through the control channel. In a further implementation, the repeater device includes a filter, where the baseband processor may be further configured to tune a user plane's frequency response via the filter in a downlink direction to allow or reject one or more bandwidth parts (BWPs) of one or more NR frequency bands. Information corresponding to the one or more bandwidth parts that the repeater device may be expected to amplify and forward in the downlink direction may be send to the repeater device by the base station through the control channel. In a further implementation, the baseband processor may be further configured to tune a user plane's frequency response via the filter in an uplink direction to allow or reject one or more bandwidth parts (BWPs) of one or more NR frequency bands. Information corresponding to the one or more bandwidth parts that the repeater device may be expected to amplify and forward in the uplink direction may be send to the repeater device by the base station or a user equipment through the control channel.

In a further implementation, the baseband processor may be further configured to apply a change in a frequency in a relayed signal at the service side in a downlink direction relative to a received signal at the donor side. The baseband processor may be further configured to apply a change in a frequency in a relayed signal at the donor side in an uplink direction relative to a received signal at the service side. In a further implementation, the baseband processor may be further configured to apply a defined power back-off from a set of amplifiers in a downlink radio frequency chain at the service side. In a further implementation, the baseband processor may be further configured to apply a defined power back-off from a set of amplifiers in an uplink radio frequency chain at the donor side.

In a further implementation, the baseband processor may be further configured to set at least one of: an idle mode, a sleep mode, or an ultra-low-power mode for a scheduled period of time, based on network traffic information. In a further implementation, the baseband processor may be further configured to communicate a channel quality indicator and other channel estimates to the base station as a feedback via the established communication link. In a further implementation, the baseband processor may be further configured to communicate with a specified remote server via a management control plane to acquire data and instructions to allow remote execution of one or more operations at the repeater device including a software upgrade. In a further implementation, the baseband processor may be further configured to measure quality information of a plurality of communication links for a plurality of physical cell identifier (PCIDs) which are received from a network or one or more base stations; and communicate the received quality information of the received plurality of PCIDs back to the network or the one or more base stations as a feedback. In a further implementation, the baseband processor may be further configured to measure an uplink signal quality information of specified uplink slots and beam settings and communicate the measured uplink signal quality information to a network or the base station, wherein the measurement is based on a control instruction and configuration from the network or the base station received at the repeater device. In a further implementation, the baseband processor may be further configured to execute a beam configuration of the repeater device for each symbol or slot of the NR cell frame through the established communication link, wherein the beam configuration is statically or dynamically configured based on a control instruction communicated by a network or the base station through the established communication link.

The repeater device enables provisioning of full coverage in 5G NR cellular network deployments without any adverse user experience, to meet QoS for 5G NR communication. Moreover, the adjustment of the power back-off is used by the repeater device to minimize (i.e. substantially reduce) the impact of interference (echo or noise signals) and hence only use as much power as needed to achieve low error communication with the base station in the uplink or the UEs in the downlink. Moreover, a certain back-off may be determined for the uplink as well as the downlink to meet the Error Vector Magnitude (EVM) specification (i.e. desired EVM to be achieved). The disclosed repeater device by virtue of its internal change in frequency of incoming signals relative to outgoing signals enables better utilization of spectral channels, improved overall frequency planning in network, and better isolation between the receiving and transmitting antenna arrays inside the repeater device operating at same time/channel. Furthermore, the repeater device is highly programmable and can be remotely updated by the RNM server to meet any new requirements and allow or reject one or more bandwidth parts (BWPs) of one or more NR frequency bands, for efficient and reliable 5G NR communication. Additionally, and beneficially, the repeater device provides an ultra-low-power mode for improved power savings in the repeater device. In the ultra-low-power mode, the RF components for only a portion of an antenna array (a logically ad dynamically partitioned portion) may be active while other are set to the sleep mode or the idle mode to achieve significant power savings at the repeater device in the ultra-low-power mode. In the following description, reference is made to the accompanying drawings, which form a part hereof, and in which is shown, by way of illustration, various embodiments of the present disclosure.

FIG. 1A is a network environment diagram that illustrates an exemplary active repeater device in communication with a base station and a plurality of user equipment, in accordance with an exemplary embodiment of the disclosure. With reference to FIG. 1, there is shown a network environment 100A that may include an active repeater device 102, a base station 104 and a plurality of user equipment (UEs) 106A and UE 106B. The base station 104 may be located at a certain distance from the UE 106A and the UE 106B. The plurality of UEs 106A and 106B may be in movement in accordance with a certain trajectory of motion. The active repeater device 102 may be installed at a defined location and may be stationary.

The active repeater device 102 may have a modular architecture that includes a primary sector and one or more secondary sectors. The primary sector may include a baseband signal processor and a first radio head (RH) unit. Each of the one or more secondary sectors may include a second RH unit. The baseband signal processor may also be referred to as a light baseband unit (LBU) or a simplified baseband unit (BBU) that may be smaller in size as compared to a conventional BBU to be housed in the primary sector of the active repeater device 102. Each of the one or more secondary sectors may be communicatively coupled to the primary sector via one or more analog baseband (IQ) signal cables and a control signal cable. The primary sector and one or more secondary sectors including the at least one secondary sector may be configured to cover a portion of a 360-degree scan range for communication among the base station 104, the plurality of UEs 106A and 106B, or another active repeater device, after installation at the defined location. In accordance with an embodiment, the active repeater device 102 may support multiple and a wide range of frequency spectrum, for example, 1G, 2G, 3G, 4G, and 5G. Alternatively stated, the active repeater device 102 may facilitate communication in both sub 30 gigahertz to above 30 gigahertz. The band of radio frequencies in the electromagnetic spectrum from 30 to 300 gigahertz is usually referred to as extremely high frequency (EHF) communication. Such radio frequencies have wavelengths from ten to one millimeter, referred to as millimeter wave (mmW).

The active repeater device 102 may comprise a plurality of RH units including the first RH unit in the primary sector, and the second RH unit in the secondary sector. Each of the plurality of RH units may comprise a first antenna array and a second antenna array. Therefore, the active repeater device 102 may comprise a plurality of first antenna arrays and a plurality of second antenna arrays. Each of the plurality of first antenna arrays may be configured to receive beams of input RF signals from one or more signal transmitters, such as transmitters in the base station 104, the plurality of UEs 106A and 106B, and other active repeater devices. Each of the plurality of second antenna arrays may be configured to transmit beams of output RF signals to one or more signal receivers, such as receivers in the base station 104, the plurality of UEs 106A and 106B, and other active repeater devices. In accordance with an embodiment, the plurality of first antenna arrays may be configured to receive different input RF signals from the plurality of UEs 106A and 106B through different beam patterns and distances.

In certain scenarios, the active repeater device 102 may be positioned in a vicinity of a signal obstructing object, such as a tall building which may partially block the path of the input RF signals. The active repeater device 102 may be realized by various components, such as transmitter front-ends, receiver front-ends, a plurality of low-noise amplifiers, a plurality of phase shifters, a plurality of power combiners, a plurality of power dividers, and a plurality of power amplifiers, logical control units, controllers and mixers.

The base station 104, for example, an Evolved Node B (eNB) or gNB, may be a fixed point of communication that may relay information, in form of a plurality of beams of RF signals, to and from communication devices, such as the active repeater device 102 and the plurality of UEs 106A and 106B. Multiple base stations corresponding to one service provider, may be geographically positioned to cover specific geographical areas. Typically, bandwidth requirements serve as a guideline for a location of the base station 104 based on relative distance between the plurality of UEs 106A and 106B and the base station 104. The count of base stations depends on population density and geographic irregularities, such as buildings and mountain ranges, which may interfere with the plurality of beams of RF signals.

The base station 104 may be configured to transmit a first beam of input RF signals to the active repeater device 102. In one example, the first beam having a first beam pattern, such as a narrow beam, may be received by the active repeater device 102. The base station 104 may be configured to generate the narrow beam of the input RF signals to achieve a high transmission range so that the narrow beam of the input RF signals reaches the known location of the active repeater device 102. Since the active repeater device 102 may be stationary at the defined location, the base station 104 may not need to track location of the active repeater device 102 periodically or constantly.

Each of the plurality of UEs 106A and 106B may correspond to a telecommunication hardware used by an end-user to communicate. Alternatively stated, the plurality of UEs 106A and 106B may refer to a combination of mobile equipment and subscriber identity module (SIM). Each of the plurality of UEs 106A and 106B may be configured to communicate with the active repeater device 102 by use of RF signals. In some embodiments, each of the plurality of UEs 106A and 106B may be a telecommunication hardware (e.g., a customer-premises equipment (CPE)) present at the premises of a subscriber and communicatively coupled to a carrier's telecommunication channel at certain interface point. The interface point is usually situated established in a building to separate the CPE from the equipment located in either the distribution infrastructure or central office of the communications service provider. Other examples of the plurality of UEs 106A and 106B may include, but are not limited to a smartphone, a wireless modem, a home router, a cable or satellite television set-top box, a VoIP base station, or any other customized hardware for telecommunication. The active repeater device 102 may be deployed between the base station 104 (e.g. an eNB) and the plurality of UEs 106A and 106B to mitigate lack of line-of-sight (LOS) between the base station 104 and the plurality of UEs 106A and 106B.

In operation, at least one operating mode of a plurality of operating modes may be set in the active repeater device 102. The plurality of operating modes includes a beam widening mode, a switching multi-beam mode, a concurrent multi-beam mode, and a static beam mode, or an operating mode that includes one or more specified combination of the static beam mode, the beam widening mode, the switching multi-beam mode, and the concurrent multi-beam mode. For example, an operating mode may be a combination of the beam widening mode and the switching multi-beam mode, where the beams that are switched are wider beams in comparison to the beam received from the base station 104. The selection may be made by at least one of a control command received from a control server (or the base station 104 from a remote location that is different than an installation location of the active repeater device, a user-input to change a configuration setting at the active repeater device, or an automatic estimation of a number, distances, and a spatial distribution of the plurality of UEs 106A and 106B, to be serviced. In the FIG. 1A, certain operations of a first operating mode, such as the beam widening mode of the plurality of operating modes is described, for example. The switching multi-beam mode is discussed, for example, in FIGS. 1B, 1C, and 1D. The concurrent multi-beam mode is discussed, for example, also in FIGS. 1B, 1E, and 1F. The plurality of operating modes and their operations are discussed, for example, for example, in FIGS. 6A, 6B, 7A, 7B, and 7C.

In FIG. 1A, in a case where the beam widening mode is set, the active repeater device 102 may be configured to receive a first beam of input RF signals having a first beam pattern. The first beam may be received by the active repeater device 102 from the base station 104. The first beam of input RF signals having the first beam pattern may corresponds to a narrow beam, such as a pencil beam, which may cover a first geographical area. The base station 104 may be configured to detect a location of the active repeater device 102 and then direct the narrow beam towards the detected location of the active repeater device 102. Since the active repeater device 102 and the base station 104 may be stationary, the base station 104 may be configured to transmit the narrow beam to the active repeater device 102 without constant tracking of location of the active repeater device 102. The active repeater device 102 may be configured to receive the first beam via a first antenna array comprising a first set of antenna elements. In certain scenarios, the active repeater device 102 may be configured to receive the first beam of input RF signals from another active repeater device which may be a part of a non-line-of-sight (NLOS) transmission path. The NLOS transmission path may be between the base station 104 and the plurality of UEs 106A and 106B.

The active repeater device 102 exhibits a demodulator-less architecture to avoid introduction of latency through the active repeater device 102. As a result of the demodulator-less architecture, one or more beams of output RF signals may be transmitted by one or more antenna arrays of the active repeater device 102 to the plurality of UEs 106A and 106B without demodulation of data portion of the received first beam of input RF signals to minimize the latency for transmission of the one or more beams of output RF signals while maintaining a final error vector magnitude (EVM) target at end destination point (i.e. the plurality of UEs 106A and 106B).

The active repeater device 102 may comprise a digital modem circuitry, for example, an embedded 5G modem. The digital modem circuitry may utilize the received signal (i.e. the received first beam of input RF signals) for control and monitoring operations, such as configuring and monitoring beamforming functions. However, the active repeater device 102 does not process (i.e., demodulate) data stream in the received signal intended for end destination (i.e. the plurality of UEs 106A and 106B). The data stream may also be referred to as the data portion of the received first beam of input RF signals. For example, some subcarriers in the waveform of the received signal (i.e. the received first beam of input RF signals) may be dedicated for active repeater device 102 internal consumption, while the rest of subcarriers are assigned to other end users (i.e. the plurality of UEs 106A and 106B). In this case, the digital modem circuitry selectively decodes only the subcarriers assigned for the consumption of the active repeater device 102 and the full received RF signal is still relayed towards the destination without demodulation of full waveform to achieve near-zero-latency while maintaining a final error vector magnitude (EVM) target at end destination point (i.e. the plurality of UEs 106A and 106B) without relying on demodulation or re-modulation at an intermediate point, such as the deployment location of the active repeater device 102, for boosting EVM. Although this sets a higher limit on signal-to-noise ratio (SNR) quality for signal propagation through the active repeater device 102, the active repeater device 102 still achieves target final RX SNR (i.e. signal quality at the plurality of UEs 106A and 106B is greater than a defined threshold SNR, for example, ~22 dB). Conventional active repeaters are simply digital signal amplifiers, which may decode both the header portion and the data portion for amplification, which adds to latency in communication. As the active repeater device 102 only decodes the header portion of the received signal to extract control information without demodulation of data portion of the first set of coded data signals to achieve near-zero-latency. Further, a conventional baseband unit (BBU) is voluminous, and is typically placed in an equipment room in mobile telecommunications systems and connected with remote radio head unit (RRU), via optical fiber. In contrast, a baseband signal processor of the primary sector of the active repeater device 102 may be implemented as the baseband signal processor card or chip, which is smaller in size and consumes less power in comparison with the conventional BBU. Thus, the baseband signal processor of the primary sector may also be referred to as a light baseband unit (LBU) or a simplified baseband unit (BBU) that may be smaller in size as compared to a conventional BBU.

In accordance with an embodiment, the active repeater device 102 may be configured to generate a first set of analogue baseband (IQ) signals based on the received first beam of input RF signals. The first set of IQ signals may comprise signals which may be processed in accordance with a defined or particular phase modulation scheme. An example of the phase modulation scheme may include, but is not limited to a Quadrature Phase Shift Keying (QPSK) based modulation scheme and a Quadrature Amplitude modulation (QAM) scheme. The active repeater device 102 may be configured to convert the received first set of IQ signals to a first set of coded data signals. The first set of coded data signals may comprise a plurality of data packets, arranged as a sequence of frames. Each of the sequence of frames may comprise a header portion and a data portion. The sequence of frames may comprise data frames provided in the data portion and control frames provided in the header portion. The active repeater device 102 may be configured to decode the header portion of the first set of coded signals. The active repeater device 102 may be configured to extract control information from the first set of coded data signals based on the header portion of the first set of coded data signals. In accordance with an embodiment, the extracted control information may include Time Division Duplex (TDD) time slot information and beamforming information. The beamforming information may include beam training information between the base station 104 and the plurality of UEs 106A and 106B. The control information may further include frame structure and frame length information of the first set of coded data signals accessed from the header portion of the first set of coded data signals.

In accordance with an embodiment, the active repeater device 102 may be configured to receive a plurality of RF signals from the plurality of UEs 106A and 106B. The active repeater device 102 may be configured to measure Received Signal Strength Indicator (RSSI) associated with each of the plurality of RF signals received from the plurality of UEs 106A and 106B. The active repeater device 102 may be configured to estimate a relative position of each of the plurality of UEs 106A and 106B with respect to the active repeater device 102. The active repeater device 102 may not be required to constantly or too frequently (such as less than a specified time period) measure the RSSI associated with each of the plurality of RF signals received from the plurality of UEs 106A and 106B.

In accordance with an embodiment, the active repeater device 102 may be configured to generate beamforming coefficients to convert the first beam pattern of the first beam to a second beam pattern based on the extracted control information and the measured RSSI. The beamforming coefficients may be generated based on the measured RSSI and the estimated relative positions of each of the plurality of UEs 106A and 106B from the active repeater device 102. A second beam having the second beam pattern may cover a second geographical area. The second beam pattern may be wider than the first beam pattern. Further, the second geographical area may be larger than the first geographical area covered by the first beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B without requiring to constantly track locations of each of the plurality of UEs 106A and 106B. The pencil-beams may have higher transmission range but provides less coverage as compared to the widened beam that have comparatively lesser transmission range but provide greater coverage.

In conventional systems, a process of constantly tracking location and orientation of each of the plurality of UEs 106A and 106B may consume communication bandwidth. The active repeater device 102 mitigates need for constantly tracking location and orientation of each of the plurality of UEs 106A and 106B. Therefore, transmission of the second beam of output RF signals in the second beam pattern to the plurality of UEs 106A and 106B may be independent of or devoid of constant tracking of locations and orientations of the plurality of UEs 106A and 106B to save communication bandwidth and power.

In accordance with an embodiment, the active repeater device 102 may be configured to generate output RF signals based on the first set of IQ signals. Further, the active repeater device 102 may be configured to generate the second beam of the second beam pattern based on the generated beamforming coefficients. Further, the active repeater device 102 may be configured to transmit the generated output RF signals in the second beam pattern to the plurality of UEs 106A and 106B based on the generated beamforming coefficients and the received first beam of input RF signals. The active repeater device 102 may be configured to transmit the second beam via at least a second antenna array among the plurality of second antenna arrays in the secondary sectors. The transmission of the second beam of output RF signals in the second beam pattern to the plurality of UEs 106A and 106B may be done without (or independent of) constant tracking of locations and orientations of the plurality of UEs 106A and 106B to save communication bandwidth.

The active repeater device 102 may establish the MIMO communication in a non-line-of-sight (NLOS) transmission path based on the receipt of the first beam of input RF signals having the first beam pattern from the base station 104. Further, the active repeater device 102 may be configured to establish the MIMO communication based on transmission of the second beam of output RF signals in the second beam pattern to the plurality of UEs 106A and 106B.

Figure 1B:
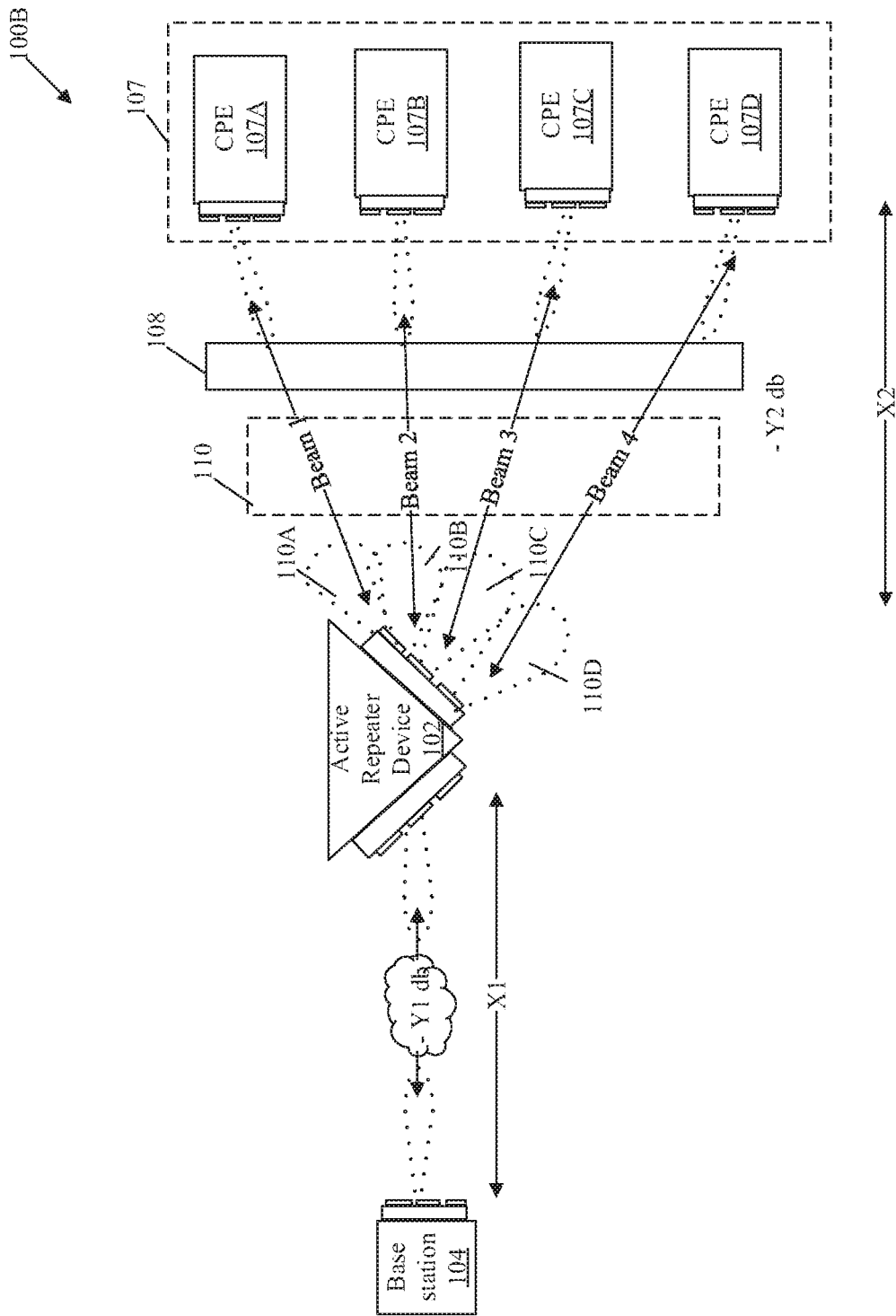
FIG. 1B is another network environment diagram that illustrates the active repeater device of FIG. 1A in communication with a base station and a plurality of customer premises equipment, in accordance with an exemplary embodiment of the disclosure.

FIG. 1B is a network environment diagram that illustrates the active repeater device of FIG. 1A in communication with a base station and a plurality of customer premises equipment, in accordance with an exemplary embodiment of the disclosure. With reference to FIG. 1B, there is shown a network environment 100B that may include the active repeater device 102, the base station 104 and a plurality of customer premises equipment (CPEs) 107 (such as a first CPE 107A, a second CPE 107B, a third CPE 107C and a fourth CPE 107D). The plurality of CPEs 107 may correspond to the plurality of UEs of FIG. 1A. The base station 104 may be located at a certain distance from each CPE of the plurality of CPEs 107. The active repeater device 102 may be installed at a defined location and may be stationary. There is also shown a signal-obstructing physical object 108 that may partially block or impair a plurality of beams 110 (such as a first beam 110A, a second beam 110B, a third beam 110C, and a fourth beam 110D) of output RF signals communicated between the active repeater device 102 and the plurality of CPEs 107.

Each of the plurality of CPEs 107 may correspond to a telecommunication hardware present at the premises of a subscriber and communicatively coupled to a carrier's telecommunication channel at certain interface point. The interface point is usually situated or established in a building to separate the CPE from the equipment located in either the distribution infrastructure or central office of the communications service provider. The CPE may also be alternatively referred to as user equipment, such as the plurality of UEs 106A and 106B, such as a combination of mobile equipment and subscriber identity module (SIM), used by an end-user to communicate. Each of the plurality of CPEs 107 may be configured to communicate with the active repeater device 102 by use of RF signals. Examples of the plurality of CPEs 107 may include, but are not limited to a wireless modem, a home router, a fixed mobile convergence hardware, a telecommunication gateway device, a cable or satellite television set-top box, a VoIP base station, or any other customized hardware for telecommunication. The active repeater device 102 may be deployed between the base station 104 (e.g. an eNB) and the plurality of CPEs 107 to mitigate lack of line-of-sight (LOS) between the base station 104 and the plurality of CPEs 107.

In operation, the active repeater device 102 may be configured to receive a first beam of input RF signals having a first beam pattern. The first beam may be received by the active repeater device 102 from the base station 104. The first beam of input RF signals having the first beam pattern may correspond to a narrow beam such as a pencil beam which may cover a first geographical area. Since the active repeater device 102 and the base station 104 may be stationary, the base station 104 may be configured to direct the narrow beam to the active repeater device 102 without constant tracking of location of the active repeater device 102.

The active repeater device 102 may be configured to receive the first beam via a first antenna array comprising a first set of antenna elements. In certain scenarios, the active repeater device 102 may be configured to receive the first beam of input RF signals from another active repeater device which may be a part of a non-line-of-sight (NLOS) transmission path. The NLOS transmission path may be between the base station 104 and the plurality of CPEs 107. The active repeater device 102 exhibits a demodulator-less architecture to avoid introduction of latency through the active repeater device 102. As a result of the demodulator-less architecture, one or more beams of output RF signals may be transmitted by one or more antenna arrays of the active repeater device 102 to the plurality of CPEs 107 without demodulation of data portion of the received first beam of input RF signals to minimize the latency for transmission of the one or more beams of output RF signals while maintaining a final error vector magnitude (EVM) target at end destination point (i.e. the plurality of CPEs 107).

The first beam of input RF signals may comprise input RF signals intended for each of the plurality of CPEs 107. For example, the first beam of the input RF signals may comprise a first input RF signal intended for the first CPE 107A. The first beam of the input RF signals may further comprise a second input RF signal, a third input RF signal, and a fourth RF input signal, intended for the second CPE 107B, the third CPE 107C, and the fourth CPE 107D respectively. The first beam of input RF signals may comprise a single stream which may have been generated by a superimposition of the first input RF signal, the second input RF signal, the third RF input RF signal, and the fourth input RF signal by the base station 104. The first input RF signal, the second input RF signal, the third RF input RF signal, and the fourth input RF signal may have been superimposed by the base station 104 in accordance with a Time Division Multiple Access (TDMA) or an Orthogonal Frequency Multiple Access (OFDMA) scheme. In accordance with an embodiment, the first beam of the received first beam of input RF signals may comprise a single reference stream comprising scheduling information associated with the TDMA based wireless signal transmission scheme. The base station 104 may be configured to communicate with the plurality of CPEs 107 via the active repeater device 102, based on the TDMA based wireless signal transmission scheme. The base station 104 may be configured to communicate with each of the plurality of CPEs 107 at a different timeslot of a plurality of timeslots in a transmission time period, based on the TDMA based wireless signal transmission system.

In accordance with an embodiment, the active repeater device 102 may be configured to generate a first set of analogue baseband (IQ) signals based on the received first beam of input RF signals. The first set of IQ signals may comprise signals which may be processed in accordance with a defined or particular phase modulation scheme. An example of the phase modulation scheme may include, but is not limited to a Quadrature Phase Shift Keying (QPSK) based modulation scheme and a Quadrature Amplitude modulation (QAM) scheme. The active repeater device 102 may be configured to convert the received first set of IQ signals to a first set of coded data signals.

The first set of coded data signals may comprise a plurality of data packets, arranged as a sequence of frames. Each of the sequence of frames may comprise a header portion and a data portion. The sequence of frames may comprise data frames provided in the data portion and control frames provided in the header portion. The active repeater device 102 may be configured to decode only the header portion of the first set of coded signals without demodulation of data stream in the received signal intended for end destination (i.e. the plurality of CPEs 107). The active repeater device 102 may be configured to extract control information from the first set of coded data signals based on the header portion of the first set of coded data signals. In accordance with an embodiment, the extracted control information may include Time Division Duplex (TDD) time slot information and beamforming information. The control information may further include frame structure and frame length information of the first set of coded data signals accessed from the header portion of the first set of coded data signals.

In accordance with an embodiment, the active repeater device 102 may be configured to receive a plurality of RF signals from each of the plurality of CPEs 107. The active repeater device 102 may be configured to measure Received Signal Strength Indicator (RSSI) associated with each of the plurality of RF signals received from the plurality of CPEs 107. The active repeater device 102 may be configured to estimate a location of each of the plurality of CPEs 107 with respect to the active repeater device 102. The active repeater device 102 may be further configured to estimate a distance of each of the plurality of CPEs 107 based on the measured RSSI. The active repeater device 102 may not be required to constantly or too frequently (such as less than a specified time period) measure the RSSI associated with each of the plurality of RF signals received from the plurality of CPEs 107. The measured RSSI associated with the plurality of CPEs 107, in combination with the location or a distance of each of the plurality of CPEs 107 from the active repeater device 102, may be also referred to as one or more signal parameters associated with the plurality of CPEs 107.

In a case where the switching multi-beam mode is selected, the active repeater device 102 may be configured to process the single reference stream of the first beam of input RF signals to extract the scheduling information associated with the TDMA based wireless signal transmission system. The active repeater device 102 may be configured to assign a different timeslot from a plurality of available timeslots to each of the plurality of CPEs 107, based on the scheduling information extracted from the received first beam of input RF signals. The plurality of available timeslots may comprise a first timeslot Ts1, a second timeslot Ts2, a third timeslot Ts3, and a fourth time slot Ts4. For example, the first timeslot Ts1, the second timeslot Ts2, the third timeslot Ts3, and the fourth time slot Ts4 may be assigned to the first CPE 107A, the second CPE 107B, the third CPE 107C, and the fourth CPE 107D respectively. Assignment of the plurality of timeslots to the plurality of CPEs 107 has been discussed in detail, for example, in FIGS. 1C and 1D. Each CPE of the plurality of CPE 107 may be configured to communicate with the active repeater device 102 exclusively or only during a corresponding timeslot assigned to the respective CPE, and may not communicate with the active repeater device 102 at other timeslots.

In the plurality of operating modes, such as the switching multi-beam mode, the concurrent multi-beam mode, the beam widening mode, or their combination, the active repeater device 102 may be configured to store a database comprising a plurality of beam settings. Each of the plurality of beam settings may correspond to a different beam profile of a plurality of different beams which may be generated by a second antenna array of a second RH unit of the active repeater device 102. However, timing of the generation and communication of the beams, shape of a beam or beam pattern, direction of beam, length of beam, depends on the selected (or set) operating mode of the plurality of operating mode, and the distribution of the UEs or CPEs to be serviced. Each of the plurality of beam settings comprises a set of beamforming coefficients. In accordance with an embodiment, the active repeater device 102 may be configured to assign a different beam setting from the plurality of beam settings to each of the plurality of CPEs 107, based on the one or more signal parameters associated with the plurality of CPEs 107. For example, a first beam setting, a second beam setting, a third beam setting, and a fourth beam setting of the plurality of beam settings, may be assigned to the first CPE 107A, the second CPE 107B, the third CPE 107C, and the fourth CPE 107D of the plurality of CPEs 107 respectively.

In accordance with an embodiment, the active repeater device 102 may be configured to generate output RF signals based on the first set of IQ signals. Further, the active repeater device 102 may be configured to generate a plurality of beams 110 which may correspond to the plurality of beam settings, based on the assignment of the plurality of beam setting to the plurality of CPEs 107. The generated plurality of beams 110 of output RF signals may comprise the first beam 110A, the second beam 110B, the third beam 110C, and the fourth beam 110D of output RF signals. The first beam 110A, the second beam 110B, the third beam 110C and the fourth beam 110D of output RF signals may be generated based on the first beam setting, the second beam setting, the third beam setting and the fourth beam setting, respectively.

If the set operating mode is the switching multi-beam mode, a second antenna array of the plurality of second antenna arrays of the second RH unit may be configured to transmit the plurality of beams 110 of output RF signals to the plurality of CPEs 107 by switching the plurality of beams 110 of output RF signals. The second antenna array may be configured to switch the plurality of beams 110 based on the assigned different timeslot and the assigned different beam setting to each of the plurality of CPEs 107. In accordance with an embodiment, the second antenna array of the second RH unit may be configured to transmit the first beam 110A of output RF signals to the first CPE 107A of the plurality of CPEs 107, exclusively during the first timeslot Ts1 assigned to the first CPE 107A, based the first beam setting assigned to the first CPE 107A, and based on the received first beam of input RF signals. Similarly, the second beam 110B, the third beam 110C and the fourth beam 110D of output RF signals may be transmitted exclusively to the second CPE 107B, the third CPE 107C, and the fourth CPE 107D respectively at the second timeslot Ts2, the third timeslot Ts3, and the fourth timeslot Ts4 respectively. Therefore, the active repeater device 102 may be configured to transmit a beam of output RF signals to a CPE of the plurality of CPEs 107 exclusively at a timeslot allotted to the respective CPE.

The switching of the plurality of beams 110 based on the assigned different timeslot and the assigned different beam setting may reduce power wastage by the active repeater device 102. As the active repeater device 102 may not transmit beams of output RF signals to CPEs of the plurality of CPEs 107, at timeslots which may not be assigned to the respective CPE, the active repeater device 102 may reduce the power wastage. Further, each beam of the plurality of beams 110, which may have been assigned to the plurality of CPEs 107, may be a narrow beam. Narrow beams may have larger transmission range in comparison to wide beams. Each beam of the plurality of beams 110 may be transmitted exclusively to a corresponding CPE of the plurality of CPEs 107. The active repeater device 102 may have larger transmission range in comparison to a conventional system (for example, a conventional base station) which may transmit a single wide beam of output RF signals to the plurality of CPEs 107.

If the set operating mode is the concurrent multi-beam mode, the active repeater device 102 may be configured to concurrently transmit the plurality of beams 110 of output RF signals to the plurality of CPEs 107. The full-bandwidth signal received from the base station 104 may be re-transmitted concurrently to the plurality of CPEs 107 over the plurality of beams 110 of output RF signals. The active repeater device 102 may be configured to concurrently transmit the plurality of beams 110 based on the assigned different beam setting to each of the plurality of CPEs 107. In one example, the plurality of beams 110 may be generated by a second antenna array of the plurality of second antenna arrays. In another example, the plurality of beams 110 may be generated by a set of second antenna arrays of the plurality of second antenna arrays. An example of a timing profile of resource block utilization in the active repeater device 102 for concurrent multi-beam transmission with the plurality of CPEs 107, is described, for example, in FIG. 1E. Further, an example of a timing profile of beams from the active repeater device 102 for concurrent multi-beam transmission with the plurality of CPEs 107, is described, for example, in FIG. 1F.

In the concurrent multi-beam mode, the active repeater device 102 may be configured to transmit each beam of the plurality of beams 110 of output RF signals exclusively to a corresponding CPE of the plurality of CPEs 107. For example, the active repeater device 102 may be configured to transmit the first beam 110A exclusively to the first CPE 107A. Similarly, the active repeater device 102 may be configured to transmit the second beam 110B, the third beam 110C, and the fourth beam 110D to the second CPE 107B, the third CPE 107C and the fourth CPE 107D, respectively. A conventional active repeater device may transmit a single beam of RF signals to communicate with the plurality of CPEs 107. In certain scenarios, the plurality of CPEs 107 may be scattered within a geographical area which may be significantly larger than a coverage area that may be covered by the single beam of RF signals transmitted by the conventional active repeater device. In such cases, one or more of the plurality of CPEs 107, which may be located outside the coverage area of the single beam of RF signals may fail to receive the single beam of RF signals transmitted by the conventional active repeater device. Each of the plurality of beams 110 of output RF signals transmitted by the active repeater device 102 may be generated by the active repeater device 102 to cover a location of a CPE to which the respective beam is transmitted. Each of the plurality of beams 110 of output RF signals transmitted by the active repeater device 102 may have a transmission range which may be larger in comparison with transmission range of the single beam transmitted by the conventional active repeater device. Hence, the active repeater device 102 may have significantly larger transmission range in comparison to the conventional active repeater device.

In accordance with one embodiment, the active repeater device 102 may comprise a cascading receiver chain comprising a first set of power dividers, a first set of phase shifters, a first set of low noise amplifiers, and the first antenna array. The active repeater device 102 may comprise a cascading transmitter chain comprising a first set of power combiners, a second set of phase shifters, a first set of power amplifiers, and the second antenna array. The first antenna array may comprise a first set of antenna elements. The second antenna array may comprise a second set of antenna elements. The active repeater device 102 may be configured to partition the second set of antenna elements of the second antenna array into a plurality of spatially separated antenna sub-arrays.

The second antenna array may be configured to generate a first set of beams of output RF signals based on the partition. Each of the plurality of spatially separated antenna sub-arrays may generate one or more of the first set of beams. Further, each beam of the plurality of beams 110 may be generated by super-position of the first set of beams of output RF signals with each other. In accordance with an embodiment, a multiple-input multiple-output (MIMO) based communication may be established between the base station 104 and the plurality of UE) by the active repeater device 102. The active repeater device 102 may establish the MIMO communication in a non-line-of-sight (NLOS) transmission path based on the receipt of the first beam of input RF signals having the first beam pattern from the base station 104. Further, the active repeater device 102 may be configured to establish the MIMO communication based on transmission of the plurality of beams 110 of output RF signals to the plurality of CPEs 107.

FIG. 1C illustrates a timing profile of resource block utilization of an exemplary active repeater device for switching multi-beam to communicate with a plurality of customer premises equipment (CPEs), in accordance with an exemplary embodiment of the disclosure. FIG. 1C is explained in conjunction with elements from FIG. 1B. With reference to FIG. 1C, there is shown a graphical representation 100C which depicts resource block allocation to each CPE of the plurality of CPEs 107 in frequency domain, with respect to the plurality of timeslots (such as the first timeslot Ts1, the second timeslot Ts2, the third timeslot Ts3, the fourth timeslot Ts4 and the fifth timeslot Ts5) in a transmission time period as discussed in FIG. 1. Time with may be represented by the "X" axis of the graphical representation 100C, as shown. Frequency spectrum corresponding to a plurality of resource blocks allocated to each of the plurality of CPEs 107 at different timeslots (such as the first timeslot Ts1, the second timeslot Ts2, the third timeslot Ts3, the fourth timeslot Ts4 and the fifth timeslot Ts5) may be represented by the "Y" axis of the first graphical representation 100C.

The active repeater device 102 may be configured to switch the plurality of beams 110 based on the assigned different timeslot and the assigned different beam setting to each of the plurality of CPEs 107. The active repeater device 102 may be configured to allocate a first set of resource blocks to the first CPE 107A at the first timeslot Ts1 (frequency spectrum allocated to the first CPE 107A as the first set of resource blocks is represented as graph component 112A). The active repeater device 102 may be configured to allocate a second set of resource blocks to the second CPE 107B at the second timeslot Ts2 (frequency spectrum allocated to the second CPE 107B as the second of resource blocks is represented as graph component 112B).

The active repeater device 102 may be configured to allocate a third set of resource blocks to the third CPE 107C at the third timeslot Ts3 (frequency spectrum allocated to the third CPE 107C as the third set of resource blocks is represented as graph component 112C). The active repeater device 102 may be configured to allocate a fourth set of resource blocks to the fourth CPE 107D at the first timeslot Ts1 (frequency spectrum allocated as the fourth set of resource blocks is represented as graph component 112D). The active repeater device 102 may be configured to then allocate a fifth set of resource blocks to the first CPE 107A at a fifth timeslot Ts5 (frequency spectrum allocated as the fifth set of resource blocks is represented as graph component 112E), and thus the cycle may continue until all data is communicated.

FIG. 1D illustrates a timing profile of beams of an exemplary active repeater device for switching multi-beam to communicate with a plurality of CPEs, in accordance with an exemplary embodiment of the disclosure. FIG. 1D is explained in conjunction with elements from FIGS. 1B, and 1C. With reference to FIG. 1D, there is shown a graphical representation 100D which depicts beam allocation to each CPE of the plurality of CPEs 107, with respect to the plurality of timeslots (such as the first timeslot Ts1, the second timeslot Ts2, the third timeslot Ts3, the fourth timeslot Ts4 and the fifth timeslot Ts5) in the transmission time period as discussed in FIGS. 1B and 1C.

Time may be represented by the "X" axis of the graphical representation 100D, as shown. Beams allocated to each of the plurality of CPEs 107 may be represented by the "Y" axis of the graphical representation 100D. In accordance with an embodiment, the active repeater device 102 may be configured to transmit the first beam 110A (Beam 1) of output RF signals to the first CPE 107A of the plurality of CPEs 107, during the first timeslot Ts1 (as represented by graph component 114A). The active repeater device 102 may be configured to transmit the second beam 110B (Beam 2) of output RF signals to the second CPE 107B of the plurality of CPEs 107, during the second timeslot Ts2 (as represented by graph component 114B). The active repeater device 102 may be configured to transmit the third beam 110C (Beam 3) of output RF signals to the third CPE 107C of the plurality of CPEs 107, during the third timeslot Ts3 (as represented by graph component 114C). The active repeater device 102 may be configured to transmit the fourth beam 110D (beam 4) of output RF signals to the fourth CPE 107D of the plurality of CPEs 107, during the fourth timeslot Ts4 (as represented by graph component 114D). Thereafter, the active repeater device 102 may be configured to transmit the first beam 110A (Beam 1) of output RF signals to the first CPE 107A of the plurality of CPEs 107, during the fifth timeslot Ts5 (as represented by graph component 114E). Thus, as shown for example, the active repeater device 102 may be configured to transmit a beam of output RF signals to a CPE of the plurality of CPEs 107 exclusively at a timeslot allotted to the respective CPE.

The active repeater device 102 may not transmit beams of output RF signals to CPEs of the plurality of CPEs 107, at timeslots which may not be assigned to the respective CPE. Thus, the active repeater device 102 may reduce power wastage. Each beam of the plurality of beams 110, which may have been assigned to the plurality of CPEs 107, may be a narrow beam. Narrow beams may have larger transmission range in comparison to wide beams. Each beam of the plurality of beams 110 may be transmitted exclusively to a corresponding CPE of the plurality of CPEs 107. The active repeater device 102 may have larger transmission range in comparison to a conventional system (for example, a conventional base station) which may transmit a single wide beam of output RF signals to the plurality of CPEs 107.

Figure 1E:
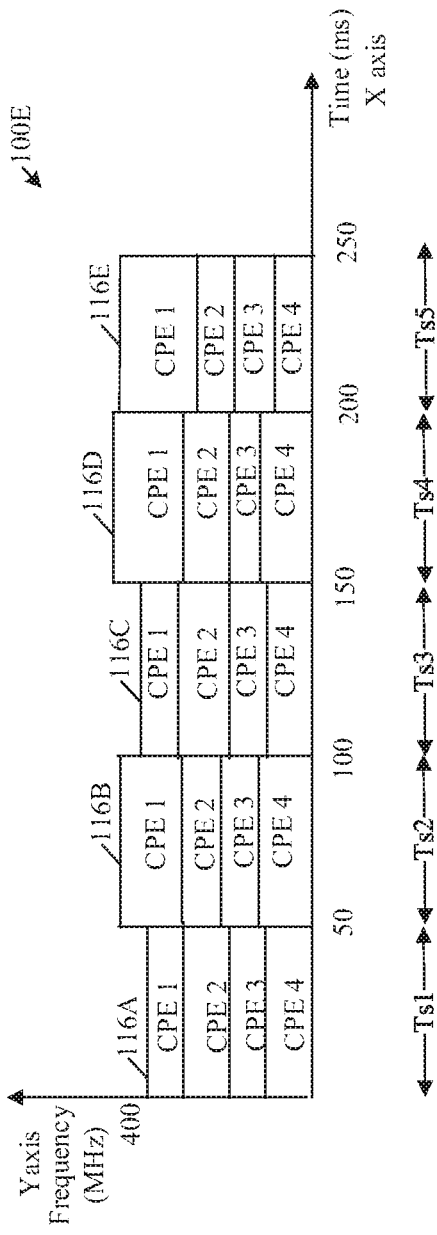
FIG. 1E illustrates a timing profile of resource block utilization of an exemplary active repeater device for concurrent multi-beam transmission with a plurality of customer premises equipment (CPEs), in accordance with an exemplary embodiment of the disclosure.

FIG. 1E illustrates a timing profile of resource block utilization of an exemplary active repeater device for concurrent multi-beam transmission with a plurality of customer premises equipment (CPEs), in accordance with an exemplary embodiment of the disclosure. With reference to FIG. 1E, there is shown a graphical representation 100E which depicts resource block allocation to each CPE (also represented as CPE 1, CPE 2, CPE 3, and CPE 4) of the plurality of CPEs 107 in frequency domain, with respect to the plurality of timeslots (such as the first timeslot Ts1, the second timeslot Ts2, the third timeslot Ts3, the fourth timeslot Ts4 and the fifth timeslot Ts5) in the transmission time period as discussed in FIG. 1B. Time with respect to may be represented by the "X" axis of the graphical representation 100E, as shown. Frequency spectrum corresponding to a plurality of resource blocks allocated to each of the plurality of CPEs 107 at different timeslots (such as the first timeslot Ts1, the second timeslot Ts2, the third timeslot Ts3, the fourth timeslot Ts4 and the fifth timeslot Ts5) may be represented by the "Y" axis of the graphical representation 100E.

The active repeater device 102 may be configured to allocate one or more of a first set of resource blocks to the plurality of CPEs 107, for the first timeslot Ts1 (frequency spectrum allocated to the plurality of CPEs 107 as the first set of resource blocks is represented as graph component 116A). The active repeater device 102 may be configured to allocate one or more of a second set of resource blocks to the plurality of CPEs 107, for the second timeslot Ts2 (frequency spectrum allocated to the plurality of CPEs 107 as the first set of resource blocks is represented as graph component 116B). The active repeater device 102 may be configured to allocate one or more of a third set of resource blocks to the plurality of CPEs 107, for the third timeslot Ts3 (frequency spectrum allocated to the plurality of CPEs 107 as the third set of resource blocks is represented as graph component 116C). The active repeater device 102 may be configured to allocate one or more of a fourth set of resource blocks to the plurality of CPEs 107, for the fourth timeslot Ts1 (frequency spectrum allocated to the plurality of CPEs 107 as the fourth set of resource blocks is represented as graph component 116D). The active repeater device 102 may be configured to allocate one or more of a fifth set of resource blocks to the plurality of CPEs 107, for the fifth timeslot Ts5 (frequency spectrum allocated to the plurality of CPEs 107 as the fifth set of resource blocks is represented as graph component 116E).

Figure 1F:
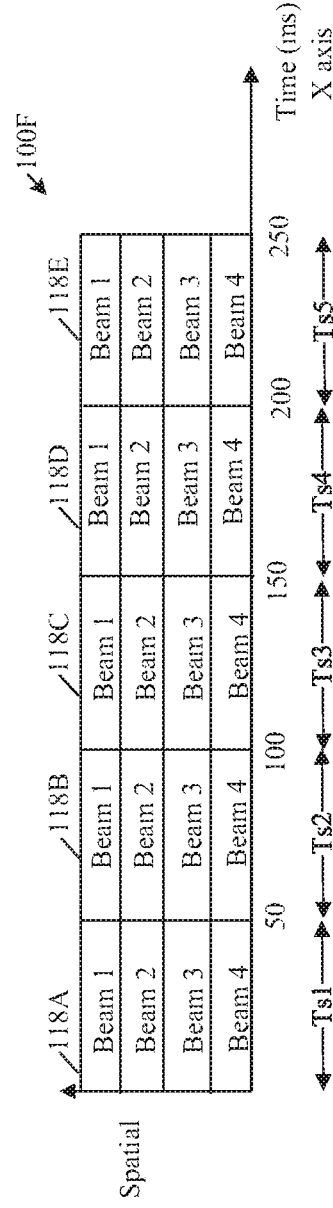
FIG. 1F illustrates a timing profile of beams of an exemplary active repeater device for concurrent multi-beam transmission to communicate with a plurality of CPEs, in accordance with an exemplary embodiment of the disclosure.

FIG. 1F illustrates a timing profile of beams of an exemplary active repeater device for concurrent multi-beam transmission to communicate with a plurality of CPEs, in accordance with an exemplary embodiment of the disclosure. With reference to FIG. 1F, there is shown a second graphical representation 100F which depicts beam allocation to each CPE (also represented as CPE 1, CPE 2, CPE 3, and CPE 4) of the plurality of CPEs 107, with respect to the plurality of available timeslots (such as the first timeslot Ts1, the second timeslot Ts2, the third timeslot Ts3, the fourth timeslot Ts4 and the fifth timeslot Ts5) in the transmission time period as discussed in FIG. 1B.

Time may be represented by the "X" axis of the graphical representation 100F, as shown. Beams allocated to each of the plurality of CPEs 107 may be represented by the "Y" axis of the graphical representation 100F. In accordance with an embodiment, the active repeater device 102 may be configured to transmit the plurality of beams 110 of output RF signals to the plurality of CPEs 107 based on the first set of beam settings during the first timeslot Ts1 (as represented by graph component 118A). The active repeater device 102 may be configured to transmit the plurality of beams 110 of output RF signals to the plurality of CPEs 107 based on the second set of beam settings during the second timeslot Ts2 (as represented by graph component 118B). The active repeater device 102 may be configured to transmit the plurality of beams 110 of output RF signals to the plurality of CPEs 107 based on the third set of beam settings during the third timeslot Ts3 (as represented by graph component 118C). The active repeater device 102 may be configured to transmit the plurality of beams 110 of output RF signals to the plurality of CPEs 107 based on the fourth set of beam settings during the fourth timeslot Ts4 (as represented by graph component 118D). The active repeater device 102 may be configured to transmit the plurality of beams 110 of output RF signals to the plurality of CPEs 107 based on the first set of beam settings during the fifth timeslot Ts5 (as represented by graph component 118E), and thus the cycle may continue until all data is communicated).

Figure 2A:
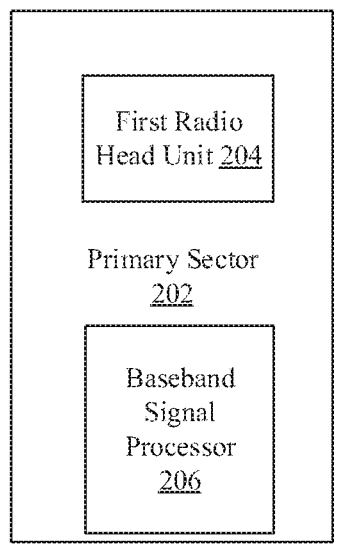
FIG. 2A is a block diagram illustrating an exemplary one-sector active repeater device, in accordance with an exemplary embodiment of the disclosure.

FIG. 2A is a block diagram illustrating an exemplary one-sector active repeater device, in accordance with an exemplary embodiment of the disclosure. FIG. 2A is explained in conjunction with elements from FIG. 1. With reference to FIG. 2A, there is shown a one-sector active repeater device that includes a primary sector 202 of the active repeater device 102. The primary sector 202 of the active repeater device 102 comprises a first radio head (RH) unit 204 and a baseband signal processor 206.

In some embodiments, the first RH unit 204 may be implemented in the active repeater device 102 as a radio head (RH) card. Similarly, the baseband signal processor 206 may be implemented in the active repeater device 102 as a baseband signal processing card or chip. Other examples of implementations of the RH card and the baseband signal processor card may include, but is not limited to an integrated circuit using a single or separate printed circuit boards (PCBs) as substrates, a radio frequency integrated chip (RFIC) and a system on a chip (SoC) device. The first RH unit 204 and the baseband signal processor 206 may be housed within the primary sector 202 of the active repeater device 102. The first RH unit 204 and the baseband signal processor 206 may be communicatively coupled with each other via a wired or wireless communication medium. The first RH unit 204 and the baseband signal processor 206 may communicate control signals and analog baseband signals with each other.

Figure 2B:
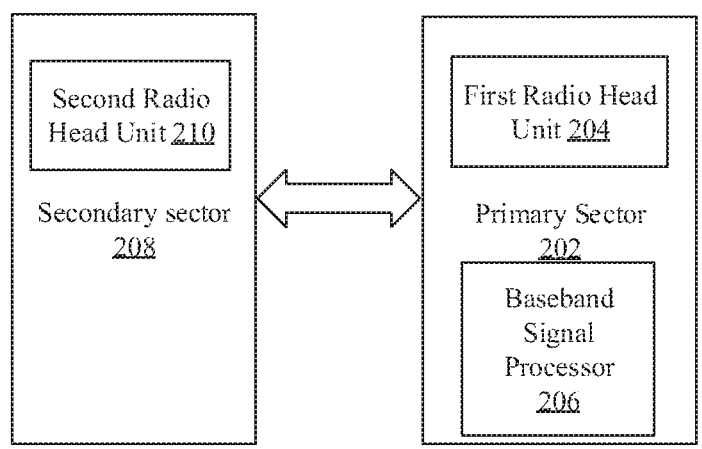
FIG. 2B is a block diagram illustrating an exemplary two-sector active repeater device, in accordance with an exemplary embodiment of the disclosure.

FIG. 2B is a block diagram illustrating an exemplary two-sector active repeater device, in accordance with an exemplary embodiment of the disclosure. FIG. 2B is explained in conjunction with elements from FIGS. 1 and 2A. With reference to FIG. 2B, there is shown a two-sector active repeater device that includes the primary sector 202 of the active repeater device 102 (of FIG. 2A) and a secondary sector 208. The secondary sector 208 may include a second RH unit 210. The second RH unit 210 may be similar to the first RH unit 204. The secondary sector 208 may be communicatively coupled with the primary sector 202 via one or more signal cables (e.g. a control signal cable and two baseband (IQ) signal cables).

Figure 2C:
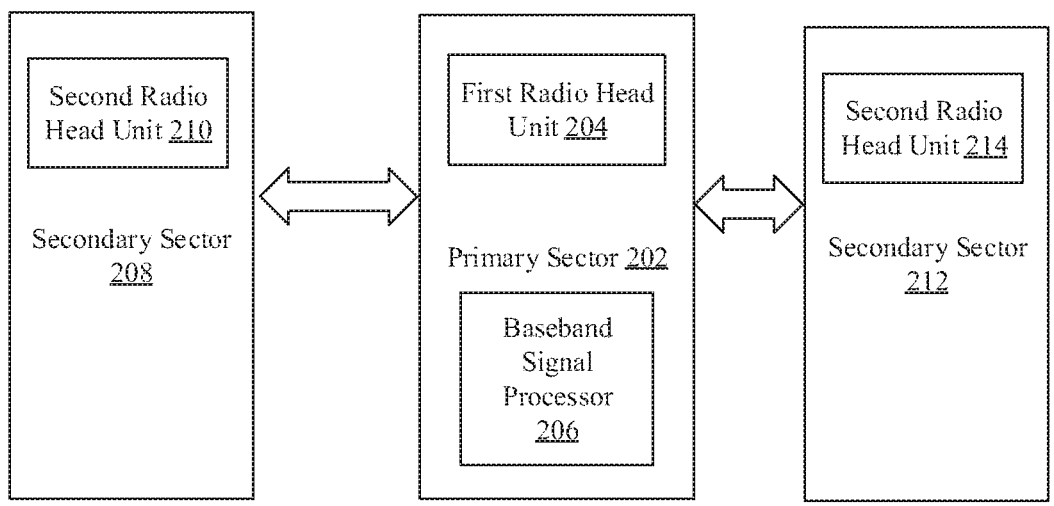
FIG. 2C is a block diagram illustrating an exemplary three-sector active repeater device, in accordance with an exemplary embodiment of the disclosure.

FIG. 2C is a block diagram illustrating an exemplary three-sector active repeater device, in accordance with an exemplary embodiment of the disclosure. FIG. 2C is explained in conjunction with elements from FIGS. 1, 2A, and 2B. With reference to FIG. 2C, there is shown a three-sector active repeater device that includes an additional secondary sector, such as a secondary sector 212, connected to the two-sector active repeater device of FIG. 2B. The secondary sector 212 may include a second RH unit 214 similar to the second RH unit 210. The secondary sector 212 may be communicatively coupled to the primary sector 202 via the one or more signal cables. As a result of this modular architecture, the active repeater device 102 may be upgradable or re-configurable to at least one of a base station (gNB), a small cell access point, or a remote radio head (RRH). The active repeater device 102 may be upgraded by replacing the baseband signal processor 206 with a suitable baseband unit (BBU) known in the art. The baseband signal processor 206 of the primary sector 202 may be configured to support multi-band millimeter wave (mm Wave) spectrum and sub-30 GHz spectrum concomitantly.

The baseband signal processor 206 of the primary sector 202 of the active repeater device 102 does not process (i.e., demodulate) data stream in the received signal intended for end destination (i.e. the plurality of UEs 106A and 106B). The data stream may also be referred to as the data portion of the received first beam of input RF signals. The baseband signal processor 206 may decode only the header portion of the received signal to extract control information without demodulation of data portion of the received signal. Conventional active repeaters are simply digital signal amplifiers, which may decode both the header portion and the data portion for amplification, which adds to latency in communication. Further, a conventional baseband unit (BBU) is voluminous, and is typically placed in an equipment room in mobile telecommunications systems and connected with remote radio head unit (RRU), via optical fiber. In contrast, the baseband signal processor 206 of the primary sector 202 of the active repeater device 102 may be implemented as the baseband signal processor card or chip, which is smaller in size and consumes less power in comparison with the conventional BBU. Thus, the baseband signal processor 206 may also be referred to as a light baseband unit (LBU) or a simplified baseband unit (BBU) that may be smaller in size as compared to a conventional BBU. The baseband signal processor 206 may thus be housed in the primary sector 202 of the active repeater device 102, as shown.

Figure 3:
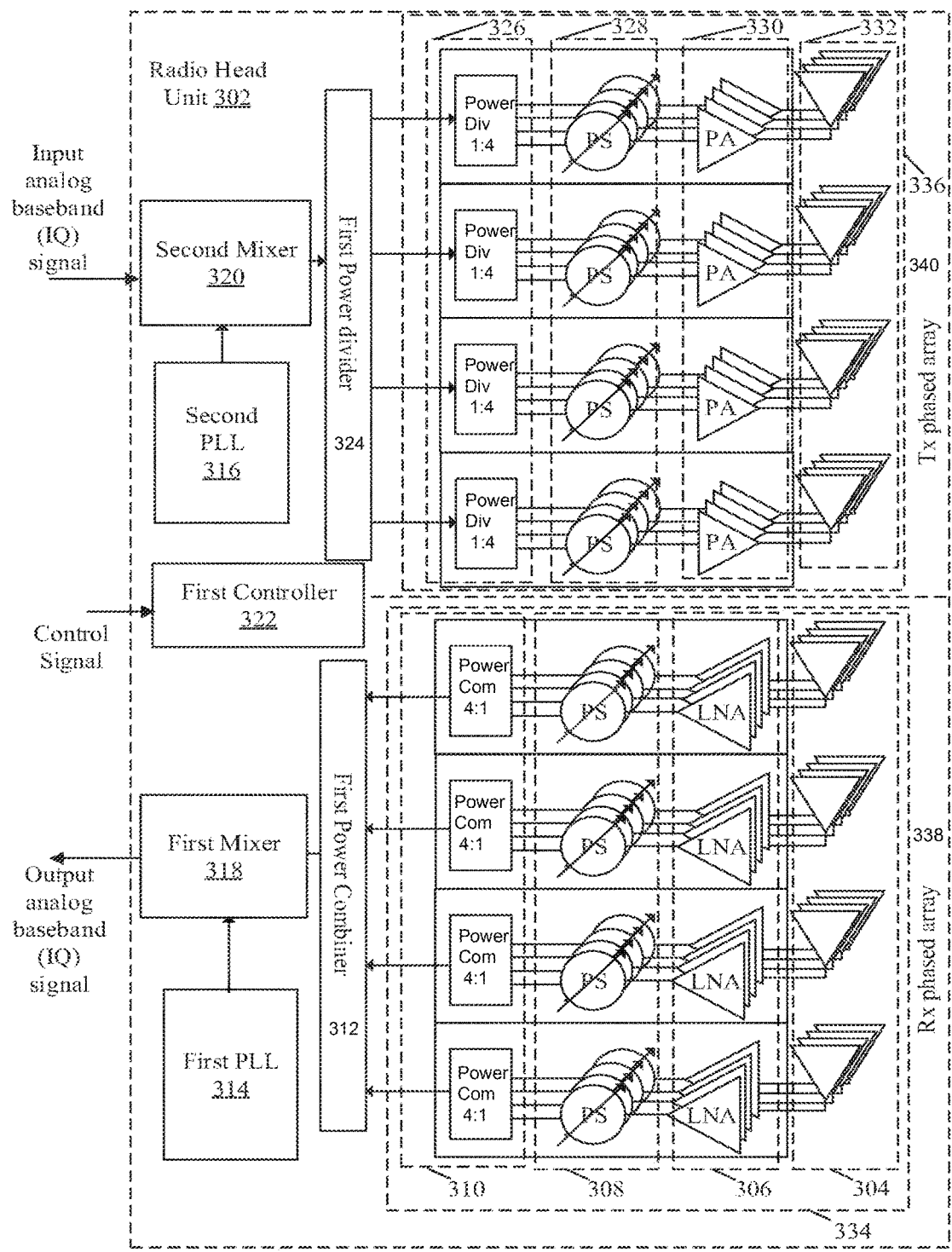
FIG. 3 depicts a circuit diagram illustrating various components of an exemplary radio head unit in an exemplary active repeater device for beam widening to communicate with a plurality of user equipment, in accordance with an exemplary embodiment of the disclosure.

FIG. 3 depict circuit diagrams illustrating various components of an exemplary radio head unit in the active repeater device, in accordance with an exemplary embodiment of the disclosure. FIG. 3 is explained in conjunction with elements from FIGS. 1, 2A, 2B, and 2C. With reference to FIG. 3, there is shown a radio head (RH) unit 302. The RH unit 302 may be one of the first RH unit 204, the second RH unit 210, the second RH unit 214 or any other radio head units in the active repeater device 102. The RH unit 302 comprises a receiver (Rx) phased array 338 and a transmitter (TX) phased array 340. The Rx phased array 338 may include a cascading receiver chain 334 comprising a first antenna array 304, a first set of low noise amplifiers (LNA) 306, a first set of phase shifters 308, and a first set of power combiners 310. The Tx phased array 340 may include a cascading transmitter chain 336 comprising a first set of power dividers 326, a first set of phase shifters 328, a first set of power amplifiers (PA) 330, and a second antenna array 332. There are is also shown a first power combiner 312, a first mixer 318, a second mixer 320, a first phase locked loop (PLL) 314, a second PLL 316, a first controller 322, and a first power divider 324 in the RH unit 302.

In accordance with an embodiment, the first antenna array 304 may be configured to receive the first beam of input RF signals having the first beam pattern from the base station 104. The first antenna array 304 may comprise a first set of antenna elements. The first antenna array 304 may be configured to receive the first beam of input RF signals using the first set of antenna elements. Examples of implementations of the first antenna array 304 may include, but is not limited to a planar phased array antenna, a frequency scanning phased array antenna, or a dynamic phased array antenna. The plurality of antenna elements in the first antenna array 304 may be communicatively coupled to one or more LNAs in the first set of LNAs 306.

The first set of LNAs 306 may be configured to amplify input RF signals received at the first antenna array 304. The first set of LNAs 306 may be configured to amplify input RF signals, which may have low-power, without significantly degrading corresponding signal-to-noise (SNR) ratio. Each of the first set of LNAs 306 may be communicatively coupled to phase shifters in the first set of phase shifters 308. The first set of phase shifters 308 may perform an adjustment in phase values of the input RF signals, till combined signal strength value of the received input RF signals, is maximized. In one example, the first set of phase shifters 308 may perform an adjustment in the phase value till each of the received input RF signals are in-phase with each other. Phase shifters in the first set of phase shifters 308 may be communicatively coupled to power combiners, such as a 4:1 power combiner, in the first set of power combiners 310. Further, each of the first set of power combiners 310 may be coupled to the first power combiner 312.

Each of the first set of power combiners 310 may be configured to combine each of the phase shifted input RF signals into a first set of RF signals. The first set of power combiners 310 may be configured to transmit the first set of RF signals to the first power combiner 312. The first power combiner 312 may be configured to combine the first set of RF signals to a first RF signal. The first power combiner 312 and the first set of power combiners 310 may comprise both active and passive combiners. Examples of implementation of the first power combiner 312 and the first set of power combiners 310 may include, but is not limited to resistive power combiners, and solid-state power combiners. The first power combiner 312 may be further configured to communicate the first RF signal to the first mixer 318.

The first mixer 318 may be configured to down convert the first RF signal to an output analogue baseband (IQ) signal. The first mixer 318 may be configured to down convert the first RF signal with a first frequency to the baseband signal based on mixing of a second frequency generated by a local oscillator with the first RF signal. The first mixer 318 may be communicatively coupled with the first PLL 314. The first PLL 314 in combination with the first mixer 318 may be configured to down convert the first Signal into an analog baseband quadrature (IQ) output signal. The first mixer 318 may be configured to communicate the IQ output signal to the baseband signal processor 206 via a first IQ signal cable.

The second mixer 320 may be configured to receive an analog baseband (IQ) input signal from the baseband signal processor 206 via the second IQ signal cable. Further, the second mixer 320 and the second PLL 316 may be configured to up convert the received IQ input signal to a second RF signal. The second mixer 320 may be configured to up convert the IQ input signal to the second RF signal based on mixing of a third frequency generated by a local oscillator (provided by the second PLL 3160 with the IQ input signal. The second mixer 320 may be communicatively coupled to the first power divider 324. Further, each of the first set of power dividers 326 may be communicatively coupled to the first power divider 324. The combination of the second mixer 320 and the second PLL 316 may be configured to transmit the second RF signal to the first power divider 324.

Figure 4:
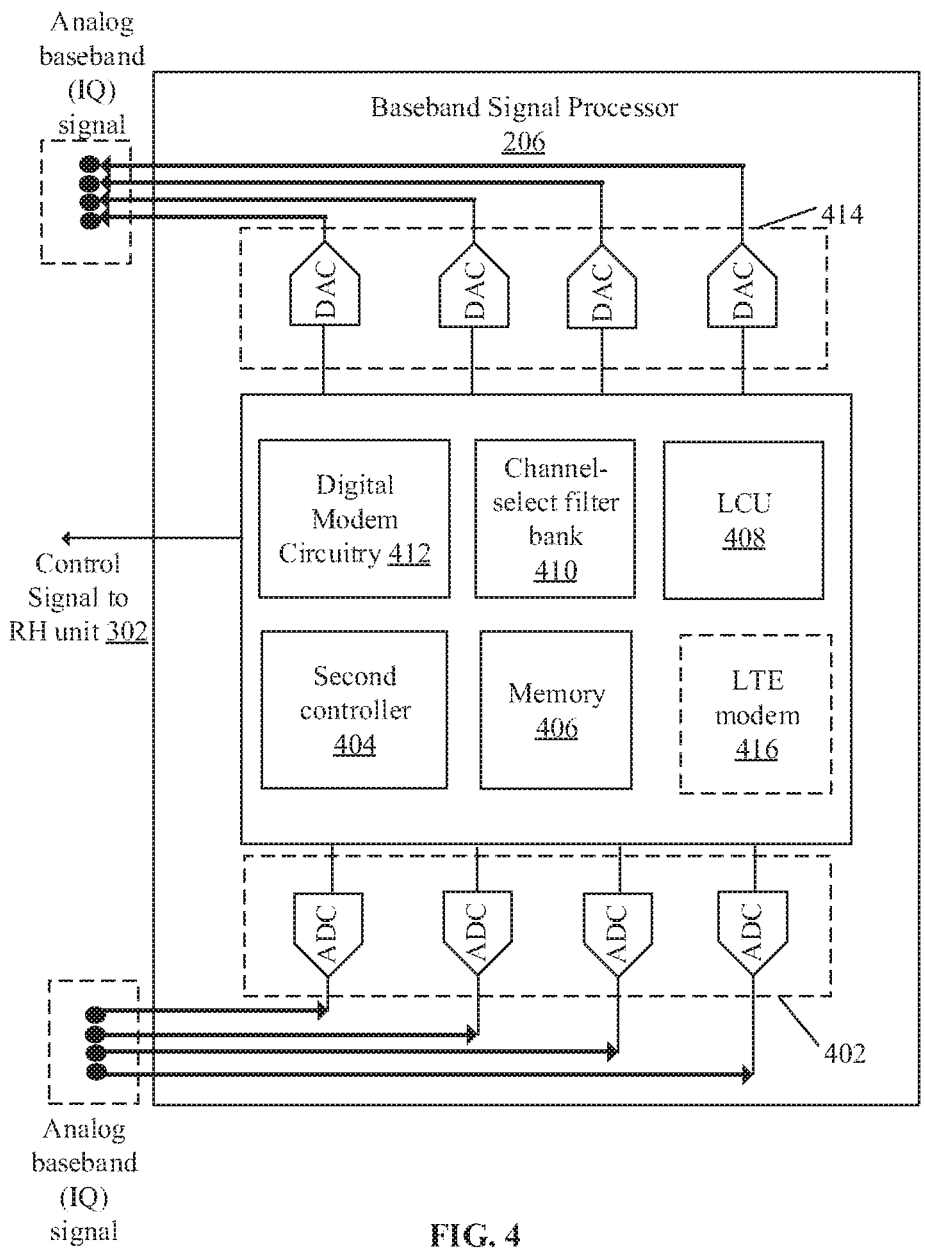
FIG. 4 depicts a block diagram illustrating various components of an exemplary baseband signal processor in an exemplary active repeater device for beam widening to communicate with a plurality of user equipment, in accordance with an exemplary embodiment of the disclosure.

The first controller 322 may be communicatively coupled to the baseband signal processor 206 via a control signal cable. The first controller 322 may be configured to receive one or more control signals from the baseband signal processor 206. The first controller 322 may be configured to adjust one or more parameters (e.g., amplifier gains, and phase responses) associated with the receiver (Rx) phased array 338 and the transmitter (Tx) phased array 340 based on the received one or more control signals. In one example, the first controller 322 may be configured to adjust amplifier gains of each of the first set of LNAs 306 and the first set of PAs 330 in the active repeater device 102. In another example, the first controller 322 may be configured to control each of the first set of phase shifters 308 and the second set of phase shifters 328, based on the received control signal. Further, the first controller 322 may be configured to receive beamforming coefficients from the baseband signal processor 206. The first controller 322, in association with the first set of phase shifters 308 and the first antenna array 304 may be configured to receive the first beam of input RF signals having the first beam pattern. The first controller 322 in association with the second set of phase shifters 328 and the second antenna array 332 may be configured to generate the second beam pattern to be communicated by the second antenna array 332 based on the received beamforming coefficients. In accordance with an embodiment, the first controller 322 may be configured to adjust phase shifts of a plurality of output RF signals using the second set of phase shifters 328 to generate a second beam of the plurality of output RF signals, based on the received control signal from the baseband signal processor 206 (FIG. 4).

The first power divider 324 may be configured to split the second RF signal received from the second mixer 320. In one example, the first power divider 324 may comprise one or more input differential pair and two cascode pairs that may split output current into two or more branches. In another example, the first power divider 324 may further compensate for RF signal loss to achieve an efficient RF power transfer. In another example, the first power divider 324 may be configured to split the second RF signal into a second set of RF signals. The first power divider 324 may be configured to communicate the second set of RF signals into the first set of power dividers 326. The first set of power dividers 326 may be configured to further split the second set of RF signals into a plurality of RF signals. The first set of power dividers 326 may be communicatively coupled to the second set of phase shifters 328.

The second set of phase shifters 328 may be configured to receive the plurality of RF signals from the first set of power dividers 326. The second set of phase shifters 328 may be configured to perform a phase shift on each of the plurality of RF signals for beam forming (e.g. synthesis of a wider beam) of the plurality of RF signals based on beamforming coefficients received from the baseband signal processor 206. The control information may be received by the first controller 322 and processed in conjunction with the second set of phase shifters 328. The second set of phase shifters 328 may be configured to transmit the plurality of phase shifted RF signals to the first set of PAs 330. The second set of phase shifters 328 may be configured to transmit the plurality of phase shifted RF signals to the first set of PAs 330.

The first set of PAs 330 may be configured to adjust an amplification gain of each of the plurality of RF signals on which phase shift has been performed by the second set of phase shifters 328. The amplification gain of each of the plurality of RF signals may be adjusted based on the control signal received from the first controller 322. The amplification gain of each of the plurality of RF signals may be adjusted based on the control signal received from the first controller 322. The first set of PAs 330 may be configured to transmit the plurality of RF signals to the second antenna array 332.

In accordance with an embodiment, the second antenna array 332 may be configured to transmit one or more beams having the second beam patterns (i.e. the widened beams) of the plurality of output RF signals to the plurality of UEs 106A, and 106B (downlink communication). In accordance with an embodiment, the second antenna array 332 may be a phased array antenna. The second antenna array 332 may comprise a second set of antenna elements. The second antenna array 332 may be configured to transmit the plurality of output RF signals by use of the second set of antenna elements. In accordance with an embodiment, the second antenna array 332 may be configured to relay the plurality of output RF signals to the base station 104 in a first beam pattern in the uplink communication. Examples of implementations of the first antenna array 304 may include, but is not limited to a linear phased array antenna, a planar phased array antenna, a frequency scanning phased array antenna, a dynamic phased array antenna, and a passive phased array antenna.

In operation, the first antenna array 304 may be configured to receive a first beam of input RF signals. In one example, the first antenna array 304 may be configured to receive the first beam of input RF signals from the base station 104. In one example, the active repeater device 102 may be configured to be activated when the first antenna array 304 receives the first beam of input RF signals from the base station 104 (or another active repeater device 102).

In a case where only the beam widening mode is set in the active repeater device 102, the active repeater device 102 may transmit a second beam of one or more output RF signals based on the received input RF signals, to the plurality of UEs 106A and 106B by the second antenna array 332 of the TX phased array 340. The first beam may have a first beam pattern and the second beam may have a second beam pattern. The first beam may be a narrow beam or a pencil beam, which may cover a first geographical area. The second beam having the second beam pattern may cover a second geographical area. The second beam pattern may be wider than the first beam pattern. Further, the second geographical area may be larger than the first geographical area covered by the first beam. The second geographical area may cover locations of the plurality of UEs 106A and 106B. A narrow beam (such as the first beam) may have higher transmission range but provides less coverage as compared to a widened beam (such as the second beam) that have comparatively lesser transmission range but provide greater coverage. In a case where the switching multi-beam mode is set, the second antenna array 332 of the TX phased array 340 may transmit the plurality of beams 110 of one or more output RF signals to the plurality of CPEs 107 by switching the plurality of beams 110 of output RF signals based on the assigned different timeslot and the assigned different beam setting to each of the plurality of CPEs 107, and the received first beam of input RF signals from the base station 104. In a case where the concurrent multi-beam mode is set, the second antenna array 332 of the TX phased array 340 (or one or more second antenna arrays) may be configured to concurrently transmit the plurality of beams 110 of output RF signals to the plurality of CPEs 107 based on the assigned different beam setting to each of the plurality of CPEs 107. A full-bandwidth signal received from the base station 104 is re-transmitted concurrently to the plurality of CPEs 107 over the plurality of beams 110 of output RF signals. In a case where the static beam mode is set, the second antenna array 332 of the TX phased array 340, under the control of a controller (such as the second controller 404 of FIG. 4), is further configured to re-transmit the first beam of input RF signals that received as a single narrow stream that covers a full frequency channel, over a single narrow beam of output RF signals in the first beam pattern (a narrow beam same as the received narrow beam from base station 104). This is done when the single beam of output RF signals is expected or known to cover all the plurality of CPEs 107 (or UEs).

The first set of LNAs 306 in the RH unit 302 may be configured to adjust a first amplification gain of each of the received input RF signals. In accordance with an embodiment, the first set of phase shifters 308 may be configured to perform a first phase shift on each of the input RF signals with the adjusted first amplification gain. It may be noted that the first amplification gain of the first set of LNAs 306 may be adjusted by the first controller 322 based on the received control signal from the baseband signal processor 206. Similarly, the first phase shifts of input RF signals may be adjusted by the first controller 322 using the first set of phase shifters 308 based on the received control signal from the baseband signal processor 206. In accordance with an embodiment, the first set of power combiners 310, and the first power combiner 312 in combination, may be configured to combine the input RF signals to generate the first RF signal. The first RF signal may be down converted by the combination of the first mixer 318 and the first PLL 314 to an IQ output signal. The IQ output signal may be communicated by the combination of the first mixer 318 and the first PLL 314 to the baseband signal processor 206 via an IQ signal cable.

Further, the second mixer 320 may be configured to receive the IQ input signal from the baseband signal processor 206 via a second IQ signal cable. In accordance with an embodiment, the IQ input signal may be up converted by the combination of the second mixer 320 and the second PLL 316 to a second RF signal. The first power divider 324 may be configured to split the second RF signal into a second set of RF signals. The first set of power dividers 326 may be configured to further split the second set of RF signals into one or more output RF signals. In accordance with an embodiment, the second set of phase shifters 328 may be configured to adjust phase values of each of the output RF signals. Furthermore, the first set of PAs 330 may be configured to adjust an amplification gain of each of the output RF signals on which phase shift has been performed by the second set of phase shifters 328. The second antenna array 332 may be configured to generate the second beam having the second beam pattern, based on the adjusted phase shifts and the adjusted amplification gains of each of the output RF signals. In accordance with an embodiment, the second antenna array 332 may be configured to transmit the second beam of the output RF signals having the second beam pattern to the plurality of UEs 106A and 106B. The second beam of the output RF signals having the second beam pattern corresponds to a wider beam as compared to the narrow beam (such as the first beam) received from the base station 104.

In accordance with an embodiment, the active repeater device 102 may function in a phase-only excitation beamforming mode. In the phase-only excitation beamforming mode, the generation of the second beam pattern by the second antenna array 332 may be based on the adjustment of the phase shifts of the output RF signals using the second set of phase shifters 328 by the first controller 322. The first controller 322 may be configured to generate the second beam pattern independent of amplitude tapering of the second antenna array 332. The active repeater device 102 may be configured to generate the second beam pattern exclusively based on adjusting phase shifts of output RF signals using the second set of phase shifters 328 and independent of changes in amplitude of the RF output signals. The first controller 322 may be configured to adjust the phase shifts based on a quadratic phase distribution scheme.

In accordance with an embodiment, the active repeater device 102 may function in an antenna sub-array superposition mode. In the sub-array antenna superposition mode, the first controller 322 may be configured to partition the second set of antenna elements of the second antenna array 332 into a plurality of spatially separated antenna sub-arrays. The second antenna array 332 may be configured to generate a first set of beams of output RF signals based on the partition. Each of the plurality of spatially separated antenna sub-arrays may generate one or more of the first set of beams. Further the second beam pattern may be generated by super-position of the first set of beams of output RF signals with each other. The second beam having the second beam pattern may be wider than the first beam having the first beam pattern. The second beam having the second beam pattern may cover a second geographical area. The second geographical area may be larger than the first geographical area covered by the first beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B independent of constantly tracking locations of each of the plurality of UEs 106A and 106B. In conventional systems, a process of constantly tracking location and orientation of each of the plurality of UEs 106A and 106B may consume communication bandwidth. The active repeater device 102 mitigates need for constantly tracking location and orientation of each of the plurality of UEs 106A and 106B to save communication bandwidth. Therefore, the active repeater device 102 may be configured to convert a narrow beam or a pencil-beam (such as the first beam having the first beam pattern) into a widened beam (such as the second beam having the second beam pattern).

FIG. 4 depicts a block diagram illustrating various components of an exemplary baseband signal processor in the active repeater device, in accordance with an exemplary embodiment of the disclosure. FIG. 4 is explained in conjunction with elements from FIGS. 1, 2A, 2B, 2C, and 3. With reference to FIG. 4, there is shown the baseband signal processor 206. The baseband signal processor 206 comprises a first set of analogs to digital converters (ADC) 402, a second controller 404, a memory 406, a transmitter receiver control sector-sector routing multiplexer logic control unit (hereafter referred to as Logical control unit 408 (LCU)), a channel-select filter bank 410, a digital modem circuitry 412, and a first set of digital to analog circuitry (DAC) 414. In some embodiments, the baseband signal processor 206 may also include a Long Term Evolution (LTE) modem 416. In some embodiments, the baseband signal processor 206 may not include the LTE modem 416. In accordance with an embodiment, the second controller 404 may be a digital signal processor. In accordance with an embodiment, the memory 406 may store code and logic which may correspond to a plurality of digital filters, a plurality of signal processing algorithms, a plurality of signal encoding algorithms, and a plurality of signal decoding algorithms. Further, the channel select filter bank 410 may comprise a plurality of channel select filters.

The baseband signal processor 206 may be communicatively coupled with one or more RH units (referred to as a first set of RH units) based on the implementation of the active repeater device 102 as the one-, two-, or three-sectored active repeater device as discussed in FIGS. 2A, 2B, and 2C. An example of RH units in the first set of RH units may include, but is not limited to the first RH unit 204, the second RH unit 210, and the second RH unit 214. The baseband signal processor 206 may be communicatively coupled to RH units in the first set of RH units via one or more IQ signal cables and control signal cables.

In operation, the baseband signal processor 206 may be configured to receive a first set of IQ analog signals from the first set of RH units. Each IQ signal of the first set of IQ signals may be received by the baseband signal processor 206, from a corresponding RH unit in the first set of RH units. Thereafter, the first set of ADCs 402 may be configured to convert the first set of analog IQ signals to the first set of coded data signals. Thus, in other words, the first set of coded data signals may correspond to input RF signals received from the base station 104 and the plurality of UEs 106A and 106B. The digital modem circuitry 412 may be configured to extract control information from the first set of coded data signals. It has been mentioned that the first set of coded data signal comprises a sequence of frames. The sequence of frames may comprise data frames and control frames. The digital modem circuitry 412 may be configured to demodulate only the header portions of frames in the first set of coded data signals to extract the control information, as discussed in FIG. 1.

In accordance with an embodiment, the second controller 404 may be configured to analyze the extracted control information to determine destination receivers for each of the first set of coded data signals. The destination receivers may be receivers of RF devices, to which the input RF signals associated with the first set of coded data signals are intended to be transmitted from a source transmitter. Examples of such RF devices may include, but is not limited to the plurality of UEs 106A and 106B, the base station 104, and/or any other active repeater devices. Further, the LCU 408 may be configured to assign each of the first set of coded data signals to one or more of the first set of RH units (the first RH unit 204, the second RH unit 210, and the second RH unit 214) based on the determined destination receivers. In accordance with an embodiment, the first set of DACs 414 may be configured to convert the first set of coded data signals to a second set of IQ analog signals. Each of the second set of IQ analog signals may correspond to a coded data signal in the first set of coded data signals. The baseband signal processor 206 may be configured to transmit each of the second set of IQ analog signals to one or more of the first set of RH units based on assignment of the first set of coded data signals by the LCU 408.

In certain scenarios where the input RF signals are received from the plurality of UEs 106A and 106B, a first set of coded data signals may be generated similar to input RF signals received from the base station 104, as discussed. In such cases, the second controller 404 in the baseband signal processor 206 may be configured to measure a received signal strength indicator (RSSI) of each of the first set of coded digital signals in digital domain. The second controller 404 may be further configured to filter the first set of coded data signals based on one or more channel select filters in the channel-select filter bank 410. The second controller 404 may be configured to suppress adjacent channel signals in the first set of coded data signals by applying the channel select filters on the first set of coded data signals. By suppression of the adjacent channel signals in the first set of coded data signals, the second controller 404 may be configured to increase accuracy of the RSSI measurement in digital domain.

In accordance with an embodiment, the second controller 404 may generate one or more control signals based on the extracted control information and the measured RSSI. The second controller 404 may transmit the generated control signals to one or more of the first set of RH units (the first RH unit 204, the second RH unit 210, and the second RH unit 214). The one or more control signals may be received by the first controller 322 in an RH unit (such as the RH unit 302) in the first set of RH units (the first RH unit 204, the second RH unit 210, and the second RH unit 214). The first controller 322 may be configured to adjust amplification gains of the first set of LNAs 306 of the Rx phased array 338 based on the received one or more control signals from the second controller 404. The second controller 404 may thereby, adjust gain distribution within the Rx phased array 338 based on the measured RSSI. Further, the first controller 322 may be configured to adjust amplitude gains of the first set of PAs 330 in the cascading transmitter chain 336, based on the received one or more control signals from the second controller 404. Alternatively stated, the second controller 404 in association with the first controller 322 may adjust gain distribution within the cascading receiver chain 334 based on the measured RSSI.

In accordance with an embodiment, the second controller 404 may generate one or more beamforming coefficients based on the extracted control information and the measured RSSI. The second controller 404 may transmit the generated beamforming coefficients to one or more of the first set of RH units (the first RH unit 204, the second RH unit 210, and the second RH unit 214). The generated beamforming coefficients may be received by the first controller 322 in an RH unit (such as the RH unit 302) in the first set of RH units (the first RH unit 204, the second RH unit 210, and the second RH unit 214). The first controller 322 in association with the first set of phase shifters 308 and the first antenna array 304 may be configured to generate a first beam pattern in the first antenna array 304 based on the generated beamforming coefficients. The first controller 322 in association with the second set of phase shifters 328 and the second antenna array 332 may be configured to generate the second beam pattern in the second antenna array 332 based on the generated beamforming coefficients.

The second beam generated at the second antenna array 332 based on the generated beamforming coefficients may be wider than the first beam generated at the first antenna array 304. A first geographical area covered by the first beam may be smaller than a second geographical area covered by the second beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B independent of constantly tracking locations of each of the plurality of UEs 106A and 106B. Therefore, the active repeater device 102 may be configured to convert a narrow beam or a pencil-beam (such as the first beam having the first beam pattern) into a widened beam (such as the second beam having the second beam pattern). In accordance with an embodiment, the first controller 322 may be configured to adjust phase shifts of a plurality of output RF signals using the second set of phase shifters 328 to generate a second beam of the plurality of output RF signals, based on the received beamforming coefficients.

In accordance with an embodiment, the first controller 322 may be configured to partition a second set of antenna elements of the second antenna array 332 into a plurality of spatially separated antenna sub-arrays, based on the received one or more control signals. Alternatively stated, the second controller 404, in association with the first controller 322, may be configured to partition the second set of antenna elements of the second antenna array 332 into the plurality of spatially separated antenna sub-arrays. The second antenna array 332 may be configured to generate a first set of beams of output RF signals based on the partition. The second beam pattern may be generated by super-position of the first set of beams of output RF signals with each other. In some embodiments, the second controller 404 and the first controller 322 may be implemented as a single controller. In accordance with an embodiment, the LTE modem 416 may be configured to perform one or more tasks such as configuring and monitoring beamforming functions of the active repeater device 102. The LTE modem 416 may be further configured to perform timing synchronization and frequency synchronization with the base station 104 and the plurality of UEs 106A and 106B.

Figure 5A:
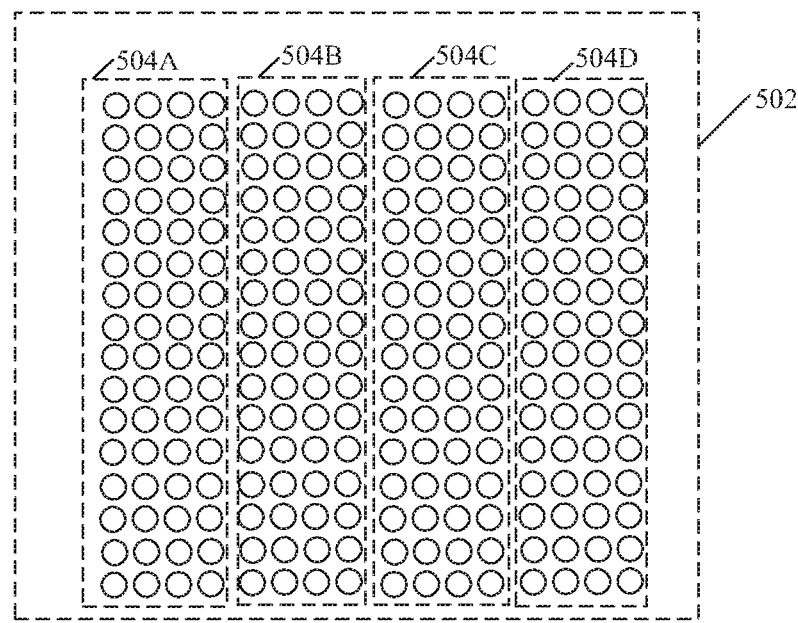
FIG. 5A depicts a block diagram illustrating a second antenna array in a secondary sector of an exemplary active repeater device, configured to generate a second beam based on superposition of antenna sub-arrays, in accordance with an exemplary embodiment of the disclosure.

FIG. 5A illustrates an exemplary antenna array in an exemplary active repeater device, in accordance with an exemplary embodiment of the disclosure. FIG. 5A is explained in conjunction with elements from FIGS. 1, 2A, 2B, 2C, 3, and 4. With reference to FIG. 5A, there is shown an antenna array 502 of the active repeater device 102. In one example, the antenna array 502 may correspond to the second antenna array 332 (FIG. 3). The antenna array 502 may comprise a set of antenna elements. The first controller 322 may be configured to partition the set of antenna elements of the antenna array 502 into a plurality of spatially separated antenna sub-arrays 504A, 504B, 504C, 504D. The plurality of spatially separated antenna sub-arrays 504A, 504B, 504C, 504D may comprise a first antenna sub-array 504A, a second antenna sub-array 504B, a third antenna sub-array 504C, and a fourth antenna sub-array 504D. The partition may be done dynamically and may be a logical partition.

In one example, the antenna array 502 may comprise 256 antenna elements and has 16 rows and 16 columns. Thus, each of the plurality of spatially separated antenna sub-arrays 504A, 504B, 504C, 504D may comprise 64 elements each. The antenna array 502 may be configured to generate a first set of beams of output RF signals based on the partition. Each of the first set of beams may be generated by a corresponding antenna sub array (i.e. the first antenna sub-array 504A, the second antenna sub-array 504B, the third antenna sub-array 504C, and the fourth antenna sub-array 504D) of the plurality of spatially separated antenna sub-arrays 504. Further, the second beam pattern is generated by super-position of the first set of beams of output RF signals with each other. Generation of the second beam pattern has been explained in detail, for example, in FIG. 5B and FIG. 5C.

Figure 5B:
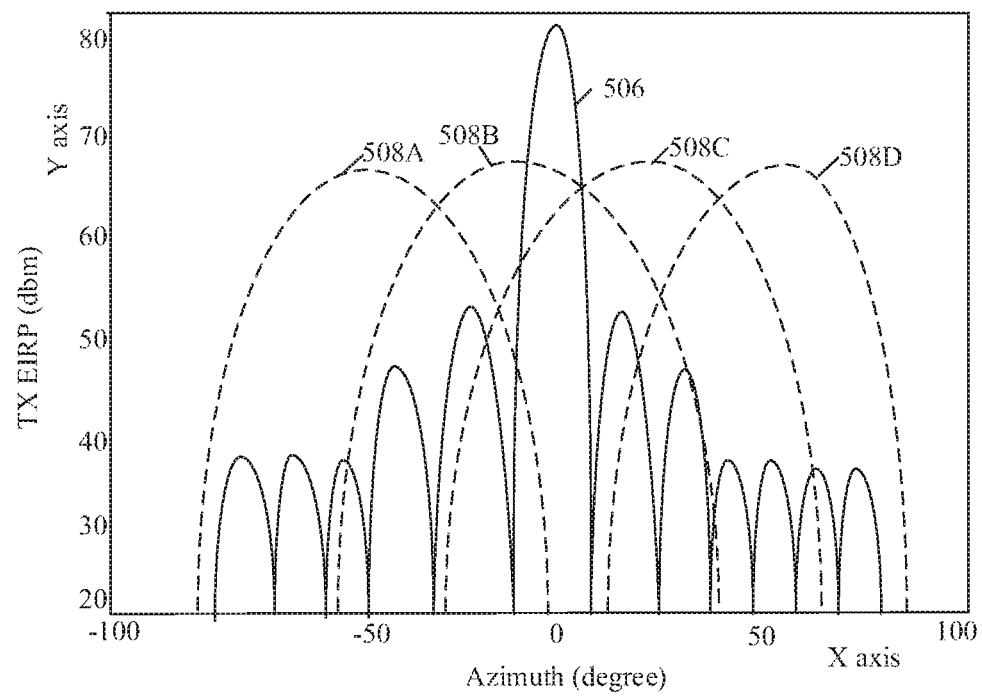
FIG. 5B depicts a first graph illustrating variation of effective isotropic radiated power (EIRP) with respect to azimuth angle of a second antenna array in an exemplary active repeater device for beam widening to communicate with a plurality of user equipment, in accordance with an exemplary embodiment of the disclosure.

FIG. 5B is a first graph illustrating effective isotropic radiated power (EIRP) of an exemplary antenna array in an exemplary active repeater device, in accordance with an exemplary embodiment of the disclosure. With reference to FIG. 5B, there is shown a first graph 500B which depicts EIRP of the antenna array 502 with respect to azimuth angle of the antenna array 502 of FIG. 5A. The azimuth angle with respect to a horizontal plane of the antenna array 502 may be represented by the "X" axis of the first graph 500B, as shown. The EIRP may be represented by the "Y" axis of the first graph 500B.

In certain scenarios, the antenna array 502 may be configured to generate a narrow beam (as represented by graph component 506). In other scenarios, the first controller 322 may be configured to partition the antenna array 502 into the plurality of spatially separated antenna sub-arrays 504. The antenna array 502 may be configured to generate the first set of beams 508A, 508B, 508C, and 508D based on the partition. The first antenna sub-array 504A (FIG. 5A) may be configured to generate a beam (EIRP of the generated beam is represented by graph component 508A) of the first set of beams. Similarly, the second antenna sub-array 504B, the third antenna sub-array 504C, and the fourth antenna sub-array 504D may be configured to generate respective beams (EIRP of the respective beams are represented by graph components 508B, 508C, and 508D respectively) of the first set of beams. In the concurrent multi-beam mode, each of the plurality of beams 110 of output RF signals may be generated by super-position of one or more of the first set of beams. The antenna array 502 may be configured to concurrently transmit the plurality of beams 110 of output RF signals to the plurality of CPEs 107 based on an assigned different beam setting to each of the plurality of CPEs 107.

Figure 5C:
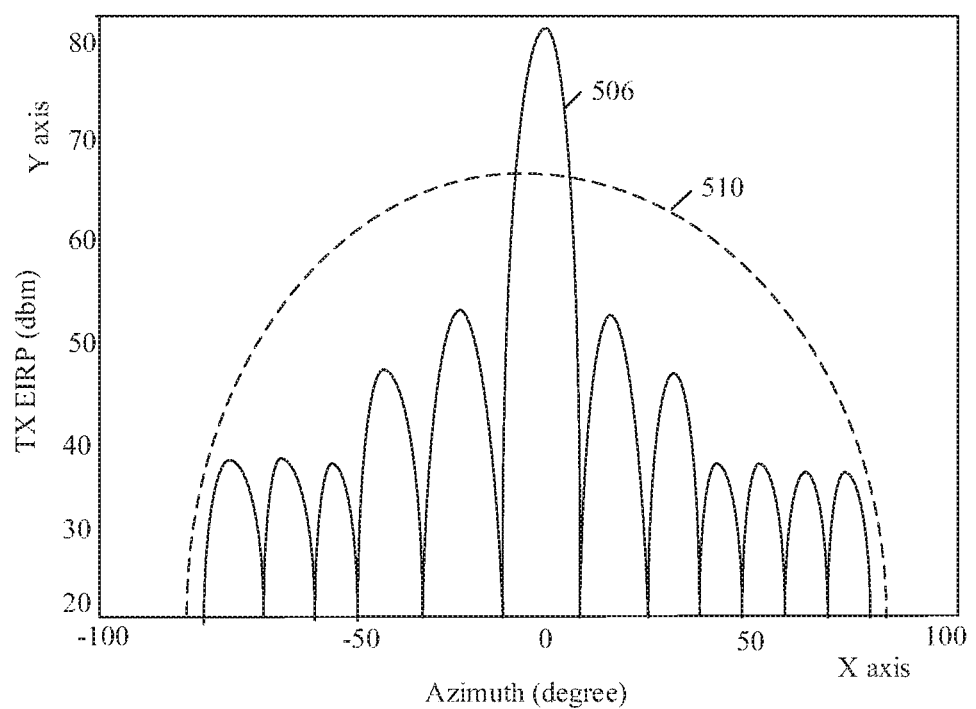
FIG. 5C depicts a second graph illustrating variation of effective isotropic radiated power (EIRP) with respect to azimuth angle of a second antenna array in an exemplary active repeater device for beam widening to communicate with a plurality of user equipment, in accordance with an exemplary embodiment of the disclosure.

FIG. 5C is a second graph illustrating effective isotropic radiated power (EIRP) of an exemplary antenna array in an exemplary active repeater device, in accordance with an exemplary embodiment of the disclosure. The first set of beams (represented by graph components 508A, 508B, 508C, and 508D (FIG. 5B) may superpose with each other to generate the second beam having the second beam pattern (a widened beam as represented by graph component 510). Further, in concurrent multi-beam mode, the antenna array 502 may be configured to concurrently transmit the plurality of beams 110 of output RF signals to the plurality of CPEs 106 based on an assigned different beam setting to each of the plurality of CPEs 107.

Figure 5D:
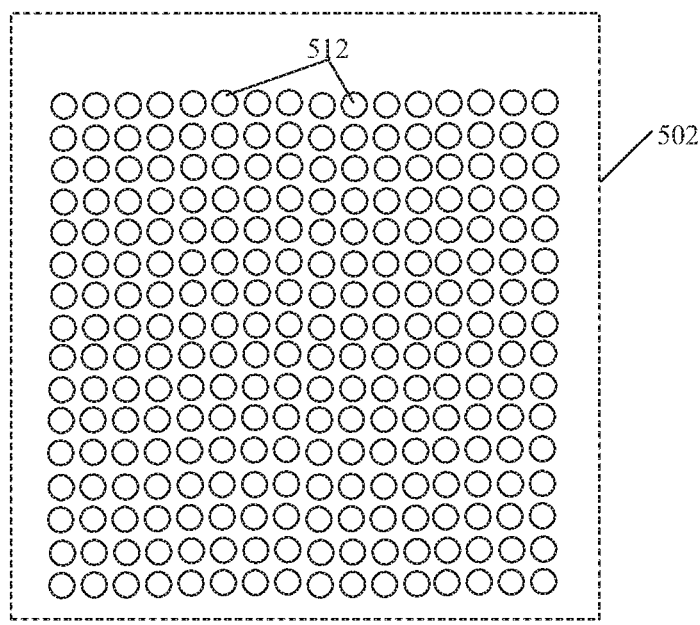
FIG. 5D depicts a block diagram illustrating a second antenna array of an exemplary active repeater device configured to generate a second beam based on phase-only excitation of antenna elements, in accordance with an exemplary embodiment of the disclosure.

FIG. 5D illustrates an exemplary antenna array in an exemplary active repeater device, in accordance with an exemplary embodiment of the disclosure. FIG. 5D is explained in conjunction with elements from FIGS. 1, 2A, 2B, 2C, 3, and 4. With reference to FIG. 5D, there is shown the antenna array 502 of the active repeater device 102. The antenna array 502 may comprise a plurality of antenna elements 512. Each of the plurality of antenna elements 512 may be coupled with the second set of phase shifters 328. The first controller 322 may be configured to adjust phase shifts of output RF signals using the second set of phase shifters 328 to generate the second beam of output RF signals, based on a predefined criterion. The generation of the second beam pattern by the second antenna array 332 is based on the adjustment of the phase shifts of the output RF signals using the second set of phase shifters 328 independent of changes in amplitude of the output RF signals. In case the concurrent multi-beam mode is set, the antenna array 502 may be configured to concurrently transmit the plurality of beams 110 of output RF signals to the plurality of CPEs 106 based on an assigned different beam setting to each of the plurality of CPEs 106.

Figure 6A:
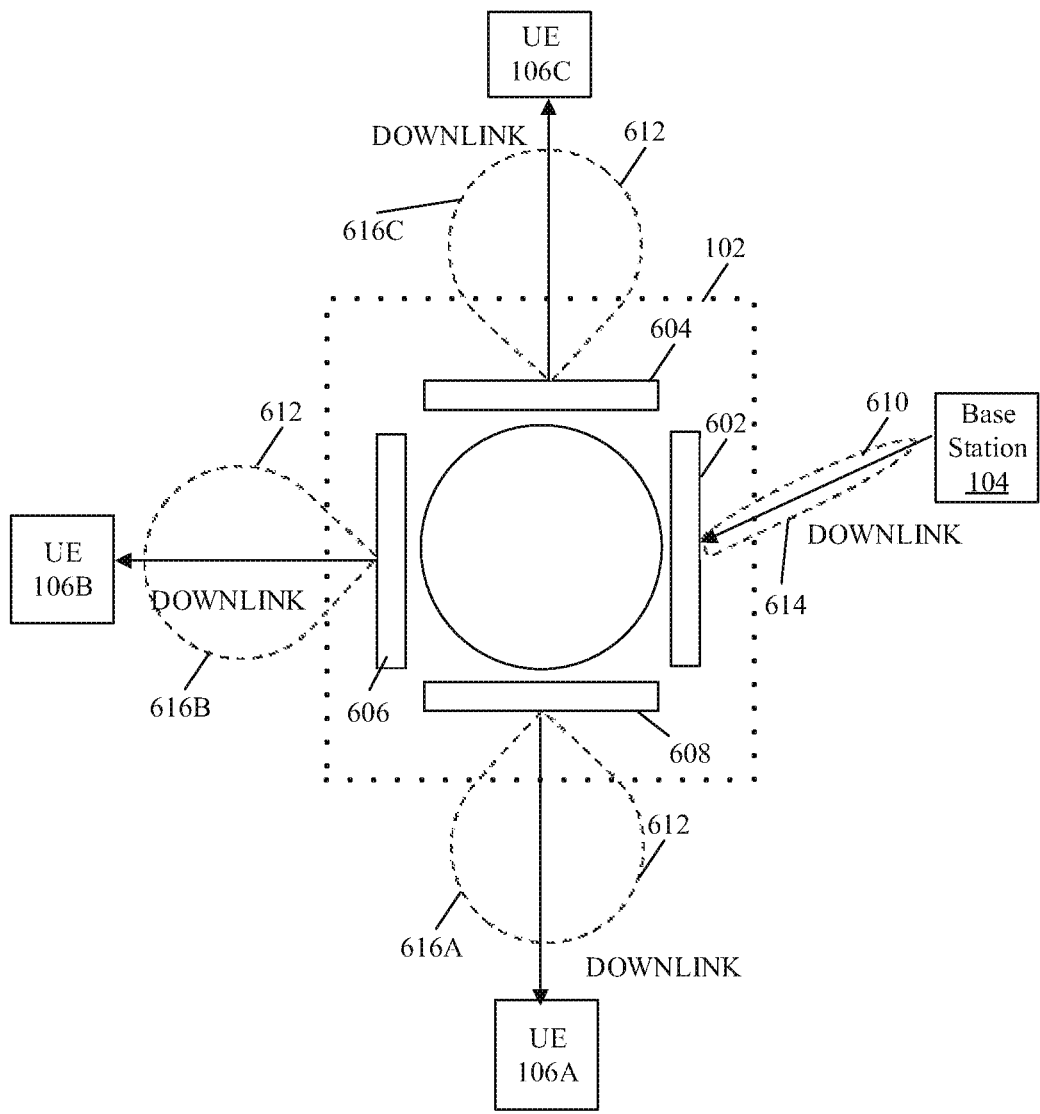
FIG. 6A illustrates a first exemplary scenario for implementation of the active repeater device, in accordance with an embodiment of the disclosure.

FIG. 6A illustrates a first exemplary scenario for implementation of the active repeater device, in accordance with an embodiment of the disclosure. FIG. 6A is explained in conjunction with elements from FIGS. 1, 2A, 2B, 2C, 3, 4, 5A, 5B, 5C, and 5D. The active repeater device 102 may comprise one or more sectors, such as, a primary sector 602, and one or more secondary sectors 604, 606, and 608. The primary sector 602 may correspond to the primary sector 202. The one or more secondary sectors 604, 606, and 608 may correspond to the secondary sectors 208 and 212. (FIGS. 2B and 2C).

The primary sector 602 and each of the one or more secondary sectors 604, 606, and 608, after installation at a defined location (e.g. around a post or pillar), may be configured to cover a portion of a 360-degree scan range for communication among the base station 104, the plurality of UEs 106A, 106B, and 106C, or another repeater device, as shown. The active repeater device 102 may receive a first beam of input RF signals having a first beam pattern 610 from the base station 104. The first beam of input RF signals may be a narrow beam or a pencil-beam.

In accordance with an embodiment, the second controller 404 of the baseband signal processor 206 may be configured to select at least one of the static beam mode, the beam widening mode, the switching multi-beam mode, the concurrent multi-beam mode, or one or more specified combination of the static beam mode, the beam widening mode, the switching multi-beam mode, and the concurrent multi-beam mode based on a change in the configuration setting in the memory 406. The selection may be based on a user-input to change the configuration setting at the active repeater device 102, or an automatic estimation of a number, distances, and a spatial distribution of the plurality of UEs or CPEs to be serviced, or a control command received from a control server (not shown or a base station 104) from a remote location that is different than an installation location of the active repeater device 102. Further, in some embodiments, the second controller 404 of the baseband signal processor 206 may be configured to reconfigure a beamforming function of the active repeater device 102 to switch between a first operating mode (e.g., a switching multi-beam mode) to a second operating mode (e.g., a concurrent multi-beam mode or other operating modes) of the plurality of operating modes based on the control command received from the control server or base station 104 from a remote location that is different than an installation location of the active repeater device 102.

In case where the beam widening mode is set (or selected), the second controller 404 of the baseband signal processor 206 may be configured to generate beamforming coefficients to convert the first beam pattern of the first beam of input RF signals to the second beam pattern for downlink communication. Each of the one or more secondary sectors 604, 606, and 608 may be configured to transmit a second beam of output RF signals in the second beam pattern 612 to a plurality of UEs based on the generated beamforming coefficients. The second beam pattern 612 may be wider than the first beam pattern 610. The second beam pattern 612 provides wider coverage than the first beam pattern 610.

In case where the switching multi-beam mode is set (or selected), the second controller 404 of the baseband signal processor 206 may be configured to assign a different timeslot from a plurality of available timeslots to each of the plurality of UEs 106A, 106B, and 106C (or plurality of CPEs 107 FIG. 1B), based on scheduling information in the received first beam of input RF signals. The second controller 404 of the baseband signal processor 206 may be configured to assign a different beam setting from the plurality of beam settings to each of the plurality of UEs 106A, 106B, and 106C (or plurality of CPEs 107 FIG. 1B), based on one or more signal parameters associated with the plurality of UEs 106A, 106B, and 106C (or plurality of CPEs 107 FIG. 1B). Each of the one or more secondary sectors 604, 606, and 608 may be communicatively coupled to the primary sector 602. The different beam setting may cause or lead to different beam shapes of a plurality of beams 616A, 616B, 616C of output RF signals (which corresponds to the plurality of beams 110 of output RF signals (FIG. 1B)) which may be generated by the one or more secondary sectors 604, 606, and 608. The plurality of beams 616A, 616B, 616C of output RF signals may comprise a first beam 616A, a second beam 616B, and a third beam 616C.

The second controller 404 may be configured to assign the different beam setting to each of the plurality of UEs 106A, 106B, and 106C (or plurality of CPEs 107 FIG. 1B) based on one or more parameters, such as location or RSSI, associated with each CPE of the plurality of CPEs 106. For example, the second controller 404 may assign beam settings to each UE (or CPE) of thee plurality of UEs 106A, 106B, and 106C (or plurality of CPEs 107 FIG. 1B) based on a particular distance of the respective UE (or CPE) from the active repeater device 102. In such cases, a beam of output RF signals which may be generated based on the assigned beam setting may have a coverage area comprising a location of the respective UE (or CPE). Therefore, it is advantageous that the active repeater device 102 may be configured to optimally transmit the output RF signals to the different UEs (or CPEs) in different beam shapes or beam pattern based on the assigned beam setting to each of the plurality of UEs 106A, 106B, and 106C (or plurality of CPEs 107 FIG. 1B). In accordance with an embodiment, the second controller 404 may assign beam settings to each CPE of the plurality of UEs 106A, 106B, and 106C (or plurality of CPEs 107 FIG. 1B) based on a set of resource blocks associated with the respective UE (or CPE). The beam of output RF signals to the respective UE (or CPE) may be optimized by the active repeater device 102 based on the assigned beam settings, to improve an overall spectral efficiency of transmission of the output RF signals to the respective UE (or CPE).

The one or more secondary sectors 604, 606, and 608 may be configured to generate the plurality of beams 616A, 616B, 616C of output RF signals based on the received input RF signals. The one or more secondary sectors 604, 606, and 608 may configured to transmit the plurality of beams 616A, 616B, 616C of output RF signals to the plurality of UEs 106A, 106B, and 106C (or plurality of CPEs 107 FIG. 1B) by switching the plurality of beams 616A, 616B, 616C of output RF signals based on the assigned different timeslot and the assigned different beam setting to each of the plurality of UEs 106A, 106B, and 106C (or plurality of CPEs 107 FIG. 1B), and the received first beam of input RF signals from the base station 104. Each of the plurality of beams 616A, 616B, 616C may have a second beam pattern 612. In some embodiments, the second beam pattern 612 may be of same beam shape. In some embodiments, each beam pattern resulting from a different beam setting may have different beam shapes (shown in FIG. 6B).

The one or more secondary sectors 604, 606, and 608 may be configured to switch the plurality of beams 616A, 616B, 616C of output RF signals based on the assigned different timeslot and the assigned different beam setting to each of the plurality of UEs 106A, 106B, and 106C (or plurality of CPEs 107 FIG. 1B). In accordance with an embodiment, the one or more secondary sectors 604, 606, and 608 may be configured to transmit the first beam 616A of output RF signals to the UE 106A of the plurality of UEs 106A, 106B, and 106C (or plurality of CPEs 107 FIG. 1B), exclusively during the first timeslot "Ts1" assigned to the UE 106A. The first beam 616A of output RF signals may be transmitted based the first beam setting assigned to the UE 106A, and based on the received first beam of input RF signals. Similarly, the second beam 616B, and the third beam 616C of output RF signals may be transmitted exclusively to the UE 106B and the UE 106C, respectively at the second timeslot "Ts2" and the third timeslot "Ts3" respectively. Therefore, the active repeater device 102 may be configured to transmit a beam of output RF signals to a UE (or CPE) of the plurality of UEs 106A, 106B, and 106C (or plurality of CPEs 107 FIG. 1B) exclusively at a timeslot allotted to the respective UE (or CPE).

The active repeater device 102 may not transmit beams of output RF signals to UEs (or CPEs) of the plurality of UEs 106A, 106B, and 106C (or plurality of CPEs 107 FIG. 1B), at timeslots which may not be assigned to the respective UE (or CPE). Thus, the active repeater device 102 may reduce power wastage. Further, the second beam pattern of each of the plurality of beams 616A, 616B, 616C may be narrow beam in comparison with wide beams used in conventional systems. Narrow beams may have larger transmission range in comparison to wide beams. Each beam of the plurality of beams 616A, 616B, 616C may be transmitted exclusively to a corresponding UE (or CPE) of the plurality of UEs 106A, 106B, and 106C (or plurality of CPEs 107 FIG. 1B). The active repeater device 102 may have larger transmission range in comparison to a conventional system (for example, a conventional base station) which may transmit a single wide beam of output RF signals to the plurality of UEs 106A, 106B, and 106C (or plurality of CPEs 107 FIG. 1B).

In case the concurrent multi-beam mode is set (or selected), the plurality of beams 616A, 616B, 616C of the output RF signals may be concurrently transmitted to the plurality of UEs 106A, 106B, and 106C (or plurality of CPEs 107 FIG. 1B) based on the assigned different beam setting to each of the plurality of UEs 106A, 106B, and 106C (or plurality of CPEs 107 FIG. 1B). The second antenna array (e.g. the second antenna array 332) in the one or more secondary sectors (such as the one or more secondary sectors 604, 606, and 608) may be configured to generate each beam of the plurality of beams 616A, 616B, 616C in the second beam pattern based on the generated beamforming coefficients and the received first beam of input RF signals. The full-bandwidth signal received from the base station 104 may be re-transmitted concurrently to the plurality of UEs 106A, 106B, and 106C (or plurality of CPEs 107 FIG. 1B) over the plurality of beams 616A, 616B, 616C of output RF signals.

Figure 6B:
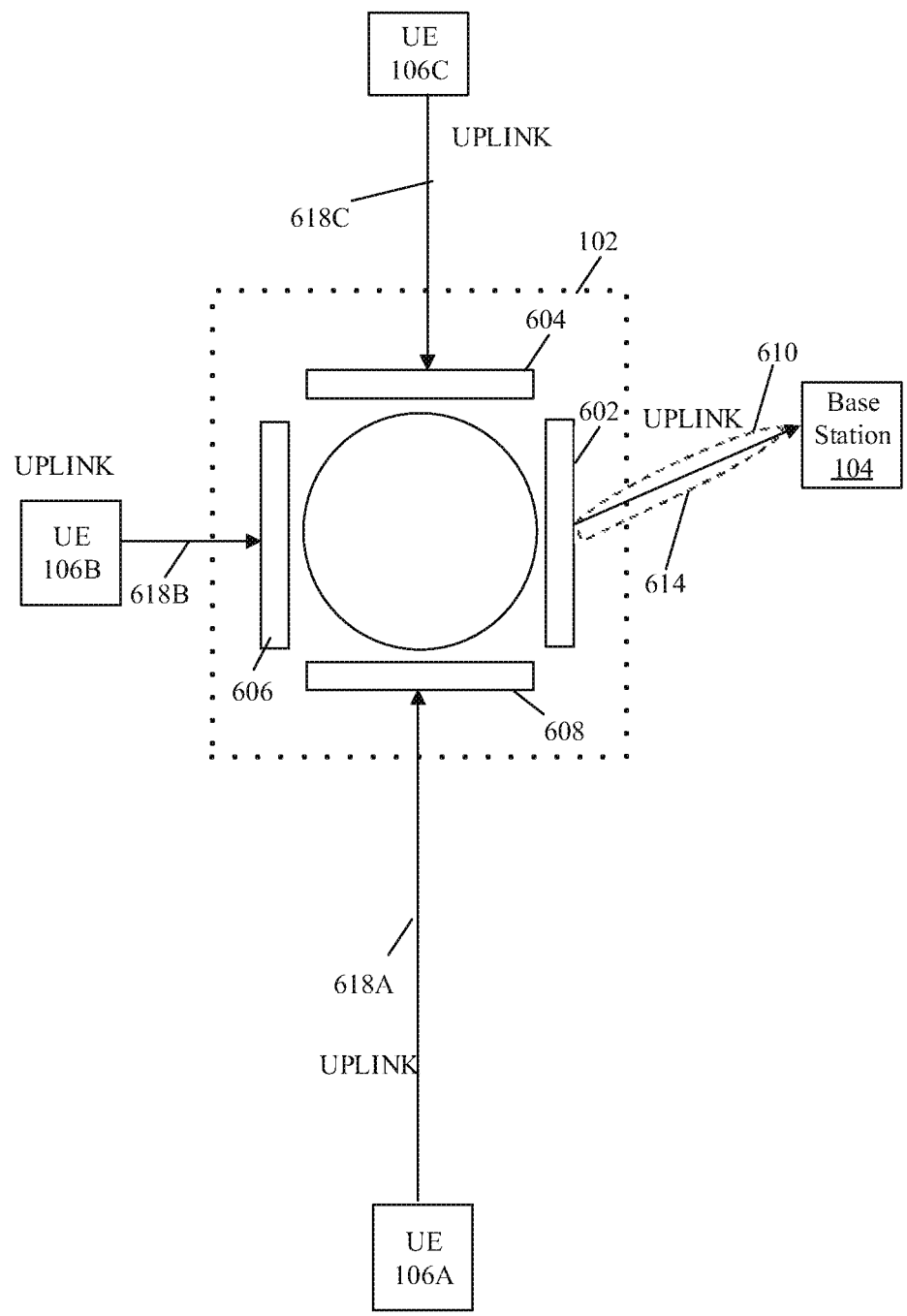
FIG. 6B illustrates a second exemplary scenario for implementation of the active repeater device, in accordance with an embodiment of the disclosure.

FIG. 6B illustrates a second exemplary scenario for implementation of the active repeater device, in accordance with an embodiment of the disclosure. The active repeater devices 102 may comprise a plurality of first antenna arrays (e.g. the first antenna array 304 in FIG. 3) and a plurality of second antenna arrays (e.g. the second antenna array 332 in FIG. 3) in primary sector 602 and the one or more secondary sectors (such as the secondary sector 604, the secondary sector 606, and the secondary sector 608). The plurality of first antenna arrays in the one or more secondary sectors 604, 606, and 608 may be configured to receive different input RF signals 618A, 618B, and 618C from the plurality of UEs 106A, 106B, and 106C (or plurality of CPEs 107 FIG. 1B) through different beam patterns and distances in an uplink communication, as shown. The received different input RF signals 618A, 618B, and 618C from the plurality of UEs 106A, 106B, and 106C may be superimposed by the primary sector 602. The primary sector 602 (e.g. the second antenna array 332 in the primary sector 602) may be configured to transmit the received different input RF signals to the base station 104 in the uplink communication as a single stream in the first beam pattern to achieve higher transmission range between the base station 104 and the active repeater device 102. The single stream may include full frequency channel that corresponds to the different input RF signals 618A, 618B, and 618C received from the plurality of UEs 106A, 106B, and 106C.

Figure 6C:
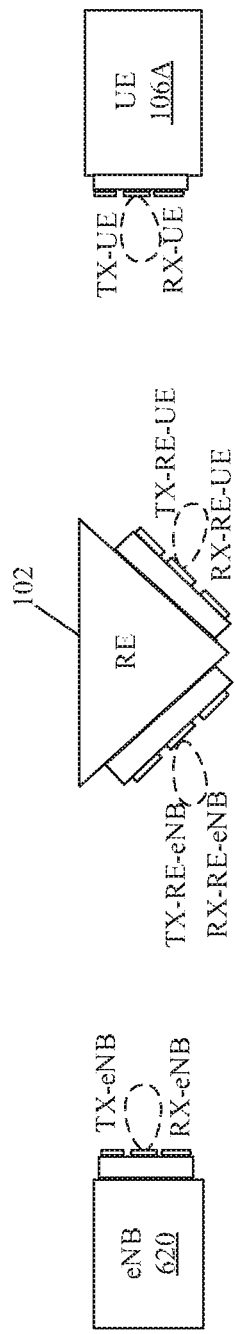
FIG. 6C illustrates an exemplary training of uplink/downlink beam patterns of an exemplary active repeater device, in accordance with an embodiment of the disclosure.

FIG. 6C illustrates an exemplary training of uplink/downlink beam patterns of an exemplary active repeater device, in accordance with an embodiment of the disclosure. With reference to FIG. 6C, there is shown the active repeater device 102, an eNB 620, and the UE 106A. The eNB 620 corresponds to the base station 104. In accordance with an embodiment, the complexity of beam search and refinement at the active repeater device 102 (also referred to as repeater equipment (RE)) may be manageable, due to the fact the beam configurations for the link between the eNB 620 and the active repeater device 102 (also represented as "RE") are static. Once the beams between the eNB 620 and the active repeater device 102 (also represented as "RE") are optimized and fine-tuned (at power up, or periodically at slow rate), there are only two beams to be optimized dynamically, namely the beams between the active repeater device 102 (also represented as "RE") and the UE 106A. This results in a beam search domain/complexity that is in the same order, if there were a direct link between the eNB 620 and the UE 106A. In FIG. 6C, the beams that are to be frequently trained and tuned, may be demonstrated. The beams corresponding to TX-eNB, RX-eNB, TX-RE-eNB, and RX-RE-eNB may require infrequent training/tuning as this link will experience infrequent changes. The only beams to be trained frequently will be TX-RE-UE, RX-RE-UE, TX-UE, and RX-UE. The same number of beams would have required frequent training if the UE 106A were connected to the eNB 620 directly.

In accordance with an embodiment, the RSSI and TSSI may be utilized by the active repeater device 102 to improve various aspects of both uplink/downlink connections. RSSI may be measured in analog domain and/or in digital domain depending on the type of implementation. RSSI measurements may be utilized for two purposes. Firstly, the RSSI is used to configure the optimal gain distribution within the receiver chain (e.g., cascading receiver chain 334). Secondly, it is used as part of transmit power control flow to adjust the transmit power of the cascading transmitter chain (e.g., the cascading transmitter chain 336). TSSI measurements may be performed by coupling onto the output of last stage power amplifiers in the transmitter chain (e.g., the cascading transmitter chain 336). TSSI is primarily used to calibrate absolute TX power levels and facilitate transmit power control (TPC) flows. Another utilization of RSSI is to adjust the relative power of signals corresponding to different UEs in uplink. Multiple-access based on Orthogonal frequency-division multiple access (OFDMA) in uplink requires careful control on relative power of signals associated with different UEs to ensure a user's adjacent leakage does not degrade the neighboring users within the same channel. This becomes particularly significant in the case of "concurrent multi-beam mode" implementation during uplink slots. In uplink time lots, different CPE signals are received through different beam patterns and/or distances. These signals are then superimposed by the repeater equipment and transported uplink to the eNB 620 (or the base station 104) as a single stream occupying the full channel. To improve and speed up the relative transmit power control procedure in uplink, the active repeater device 102 may use the RSSI measurements of signals received from different UEs to first equalize for gain differences (due to differences in distances and beam gains) before superimposing the signals and transporting them up to the eNB 620 (or the base station 104).

Figure 7A:
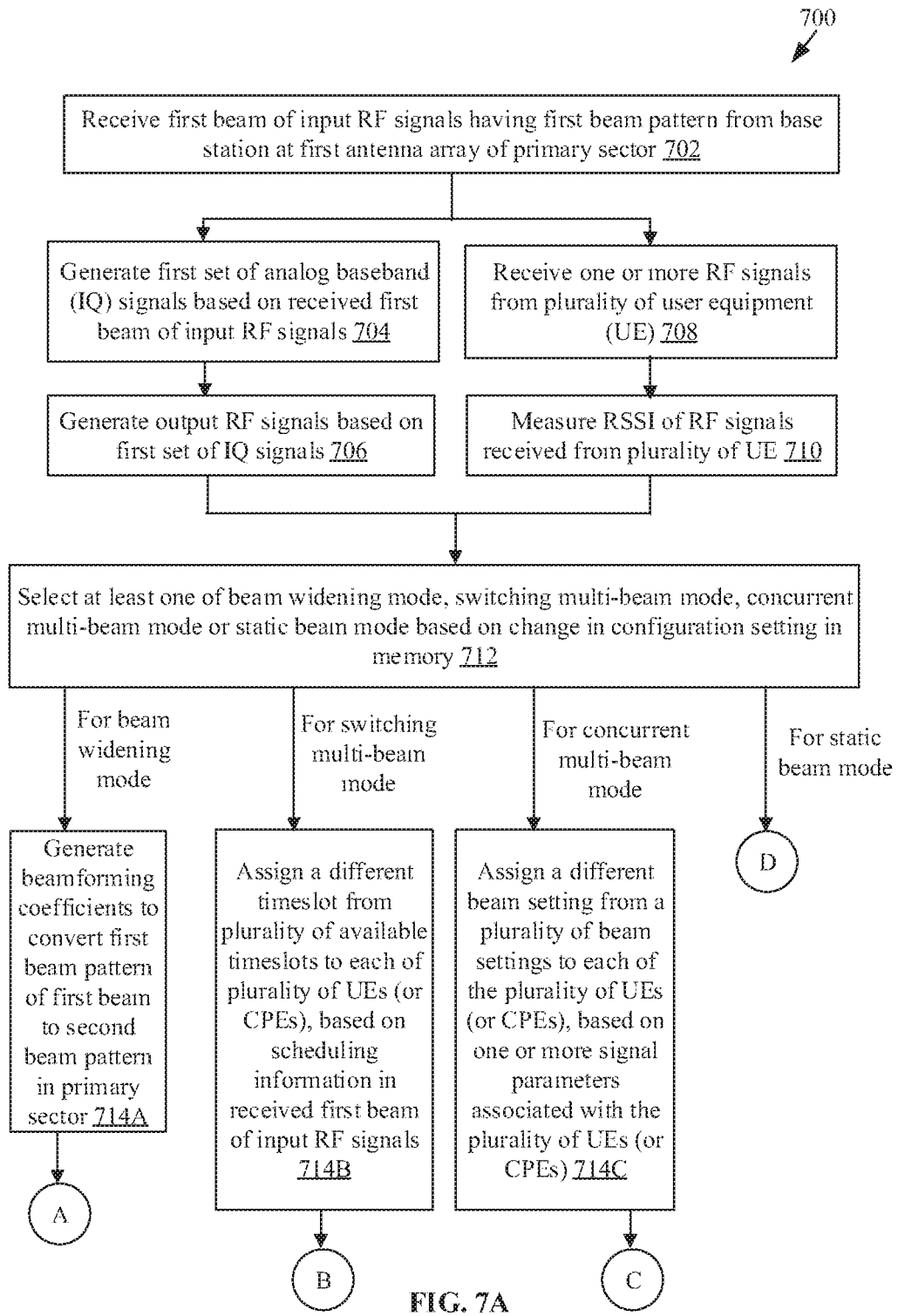
FIGS. 7A, 7B, and 7C collectively, depict a flow chart that illustrates an exemplary method of operating an exemplary active repeater device for beam widening to communicate with a plurality of user equipment, in accordance with an embodiment of the disclosure.
Figure 7B:
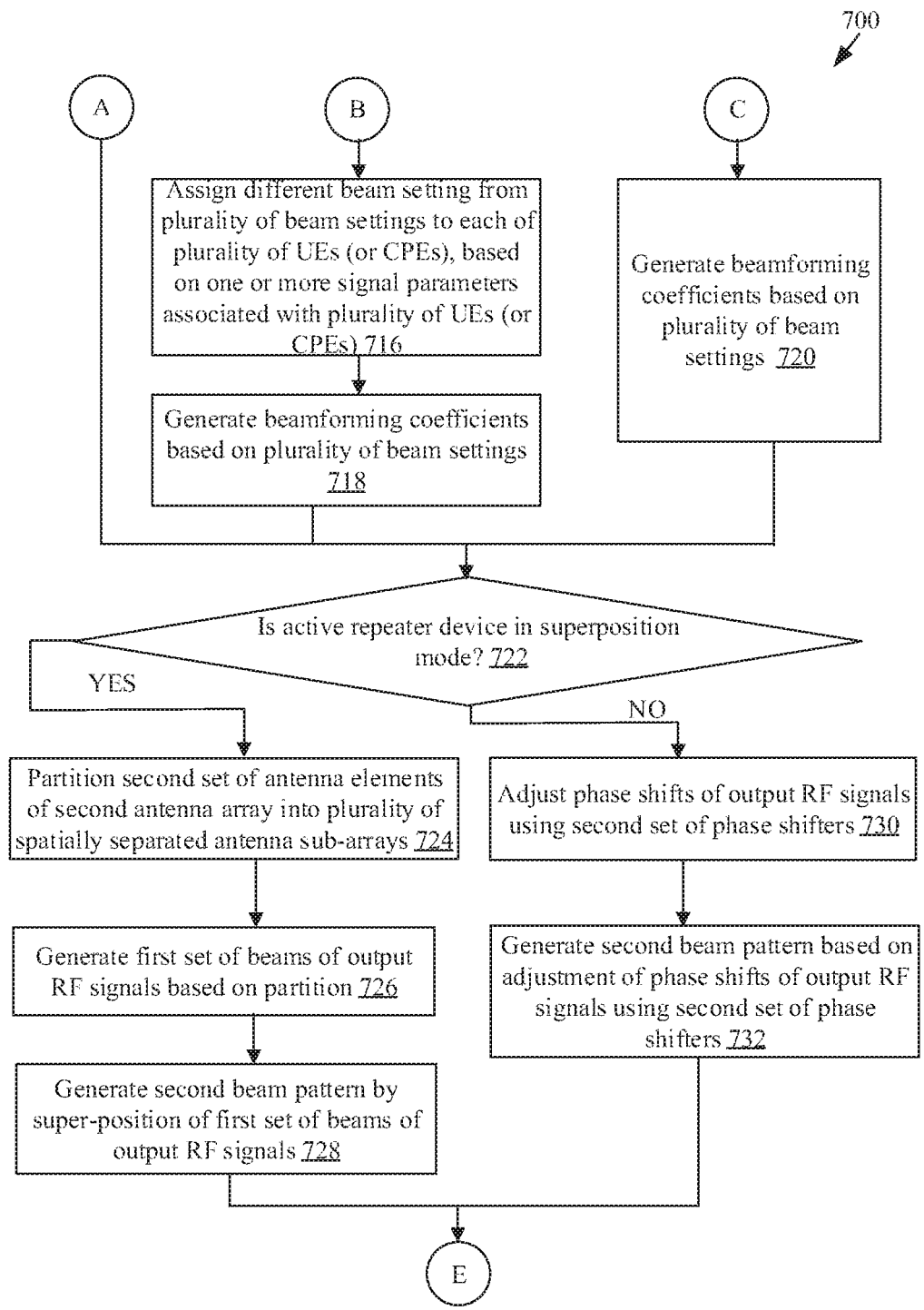
Figure 7C:
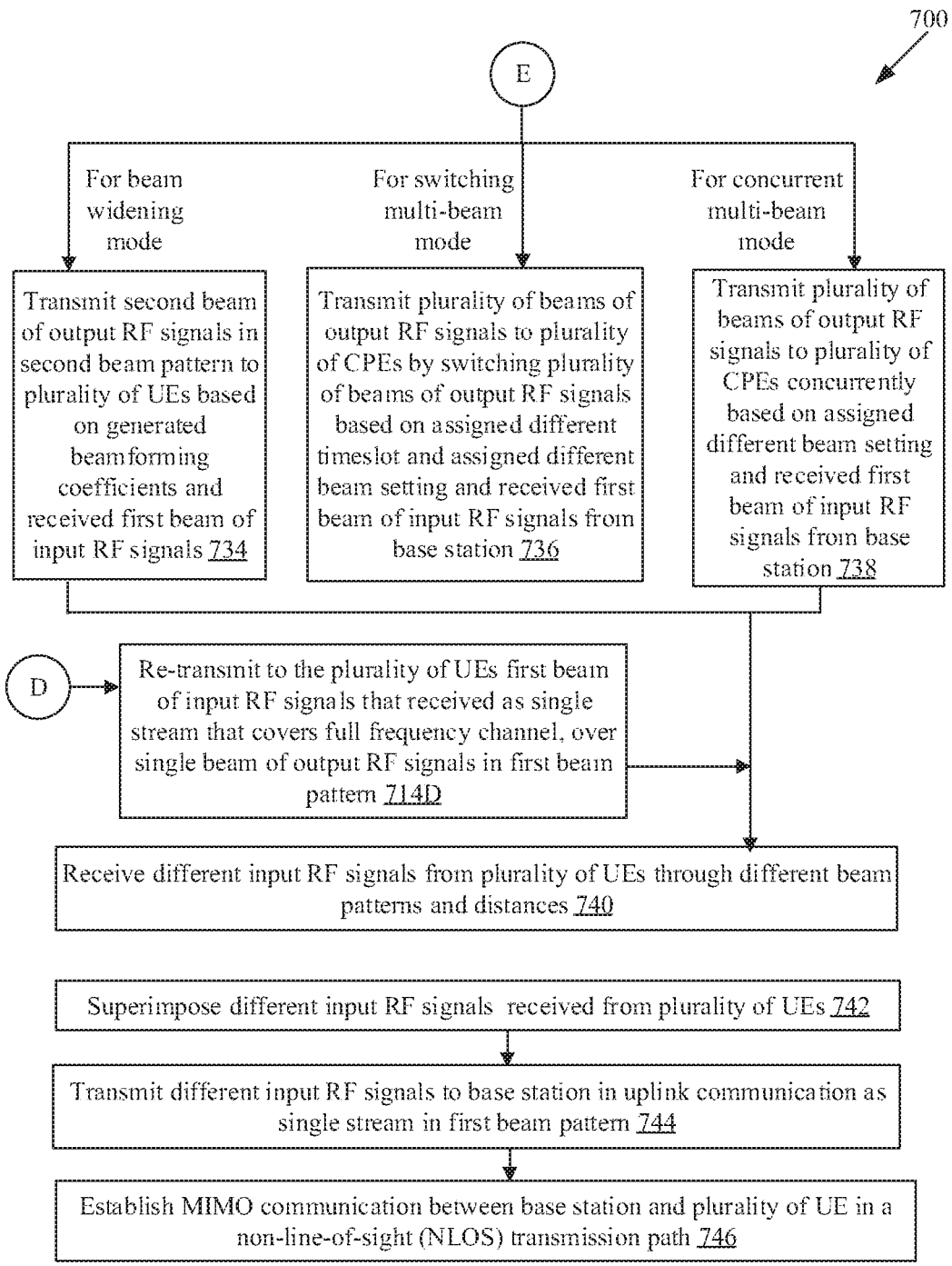

FIGS. 7A, 7B, and 7C, collectively, depict a flow chart that illustrates an exemplary method of operating an active repeater device, in accordance with an embodiment of the disclosure. With reference to FIG. 7A, there is shown a flow chart 700. The flow chart 700 is described in conjunction with FIGS. 1, 2A, 2B, 2C, 3, 4, 5A to 5D, 6A, and 6B. Referring to FIG. 7A, there is shown a flow chart 700 comprising exemplary operations 702 through 746.

At 702, the first beam of input RF signals having the first beam pattern 610 may be received from the base station 104 at a first antenna array (e.g. the first antenna array 304 of the first RH unit 204) of the primary sector 202. One or more operations 704 and 706 may be executed concurrently to one or more operations 708 and 710, as shown. Therefore, the control may pass concurrently to 704 and 708.

At 704, the first set of analog baseband (IQ) signals may be generated based on the received first beam of input RF signals. The first RH unit 204 in the primary sector 202 may be configured to generate the first set of IQ signals. The first RH unit 204 may down convert the input RF signal to generate the first set of IQ signals. The first set of IQ signals may be received by the baseband signal processor 206 in the primary sector 202. The first set of IQ signals received from the first RH unit 204 may be converted to a first set of coded data signals by the baseband signal processor 206. The baseband signal processor 206 unit may be configured to convert the first set of coded data signals to the second set of IQ signals using the first set of DACs 414.

At 706, one or more output RF signals may be generated based on the first set of IQ signals. The one or more output RF signals may be generated by a second RH unit (such as the second RH unit 210 and the second RH unit 214). The second RH unit may be configured to up convert the second set of IQ signals to generate the one or more output RF signals.

At 708, one or more RF signals may be received by the active repeater device 102 from the plurality of UEs 106A and 106B. The active repeater device 102 may be configured to receive different input RF signals from the plurality of UEs 106A and 106B through different beam patterns and distances.

At 710, RSSI of the one or more RF signals received from each of the plurality of UEs 106A and 106B may be measured in digital domain. The baseband signal processor 206 may be configured to measure the RSSI in digital domain using the second controller 404. Further, the second controller 404 may be configured to detect a location of each of the plurality of UEs 106A and 106B (or the plurality of CPEs 107) based on the measured RSSI.

At 712, at least one of the static beam mode, the beam widening mode, the switching multi-beam mode, or the concurrent multi-beam mode, may be selected. In some embodiments, one or more specified combination of the static beam mode, the beam widening mode, the switching multi-beam mode, and the concurrent multi-beam mode may be configured and set in the active repeater device 102. For example, an operating mode may be a combination of the beam widening mode and the switching multi-beam mode, where the beams that are switched are wider beams in comparison to the beam received from the base station 104. The selection may be made based on a change in the configuration setting in the memory 406. The selection may be made by at least one of a control command received from a control server (or the base station 104 from a remote location that is different than an installation location of the active repeater device, a user-input to change the configuration setting at the active repeater device, or an automatic estimation of a number, distances, and a spatial distribution of the plurality of UEs 106A, 106B, 106C (or the plurality of CPEs 107) to be serviced.

In a case where the beam widening mode is set (or selected), the control may pass to 714A and then move to 722 (FIG. 7B). In a case where the switching multi-beam mode is set (or selected), the control may pass to 714B and then move to 716 (of FIG. 7B). In a case where the concurrent multi-beam mode is set (or selected), the control may pass to 714C and then move to 720 (FIG. 7B). In a case where the static beam mode is set (or selected), the control may pass to 714D (of FIG. 7C).

At 714A, beamforming coefficients may be generated to convert first beam pattern of the first beam to the second beam pattern 612. The second controller 404 in the baseband signal processor 206 may be configured to generate the beamforming coefficients based on the detected location of each of the plurality of UEs 106A and 106B. A second beam having the second beam pattern may be wider than the first beam having the first beam pattern. The second beam having the second beam pattern may cover a second geographical area. The second geographical area may be larger than a first geographical area covered by the first beam. The second geographical area may cover locations of the plurality of UEs 106A and 106B. In cases where the plurality of UEs 106A and 106B may be in motion, part of trajectory of motion of each of the plurality of UEs 106A and 106B may be within coverage area (i.e. the second geographical area) of the second beam. Unlike the first beam (which may be a pencil-beam), the second beam may be transmitted to the plurality of UEs 106A and 106B independent of constantly tracking locations of each of the plurality of UEs 106A and 106B. In conventional systems, a process of constantly tracking location and orientation of each of the plurality of UEs 106A and 106B may consume communication bandwidth. The active repeater device 102 mitigates need for constantly tracking location and orientation of each of the plurality of UEs 106A and 106B to save communication bandwidth. Therefore, the active repeater device 102 may be configured to convert a narrow beam or a pencil-beam (such as the first beam having the first beam pattern) into a widened beam (such as the second beam having the second beam pattern). The control may then pass to 722.

At 714B, a different timeslot from a plurality of available timeslots may be assigned to each of the plurality of UEs 106A, 106B, and 106C (FIG. 6A) (or the plurality of CPEs 107), based on the scheduling information extracted from the received first beam of input RF signals. The second controller 404 may be configured to assign the different timeslot to each of the plurality of UEs 106A, 106B, and 106C (or the plurality of CPEs 107). For example, a first timeslot "Ts1", a second timeslot "Ts2", a third timeslot "Ts3", and a fourth time slot "Ts4" of the plurality of available timeslots, which may be assigned to the plurality of CPEs 107 has been discussed in detail, for example, in FIGS. 1C and 1D. Each CPE of the plurality of CPE 107 may be configured to communicate with the active repeater device 102 exclusively during a corresponding timeslot assigned to the respective CPE (or UE), and may not communicate with the active repeater device 102 at other timeslots.

At 716, a different beam setting from the plurality of beam settings may be assigned to each of the plurality of UEs 106A, 106B, and 106C (or the plurality of CPEs 107), based on the one or more signal parameters associated with the plurality of UEs 106A, 106B, and 106C (or the plurality of CPEs 107). The second controller 404 may be configured to assign the different beam setting for each of the plurality of UEs 106A, 106B, and 106C (or the plurality of CPEs 107). For example, a first beam setting, a second beam setting, and a third beam setting, of the plurality of beam settings, may be assigned to the UE 106A, the UE 106B, the UE 106C, respectively.

At 718, beamforming coefficients may be generated based on the plurality of beam settings. The second controller 404 in the baseband signal processor 206 may be configured to generate the beamforming coefficients based on the detected location of each of the plurality of UEs 106A, 106B, and 106C (or the plurality of CPEs 107). The control may then pass to 722.

At 714C, a different beam setting from the plurality of beam settings may be assigned to each of the plurality of UEs 106A, 106B, and 106C (or the plurality of CPEs 107), based on the one or more signal parameters associated with the plurality of UEs 106A, 106B, and 106C (or the plurality of CPEs 107). Each of the plurality of beam settings may correspond to a different beam profile of the plurality of beams 110 which may be generated by a second antenna array of a second RH unit of the active repeater device 102. Each of the plurality of beam settings comprises a set of beamforming coefficients. In accordance with an embodiment, the active repeater device 102 may be configured to assign a first set of beam settings (comprising a first beam setting, a second beam setting, and a third beam setting) to the plurality of UEs 106A, 106B, and 106C (or the plurality of CPEs 107). For example, the first beam setting, the second beam setting, the third beam setting, and the fourth beam setting of the plurality of beam settings, may be assigned to the first CPE 107A, the second CPE 107B, the third CPE 107C, and the fourth CPE 107D of the plurality of CPEs 107 respectively (FIG. 1B). In accordance with an embodiment, the active repeater device 102 may be configured to transmit the plurality of beams 110 of output RF signals during a plurality of available timeslots of a particular transmission time period. The active repeater device 102 may be configured to assign a different set of beam settings (such as the first set of beam settings) to the plurality of UEs 106A, 106B, and 106C (or the plurality of CPEs 107) for each of the plurality of available timeslots. For example, at a first timeslot "Ts1" of the plurality of available timeslots, the one or more second antenna arrays may be configured to transmit the plurality of beams 110 of output RF signals based on the first set of beam settings. Similarly, the one or more second antenna arrays may be configured to transmit the plurality of beams 110 of output RF signals at a second timeslot "Ts2", a third timeslot "Ts3", a fourth timeslot "Ts4", and a fifth timeslot "Ts5", based on a second set of beam settings, a third set of beam settings, a fourth set of beam settings, and a fifth set of beam settings respectively.

At 720, beamforming coefficients may be generated based on the plurality of beam settings. The second controller 404 in the baseband signal processor 206 may be configured to generate the beamforming coefficients based on the detected location of each of the plurality of UEs 106A, 106B, and 106C (or the plurality of CPEs 107). The control may then pass to 722.

At 722, a beamforming mode of the active repeater device 102 may be checked. The beamforming mode of the active repeater device 102 may be checked by the second controller 404. In cases where the beamforming mode is a superposition mode, the control passes to 724. In cases where the beamforming mode is a phase-only excitation mode, the control passes to 730.

At 724, the second set of antenna elements of the second antenna array 332 may be partitioned into a plurality of spatially separated antenna sub-arrays. The second controller 404 of the baseband signal processor 206 may partition the second antenna array 332 into the plurality of spatially separated antenna sub-arrays. In one example, the second set of antenna elements may comprise 256 elements. Further each of the plurality of spatially separated antenna sub-arrays may comprise 64 elements each. An example of the partitioning is shown in FIG. 5A.

At 726, the first set of beams of RF output signals may be generated based on the partition. The second antenna array (e.g. the second antenna array 332) of the first RH unit 204, the second RH unit 210 or the second RH unit 214 may be configured to generate the first set of beams of RF output signals. Each of the first set of beams may be generated by a corresponding antenna sub-array in the plurality of spatially separated antenna sub-arrays. An example of the first set of beams of RF output signals by partitioning is shown in FIG. 5B.

At 728, the second beam pattern 612 may be generated based on superposition of the first set of beams of RF output signals. An example of the generation of the second beam pattern 612 by superposition of the first set of beams of RF output signals is shown in FIG. 5B, and described in FIGS. 1, 3, and 4.

At 730, phase shifts of the output RF signals may be adjusted. A first controller (e.g. the first controller 322) of the first RH unit 204, the second RH unit 210 or the second RH unit 214 may be configured to adjust phase shifts of the output RF signals using the second set of phase shifters (e.g. the second set of phase shifters 328) of the second RH unit 210 or the second RH unit 214. In certain scenarios, phase shifts of output RF signals may be adjusted based on a quadratic phase distribution scheme. Further, the phase shifts of the output RF signals may be adjusted based on the generated beamforming coefficients.

At 732, the second beam pattern 612 may be generated based on the adjustment of phase shifts of the output RF signals. The second antenna array (e.g. the second antenna array 332) in the one or more secondary sectors (such as the secondary sector 208, 212, 604, 606, or 608) may be configured to generate the second beam pattern 612. The second beam pattern 612 may be generated by the cascading transmitter chain (e.g., the cascading transmitter chain 336) in the one or more secondary sectors (such as the secondary sector 208, and the secondary sector 212).

At 734, for the beam widening mode, the second beam of the output RF signals may be transmitted in the second beam pattern 612 to the plurality of UEs 106A, 106B, and 106C. The second antenna array (e.g. the second antenna array 332) in the one or more secondary sectors (such as the secondary sector 208, and the secondary sector 212) may be configured to generate the second beam in the second beam pattern 612 based on the generated beamforming coefficients and the received first beam of input RF signals. The second beam pattern 612 may be wider than the first beam pattern 610 and may cover a second geographical area greater than the first geographical area.

At 736, for the switching multi-beam mode, the plurality of beams of output RF signals may be transmitted to the plurality of UEs 106A, 106B, and 106C (or the plurality of CPEs 107) by switching the plurality of beams 110 of output RF signals based on the assigned different timeslot and the assigned different beam setting to each of the plurality of UEs 106A, 106B, and 106C (or the plurality of CPEs 107), and the received first beam of input RF signals from the base station 104. The second antenna array (e.g. the second antenna array 332) in the one or more secondary sectors (such as the secondary sector 208, and the secondary sector 212) may be configured to generate each beam of the plurality of beams 110 in the second beam pattern 612 based on the generated beamforming coefficients and the received first beam of input RF signals.

At 738, for the concurrent multi-beam mode, the plurality of beams 110 of the output RF signals may be concurrently transmitted to the plurality of UEs 106A, 106B, and 106C (or the plurality of CPEs 107) based on the assigned different beam setting to each of the plurality of UEs 106A, 106B, and 106C (or the plurality of CPEs 107). The second antenna array (e.g. the second antenna array 332) in the one or more secondary sectors (such as the secondary sector 208, and the secondary sector 212) may be configured to generate each beam of the plurality of beams 110 in the second beam pattern based on the generated beamforming coefficients and the received first beam of input RF signals. The full-bandwidth signal received from the base station 104 may be re-transmitted concurrently to the plurality of UEs 106A, 106B, and 106C (or the plurality of CPEs 107) over the plurality of beams 110 of output RF signals.

At 714D, for the static single beam mode, the first beam of input RF signals that is received as a single stream covering a full frequency channel, may be re-transmitted over a single beam of output RF signals in a first beam pattern, when the single beam of output RF signals is expected or known to cover all the plurality UEs 106A, 106B, and 106C (or the plurality of CPEs 107). The control from 714D may pass to 740.

At 740, different input RF signals from the plurality of UEs 106A, 106B, and 106C (or the plurality of CPEs 107) may be received by through different beam patterns and distances. The first antenna array (e.g. the first antenna array 304) in the primary sector 202 and the one or more secondary sectors (such as the secondary sector 208, and the secondary sector 212) may be configured to receive different input RF signals from the plurality of UEs 106A, 106B, and 106C (or the plurality of CPEs 107). An example of receipt of different input RF signals 618A, 618B, and 618C from the plurality of UEs 106A, 106B, and 106C through different beam patterns and distances, is shown in FIG. 6B.

At 742, the received different input RF signals (e.g., input RF signals 618A, 618B, and 618C (FIG. 6B) from the plurality of UEs 106A, 106B, and 106C (or the plurality of CPEs 107) may be superimposed to a single stream. The primary sector 202 may be configured to superimpose the received different input RF signals as the single stream having first beam pattern 610 for uplink transmission. The single stream may include full frequency channel that corresponds to the different input RF signals received from the plurality of UEs 106A, 106B, and 106C (or the plurality of CPEs 107).

At 744, the superimposed input RF signals may be transmitted to the base station 104 in an uplink communication in the first beam pattern 610 by the second antenna array (e.g. the second antenna array 332) in the primary sector 202.

At 746, a MIMO based communication may be established between the base station 104 and the plurality of UEs 106A, 106B, and 106C (or the plurality of CPEs 107) in an NLOS transmission path. The active repeater device 102 may be configured to establish the MIMO based communication. The MIMO based communication may be established based on the receipt of the first beam of input RF signals having the first beam pattern 610 from the base station 104 and transmission of the second beam of output RF signals in the second beam pattern 612 to the plurality of the plurality of UEs 106A, 106B, and 106C (or the plurality of CPEs 107).

Figure 8A:
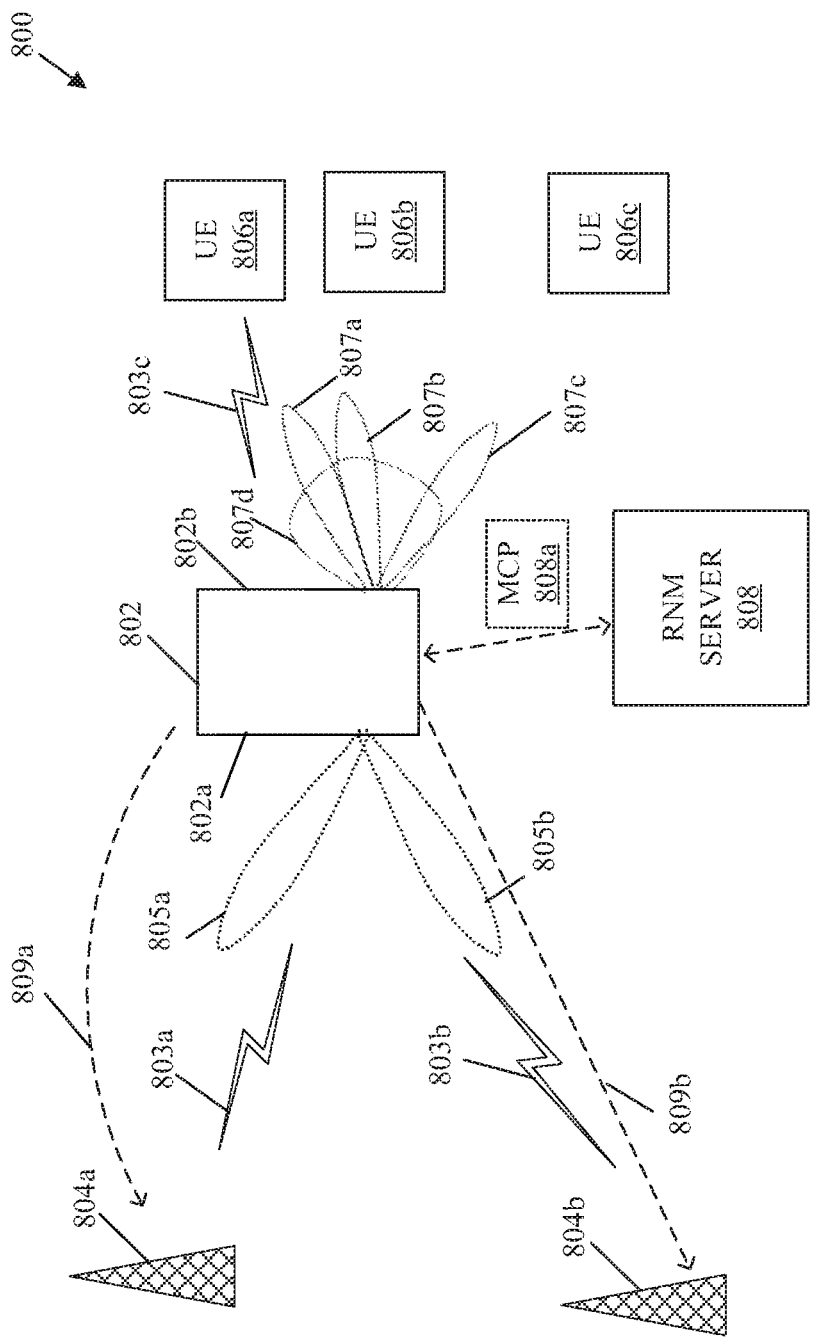
FIG. 8A is a network environment diagram that illustrates an exemplary repeater device for 5G NR communication with one or more base stations and user equipment (UEs), in accordance with another exemplary embodiment of the disclosure.

FIG. 8A is a network environment diagram that illustrates an exemplary repeater device for 5G NR communication with one or more base stations and user equipment (UEs), in accordance with another exemplary embodiment of the disclosure. FIG. 8A is explained in conjunction with elements from FIGS. 1A to 1F, 2A to 2C, 3, 4, 5A to 5D, 6A to 6C, and 7A to 7C. With reference to FIG. 8A, there is shown a network environment 800 that may include a repeater device 802, one or more base stations, such as base stations 804a and 804b, and a plurality of user equipment (UEs), such as UEs 806a, 806b, and 806c. There is further shown a remote network management (RNM) server 808 communicatively coupled to the repeater device 802, a management control plane (MCP) 808a, communication links 803a, 803b, and 803c, donor beams 805a and 805b, and service beams 807a, 807b, 807c, and 807d.

In an implementation, each of the base stations 804a and 804b may be a gNB. In another implementation, one of the base stations 804a and 804b may be a Master eNB (MeNB) and the other may be a gNB. The one or more base stations, such as base stations 804a and 804b, may correspond to the base station 104. The repeater device 802 may also be referred to as a smart communication device or an intelligent network node that enables efficient and reliable 5G NR communication between the one or more base stations, such as base stations 804a and 804b, and the plurality of UEs, such as the UEs 806a, 806b, and 806c. In an example, the repeater device 802 may correspond to the active repeater device 102 of FIG. 1A. Similarly, each of the plurality of UEs, such as the UEs 806a, 806b, and 806c, may correspond to the UEs 106A and 108B, or the CPEs 107A, 107B, 107C, or 107D, or a combination thereof.

In operation, the repeater device 802 may be configured to establish the communication link 803a with the base station 804a. The communication link 803a established with the base station 804a is one of: an in-band link, an out-of-band link, or a sidelink. In an implementation, the sidelink may be used. The sidelink refers a device to device communication in which unlike the uplink and downlink, where resource allocation and link adaptation are controlled by the network, in the sidelink, a device may perform both functions autonomously. In an example, the communication link 803a may be a single-hop or a multi-hop where the base station 804a operates as a NR device and uses the communication link 803a to communicate with the repeater device 802 without straining existing network resources. Typically, in sidelink communication base stations are bypassed. However, for 5G NR, a configuration may be made so that a given base station, or any network node may participate and exploit the advantages of the sidelink or a multi-link for unicast, groupcast, or broadcast. For example, a combination of the sidelink of the repeater device 802 with another repeater device (not shown) and an out-of-band or an in-band link from the other repeater device to the base station 804a may be established. The repeater device 802 may be further configured to receive control information from the base station 804a through a control channel. In an implementation, the control information may be side control information and the control channel may be a side control channel. After the communication link is established via the control channel (e.g. the side control channel) with the base station 804a, the control information may be directly received from the base station 804a. In an example, in addition to the communication link 803a, the repeater device 802 may be further configured to establish another communication link 803b with the base station 804b. In an implementation, alternatively, the control information may be obtained from one or more UEs, such as the UE 806a over a short-range communication channel, for example, Wi-Fi, Bluetooth, or other personal area network (e.g. in an out-of-band frequency) or even a sidelink. In such a case, the repeater device 802 may be within a communication range of the one or more UEs, such as the UE 806a to establish the short-range communication channel (i.e. the communication link 803c). In such a case, the control information may be obtained, for example, before initial access of 5G NR signals to the UE 806a, at the time of initial access to the UE 806a, or even after initial access is granted to the UE 806a.

The repeater device 802 may be further configured to decode control information that is received from the base station 804a through the control channel. The decoded control information comprises (or indicates) a periodicity and a downlink/uplink cycle ratio, a time division duplex (TDD) pattern, a NR TDD slot format, or a plurality of NR TDD slot formats in a periodic sequence. The repeater device 802 may be further configured to align a timing reference of the repeater device 802 with that of an NR cell frame for an uplink or a downlink time division duplex (TDD) switching, based on the decoded control information. In other words, in an example, the repeater device 802 aligns a timing offset of a beam reception at the repeater device 802 to a frame structure of a 5G NR radio frame. The TDD allows uplink and downlink to use complete 5G NR frequency spectrum, but in different time slots, where some short time slots are designated for uplink while other time slots are designated for downlink.

In an implementation, the repeater device 802 may be further configured to obtain the control information associated with the TDD switching from the base station 802a as a modulated pulse through the control channel in order to align the timing reference for the uplink or the downlink TDD switching. In other words, the TDD switching information may be directly sent to the repeater device 802 by the base station 804a in the form of: a modulated analog signal, or a radio frequency (RF) signal, or a digital pulse through the control channel. In an example, the modulated pulse may be modulated using are various known modulation schemes, such as Amplitude-shift keying (ASK), frequency-shift keying (FSK), or phase-shift keying (PSK) to modulate the uplink and downlink waveforms, in an example.

In a further implementation, the repeater device 802 may be further configured to decode NR synchronization signals and Physical Broadcast Channels (PBCHs) as a part of the decoded control information in order to align the timing reference for the uplink or the downlink TDD switching. In an example, the control information may include NR synchronization signals (e.g. primary synchronization signals (PSS) and secondary synchronization signals (SSS)) and Physical Broadcast Channels (PBCHs) which generally forms part of a synchronization signal block (SSB). The PBCH may be a part of 5G NR Downlink Physical Channels, which also supports synchronization of time and frequency in conjunction with the control channel, which in turn helps in cell acquisition, selection, and re-selection. Generally, the base station 804a (i.e. 5G NR-enabled base station) may periodically transmit SSBs carrying the synchronization signals (e.g. PSS, SSS) and broadcast channels (PBCH) by use of beam sweeping. For example, one SSB may include 1 symbol PSS, 1 symbol SS and 2 symbols PBCH. Synchronization signals burst (or the radio burst) may carry one or multiple SSBs. Typically, a combination of PSS and SSS helps to identify about 1008 physical cell identifiers (PCIDs) for a geographical area. Thus, the repeater device 802 may also align its timing reference (e.g. a timing offset) with that of the NR cell frame (e.g. a frame structure of a 5G NR radio frame of a cell) by decoding the NR PSS and/or SSS and/or PBCH channels. For example, a PSS may be detected for at least one SSB location (i.e. indicative of a 5G NR carrier frequency), where the detected PSS may indicate a timing boundary of the 5G NR radio frame, and thus having the detected PSS can also align the repeater device 802 for relay or its timing boundary with the frame structure of the 5G NR radio frame. An example of an exemplary 5G NR radio frame structure is shown, and described for example, in FIG. 8C.

In a further implementation, the timing alignment for the TDD switching may be executed by directly sending a TDD pattern to the repeater device 802 in a symbol-by-symbol format through the control channel. For example, the base station 804a may be configured to send TDD pattern in a symbol-by-symbol format, for example, U/D/D/U/G at symbol level, where U means one uplink symbol, D means one downlink symbol and G means one gap symbol. The control information may include the TDD pattern, which may be decoded at the repeater device 802 in order to align the timing reference for the uplink or the downlink TDD switching.

In a further implementation, the repeater device 802 may be further configured to obtain a periodicity and a downlink/uplink cycle ratio from the base station 804a. The periodicity may refer to a switching-point periodicity, for example, a switching periodicity from the uplink to the downlink, for example, may be 5 milliseconds (ms) or represented by certain number of symbols. For example, the complete periodic TDD switching timing alignment is done by sending (e.g. by the base station 804a) the periodicity and the downlink/uplink cycle ratio to the repeater device 802 through the control channel (for example, 60 symbols in downlink and 20 symbols in uplink with periodicity of 80 symbols).

In a further implementation, the repeater device 802 may be further configured to obtain a NR TDD slot format or a plurality of NR TDD slot formats in a periodic sequence. The NR TDD slot format or the plurality of NR TDD slot formats may be obtained through the control channel as a part of the control information, which is the decoded to obtain the NR TDD slot format or the plurality of NR TDD slot formats at the repeater device 802. In an example, the complete periodic TDD switching timing alignment may be executed at the repeater device 802 by sending (e.g. by the base station 804a to the repeater device 802 through the control channel) the NR slot format or multiple slot formats in a periodic sequence. For example, in DDXU format, where D means slot NR format 0, X means the NR slot format 11 and U means the NR slot format 1, or for example, according to 3GPP 38.213 v15.7-Table 11.1.1-1 definitions.

In a further implementation, the repeater device 802 may be further configured to obtain a dynamic TDD switching pattern as the control information through the control channel. In an example, the dynamic TDD switching pattern is send (e.g. by the base station 804a) to the repeater device 802 through the control channel in terms of a next TDD format (e.g. either at symbol-by-symbol level, or the periodicity and uplink/downlink ratio, or a sequence of NR slot formats) along with the time of switching to the next TDD format in terms of System Frame Number (SFN), Hyper Frame Number (HFN), a subframe or other coordinated timers of NR/LTE or other coordinated timers for 5G. For example, it may be indicated that starting at SFN=1000, start using the DDXU TDD pattern or other specified TDD pattern. In another example, the repeater device 802 may be configured to extract the next TDD pattern in a dynamic TDD scenario by decoding certain control channels (e.g. Physical downlink control channel (PDCCH), the Physical uplink control channel (PUCCH), and the like) similar to a UE, such as the UE 806a.

The repeater device 802 may be further configured to select and form one or more donor beams of RF signals at the donor side 802a of the repeater device 802 and one or more service beams of RF signals at the service side 802b of the repeater device 802, based on the decoded control information and the aligned timing reference with that of the NR cell frame for the uplink or the downlink TDD switching for communication in an NR frequency band. The repeater device 802 is configured to a select one beam of RF signal (i.e. a beam of 5G NR RF signal) or a plurality of concurrent beams of RF signals (multiple simultaneous 5G NR beams) on the donor side 802a. Similarly, the repeater device 802 is configured to a select one beam of RF signal (i.e. a beam of 5G NR RF signal) or a plurality of concurrent beams of RF signals (multiple simultaneous 5G NR beams) on the service side 802b.

In an implementation, the beam selection at the repeater device 802 at the donor side 802a and the service side 802b may be controlled by the base station 804a. The repeater device 802 may be further configured to execute a beam configuration (i.e. its own beam configurations, such as beam selection and beam forming control at the repeater device 802) for each symbol or slot of the NR cell frame (i.e. the NR frame) through the established communication link (e.g. the communication ink 803a). The beam configuration is statically or dynamically configured based on a control instruction communicated by a network or the base station 804a through the established communication link 803a. In other words, the selection and forming of the one or more donor beams of RF signals (e.g. the donor beams 805a and 805b) at the donor side 802a of the repeater device 802 and one or more service beams of RF signals (e.g. the service beams 807a, 807b, and 807c or a single broad beam, such as the service beam 807d) at the service side 802b of the repeater device 802 may be statistically configured for each slot or symbol in the NR frame or may be controlled on a slot-by-slot or symbol-by-symbol basis by the base station 804a. An example of slot and symbol format in an exemplary NR radio frame, is shown, and described, in FIG. 8C. The repeater device 802 may be further configured to obtain a control instruction communicated by a network (e.g. Wi-Fi, 4G, LTE, 5G NR, Internet, or any other wireless communication network) or the base station 804a through the established communication link 803a in order to execute the beam configuration (i.e. in order to perform such control function at the repeater device 802). In an example, the beam configuration refers to selection of a beam of highest signal strength of NR carrier signal, selection of beam patterns, and accordingly beam forming at the donor side 802a and the service side 802b of the repeater device 802.

In another implementation, the beam selection at the repeater device 802 at the donor side 802a may be controlled by the base station 804a, whereas at the service side 802b may be controlled by one or more UEs that are to be serviced, such as the UE 806a or the 806b. For example, a feedback may be received from the one or more UEs that are to be serviced, such as the UE 806a or the 806b, which may include signal quality information. Thus, based on such feedback, the repeater device 802 may be further configured to execute beam selection and control. In another example, the feedback may include control instructions as hints for the repeater device 802, to make more informed decision as to which type of beam is most appropriate or whether to cover different UEs by individual beam, a group of UEs by single beam or multiple concurrent beams. In yet another example, a UE (or a CPE) may communicate instructions to the repeater device 802 as to which beam is suited for the UE in the feedback, and the repeater device 802 just follows the instructions. In yet another implementation, the beam selection at the repeater device 802 may be decided by the repeater device 802 itself based on a network environment or detected signal strength parameters, such as the RSSI, the TSSI associated with other network nodes (e.g. UEs, base station, or other repeater devices). Thereafter, the repeater device 802 may be further configured to form (or control forming of) one or more donor beams of RF signals (e.g. the donor beams 805a and 805b) at the donor side 802a of the repeater device 802 via a first antenna array at the donor side 802a in accordance with the selected one or more donor beams of RF signals at the donor side 802a. Thus, the repeater device 802 may be further configured to form (or control forming of) one or more service beams of RF signals (e.g. a single broad beam, such as the service beam 807d that covers the UEs 806a, 806b, and 806c, or multiple service beams 807a to 807c for corresponding UEs 806a, 806b, and 806c) at the service side 802b of the repeater device 802 via a second antenna array at the service side 802b in accordance with the selected one or more service beams of RF signals at the service side 802b.

In accordance with an embodiment, the repeater device 802 may be further configured to obtain a physical cell identifier (PCID), an absolute radio-frequency channel number (ARFCN), and other properties of the base station 804a through the network (e.g. Wi-Fi, 4G, LTE, 5G NR, Internet, or any other wireless communication network) in order to automatically align one donor beam of the one or more donor beams of the RF signals towards the base station 804a. In an implementation, the PCID, the ARFCN, and/or other properties of a target gNB/carrier (e.g. the base station 804b or the base station 804a) may be shared with the repeater device 802 (e.g. by the base station 804a) through the control channel in order for the repeater device 802 to be able to automatically align its donor beams towards the target gNBs. In another implementation, the PCID and the ARFCN may be received at the repeater device 802 from the network (e.g. Wi-Fi, LTE, 5G NR, Internet, or any other wireless communication network).

In accordance with an embodiment, the repeater device 802 may be further configured to form a plurality of donor beams of RF signals concurrently (e.g. the donor beams 805a and 805b) towards a plurality of target base stations (such as the base stations 804a and the 804b) or a plurality of other repeater devices deployed in the 5G NR network. Alternatively stated, the repeater device 802 forms two or more donor beams (e.g. the donor beams 805a and 805b) towards two or more gNBs (such as the base stations 804a and the 804b); and the PCID, ARFCN and/or other properties of the target gNB(s)/carrier(s) are shared with the repeater device 802 through the control channel in order for the repeater device 802 to be able to automatically align its donor beams towards the target gNB s. In an implementation, the repeater device 802 forms the plurality of donor beams of RF signals (e.g. the donor beams 805a and 805b) concurrently towards the plurality of target base stations based on a plurality of requested donor beam identifiers, where the plurality of requested donor beam identifiers are shared by one or the plurality of target base stations through the control channel to reach the repeater device 802.

In one implementation, the donor beam IDs may be directly sent to the repeater device 802 by the target base station(s) (e.g. the base stations 804a and/or 804b) and the repeater device 802 only follows the requested donor beam IDs. For example, the repeater device 802 has a donor beam book with beam IDs between 0 and 63 and a control message received by the repeater device 802 requests the repeater device 802 to set the donor beam ID to beam ID {#23} or to beam IDs {#23, #12} concurrently. The requested donor beam IDs may be used to form a beam towards a set of target gNBs (such as the base stations 804a and 804b) and/or other repeaters devices.

In another implementation, the donor beam IDs along with the beam switching time event in terms of SFN, HFN, subframe, or other coordinated timers of NR/LTE or other coordinated timers are directly sent to the repeater device 802 (e.g. by the target base station(s), for example, the base stations 804a and/or 804b) and repeater device 802 only follows the requested donor beam IDs at the beam switching time event. For example, the repeater device 802 has a donor beam book with beam IDs between 0 and 63 and a control message received by the repeater device 802 requests the repeater device 802 to set the donor beam ID to beam ID {#23} at SFN=1000.

In accordance with an embodiment, the repeater device 802 may be further configured to form a plurality of service beams of RF signals concurrently (e.g. the service beams 807a, 807b, and 807c) towards a plurality of UEs (such as the UEs 806a, 806b, and 806c), or a plurality of other repeater devices, based on a plurality of requested service beam identifiers, where the plurality of requested service beam identifiers are shared to the repeater device 802 via one or more control messages by one or a plurality of base stations, or the plurality of UEs. In an implementation, in order to select and form the one or more service beams of RF signals (i.e. of 5G NR RF signals) at the service side 802b of the repeater device 802, beam IDs of the service side 802b may be sent through one or more control messages to the repeater device 802. The beam IDs of (for) the service side 802b may be sent, for example, by the base station 804a in the one or more control messages as a part of the control information. Thereafter, the repeater device 802 may be configured to set a service side beam(s) to specific beam ID(s). For example, the repeater device 802 may have a service beam book with beam IDs between 0 and 63 and the control message requests the repeater device 802 to set the service beam ID to beam ID {#23} or {#23, #12} concurrently. In another implementation, the repeater device 802 may be configured to form multiple concurrent beams towards the plurality of UEs, such as the UEs 806a, 806b, and 806c, or different clusters of UEs or other repeater devices.

In yet another implementation, the service beam IDs along with the beam switching time in terms of SFN, HFN, subframe, or other coordinated timers of NR/LTE or other coordinated timers may be directly sent to the repeater device 802 and the repeater device 802 may only follow and set the requested service beam IDs. For example, the repeater has a service beam book with beam IDs between 0 and 63 and a control message requests the repeater device 802 to set the service beam ID to beam ID {#23} at SFN=1000.

In accordance with an embodiment, the repeater device 802 may be further configured to adjust a forward end-to-end gain of the repeater device 802 for a downlink or an uplink communication based on a request received through the control channel. In an implementation, the relative downlink or uplink gain of the repeater device 802 may be sent through the control channel by the base station 804a (or an UE). For example, through the control channel, the repeater device 802 may be requested to increase the uplink gain by a first number of decibels, for example, 4 dB and reduce the downlink gain by a second number of decibels, for example, 3 dB. In an example, the adjustment one or more parameters (e.g. amplifier gains, and phase responses) has been described, for example, in FIG. 3.

In accordance with an embodiment, the repeater device 802 may be further configured to apply a change in a frequency in a relayed signal (e.g. the service beam 807d) at the service side 802b in a downlink direction relative to a received signal (e.g. a beam received from the base station 804a) at the donor side 802a. In an example, the signal may be received at the donor side 802a directly from the base station 804a or indirectly after passing through a chain of other repeater devices. In an example, the frequency of the received signal which may be in NR F2 band may be down converted to a sub-6 GHz frequency in the relayed signal at the service side 802b. In another example, the frequency of the received signal which may be in NR F2 band may be changed to another frequency in the NR F2 band for the relayed signal at the service side 802b. In yet another example, the frequency of the received signal which may be in NR F2 band may be changed to another frequency in the NR F2 band in the relayed signal at the service side 802b. In yet another example, the frequency of the received signal which may be in NR F1 band may be changed to a frequency in the NR F2 band in the relayed signal at the service side 802b. The relayed signal at the service side 802b may be meant for the one or more UEs, such as the UEs 806a, 806b, or 806c, or another repeater device in the downlink direction.

In accordance with an embodiment, the repeater device 802 may be further configured to apply a change in a frequency in a relayed signal at the donor side 802a in an uplink direction relative to a received signal (e.g. received from the UE 806a) at the service side 802b. Similar to the change in frequency in the downlink direction, a change in a frequency in the relayed signal at the donor side 802a in an uplink direction relative to the received signal at the service side 802b may be applied. In some implementations, a receiving antenna array (e.g. at the donor side 802a or the service side 802b) and a transmitting antenna array (e.g. at the donor side 802a or the service side 802b) within the repeater device 802 may operate at a different carrier RF frequency. In such a case, the carrier RF frequency of incoming and outgoing signals may be different, which may be beneficial for better utilization of spectral channels, improved overall frequency planning in network, and better isolation between the two antenna arrays inside the repeater device 802 operating at same time/channel.

In accordance with an embodiment, the repeater device 802 may be further configured to communicate a channel quality indicator and other channel estimates to the base station as a feedback (such as a feedback 809a) via the established communication link (e.g. the communication link 803a). The repeater device 802 may be configured to acquire a quality indicator index (e.g. 0, 1, ..., 15) as a part of the control information (e.g. in channel state information) from the one or more UEs, such as the UE 806a. The quality indicator index is acquired based on a SSB that is detected by the repeater device 802 (i.e. based on which SSB the repeater device 802 is able to search and decode). The repeater device 802 communicates this channel quality indicator and other channel estimates obtained from the one or more UEs, such as the UE 806a, to the base station 804a as a feedback (e.g. the feedback 809a), which enables the base station 804a to achieve the required block error rate, which may be otherwise not possible if the UE 806a may be out of the communication range of the base station 804a (or with very poor signal quality when directly attached to the base station 804a without the repeater device 802). In an example, the channel quality indicator and other channel estimates may indicate a specific modulation scheme and code rate, which the base station 804a may use for the downlink communication. The repeater device 802 is further configured to measure quality information of a plurality of communication links (e.g. the communication links 804a and 804b) for each of a plurality of physical cell identifier (PCIDs) which are received from a network or one or more base stations (e.g. the base stations 804a and/or 804b). The repeater device 802 is further configured to communicate the received quality information of the received PCIDs back to the network or the one or more base stations as a feedback (such as the feedback 809a or 809b). The measurement of the quality information may refer to signal strength (e.g. RSSI of each beam or top 3 RSSI of three beams) and signal to noise ratio (SNR). For example, the repeater device 802 may measure RSSI for each beam of the plurality of different beams of RF signals for each SSB location of the plurality of SSB locations and communicate such RSSI information as the feedback to back to the network or corresponding base station (e.g. the base station 804a and 804b as the feedback 809a and 809b respectively). In an example, only top 3 RSSI may be communicated or only the beam that has the highest RSSI of the received plurality of different beams may be communicated (e.g. communicated as the received quality information of the received PCIDs). Alternatively stated, the network (e.g. the base station 804a) may use this feedback (e.g. the feedback 809a, such as the received quality information) to schedule the uplink synchronization signals or configure beamforming towards other network nodes (such as the repeater device 802) or configure beamforming for the repeater device 802. For example, the network may return the RSSI or other channel quality information or metrics with the SSB to the repeater device 802 (or the base station 804a). The repeater also uses such RSSI to adjust one or more of the beams at the service side 802b or the donor side 802a based on the RSSI or other channel quality information or metrics.

In accordance with an embodiment, the repeater device 802 may be further configured to communicate with a specified remote server, such as the remote network management (RNM) server 808, via a management control plane (i.e. the MCP 808a) to acquire data and instructions to allow remote execution of one or more operations at the repeater device 802 including an software upgrade. For example, the functionalities of the repeater device 802 may be upgraded remotely based on data and control instructions remotely acquired from the RNM server 808. In some implementations, the RNM server 808 may be configured to securely access, monitor, and configure the repeater device 802 and other such repeater devices in the network for coordination among the repeaters for beam forming optimizations for enhanced network coverage and quality of service (QoS) using the MCP 808a. The MCP 808a allows to configure, monitor, and provide management, monitoring and configuration services to, all layers of the network stack of the repeater device 802. Moreover, any update of filter properties, such as filter coefficients, for the filter of the repeater device 802, may be remotely executed by the RNM server 808, which may be a cloud-based server. Furthermore, the RNM server 808 may be configured to acquire link statistics and logs from the repeater device 802 for its remote configuration.

In accordance with an embodiment, the repeater device 802 may be further configured to acquire a current timing of the base station 804a as a part of the control information for network time synchronization. Based on the synchronization, the repeater device 802 may be further configured to function as a remote antenna for the base station 104 or a remote radio for the base station 104, which enables provisioning of full coverage in 5G NR cellular network deployments without any adverse user experience, to meet QoS for 5G NR communication. In some embodiments, phase and frequency synchronization may also be performed.

Figure 8B:
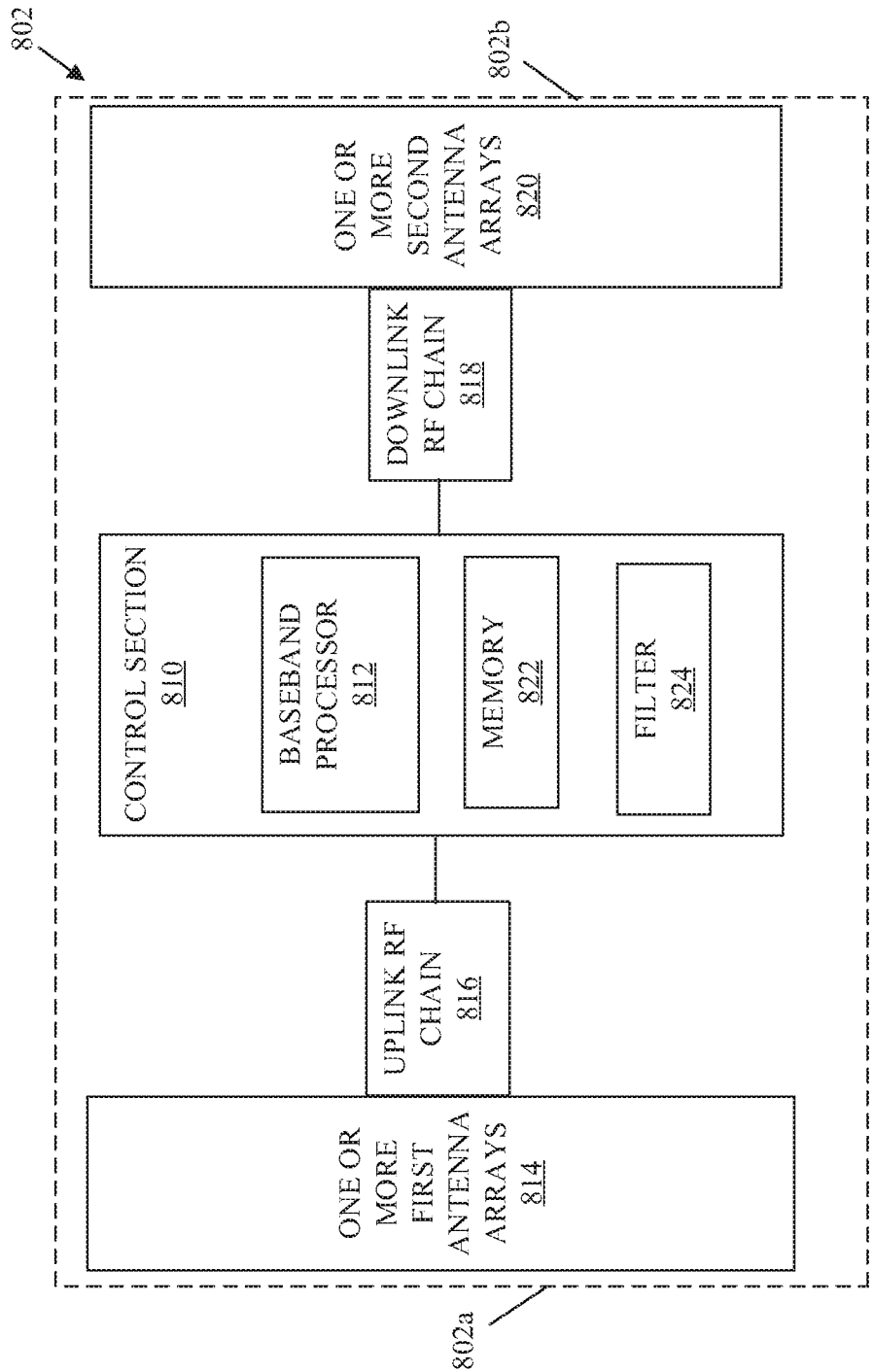
FIG. 8B depicts a block diagram illustrating various components of an exemplary repeater device, in accordance with another exemplary embodiment of the disclosure.

FIG. 8B depicts a block diagram illustrating various components of an exemplary repeater device, in accordance with another exemplary embodiment of the disclosure. FIG. 8B is explained in conjunction with elements from FIGS. 1A to 1F, 2A to 2C, 3, 4, 5A to 5D, 6A to 6C, 7A to 7C, and 8A. With reference to FIG. 8B, there is shown a block diagram of the repeater device 802 with various components.

The repeater device 802 may include a control section 810 having a baseband processor 812 and a front-end RF section, which may include one or more first antenna arrays 814, a radio frequency (RF) chain for uplink (hereinafter referred to as an uplink RF chain 816), a radio frequency (RF) chain for downlink (hereinafter referred to as a downlink RF chain 818), and one or more second antenna arrays 820. The control section 804 may further include a memory 822 and a filter 824. The control section 810 may be communicatively coupled to the front-end RF section, such as the one or more first antenna arrays 814, the uplink RF chain 816, the one or more second antenna arrays 820, and the downlink RF chain 818. In an implementation, the repeater device 802 may correspond to the active repeater device 102.

The baseband processor 812 may be configured to execute various operations of the repeater device 802. The baseband processor 812 include suitable logic, circuitry, and/or interfaces configured to control various components of the front-end RF section, such as the one or more first antenna arrays 814, the uplink RF chain 816, the one or more second antenna arrays 820, and the downlink RF chain 818. The repeater device 802 may be a programmable device, where the baseband processor 812 may execute instructions stored in the memory 822. Examples of the implementation of the baseband processor 812 may include, but are not limited to an embedded processor, a microcontroller, a digital signal processor (DSP), a Reduced Instruction Set Computing (RISC) processor, an Application-Specific Integrated Circuit (ASIC) processor, a Complex Instruction Set Computing (CISC) processor, and/or other processors, or state machines. In an exemplary implementation, the baseband processor 812 is implemented as the baseband signal processor 206, for example, as a control chip.

The one or more first antenna arrays 814 may be provided at the donor side 802*a* and may be communicatively coupled to the uplink RF chain 816. The one or more second antenna arrays 820 may be provided at the service side 802*b* may be communicatively coupled to the downlink RF chain 818. The uplink RF chain 816 may include a transceiver chain. The one or more first antenna arrays 814 and the one or more second antenna arrays 820 supports multiple-input multiple-output (MIMO) operations, and may be configured to execute MIMO communication with a plurality of end-user devices, such as the UEs 806*a*, 806*b*, and 806*c*. The MIMO communication may be executed at a sub 6 gigahertz (GHz) frequency or at mmWave frequency for 5G NR communication. The baseband processor 812 may be configured to control the one or more first antenna arrays 814 to receive the one or more donor beams of RF signals from a source network node (e.g. the base station 804*a*). In an example, the uplink RF chain 816 may include a cascading receiver chain comprising various components for baseband signal processing or digital signal processing. For example, each the uplink RF chain 816 and the downlink RF chain 818 may include a cascading receiver chain comprising various components, such as a set of low noise amplifiers (LNA), a set of receiver front end phase shifters, and a set of power combiners) for the signal reception (not shown here for brevity). An example of the cascading receiver chain is the cascading receiver chain 334 shown and described, for example, in the FIG. 3. Similarly, each of the uplink RF chain 816 and the downlink RF chain 818 may further include a cascading transmitter chain comprising various components for baseband signal processing or digital signal processing, such as a set of power dividers, a set of phase shifters, a set of power amplifiers (PA). An example of the cascading transmitter chain is the cascading transmitter chain 336 shown and described, for example, in the FIG. 3.

The memory 822 may be configured store values calculated by the baseband processor 812. In accordance with an embodiment, the implementation of the memory 822 may be same as that of the memory 406, and may store code and logic which may correspond to a plurality of digital filters, such as the filter 824, a plurality of signal processing algorithms, a plurality of signal encoding algorithms, and a plurality of signal decoding algorithms. Examples of the implementation of the memory 822 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person of ordinary skill in the art that the repeater device 802 may further include one or more other components, such as an analog to digital converter (ADC), a digital to analog (DAC) converter, a cellular modem, such as the 5G NR modem, mixers, up/down converters, local oscillators, WLAN connection circuits for BT/wi-fi links, amplifiers, filters, signal impairment correction circuits, and the like, which are omitted in this figure for brevity.

In various embodiments, described, for example, in FIGS. 8A and 8B, where the one or more first antenna arrays 814 receives a signal and re-transmits the signal through the one or more second antenna arrays 820, additional processing/operation may be applied to the signal between the one or more first antenna arrays 814 and the corresponding transmitting array of the one or more second antenna arrays 820. For example, the received signal may be: 1) frequency shifted to a frequency other than input carrier frequency, 2) passed through phase and gain adjustment, such as the gain and phase control operation may be applied, 3) passed through low-pass or band-pass filtering, 4) digitized and processed in digital domain before re-transmission, or 5) digitized, de-modulated, re-modulated and re-transmitted.

In accordance with an embodiment, the repeater device 802 may include the filter 824. The filter 824 may be a bandpass or a multi-band filter. The baseband processor 812 of the repeater device 802 may be further configured to tune a user plane's frequency response via the filter 824 in a downlink direction to allow or reject one or more bandwidth parts (BWPs) of one or more NR frequency bands. Information corresponding to the one or more bandwidth parts that the repeater device 802 is expected to amplify and forward in the downlink direction may be send to the repeater device 802 by the base station 804*a* through the control channel. In other words, the filter 824 may be applied to tune the user plane's frequency response in the downlink direction to pass or reject parts of one or multiple NR frequency bands. In the 5G NR, a bandwidth part (BWP) may be a contiguous set of physical resource blocks (PRBs) on a given NR carrier. Typically, at a given point of time only one BWP is active for downlink and one for uplink for a given UE, such as the UE 806*a*. Thus, for the given UE, based on the received request through the control channel, the filter 824 may be used allow or reject one or more bandwidth parts (BWPs) of one or more NR frequency bands so that only requested bandwidth part is made available to the target UE, such as the UE 806*a*.

In accordance with an embodiment, the baseband processor 812 may be further configured to tune a user plane's frequency response via the filter 824 in an uplink direction to allow or reject one or more bandwidth parts (BWPs) of one or more NR frequency bands. The information corresponding to the one or more bandwidth parts that the repeater device 802 is expected to amplify and forward in the uplink direction is send to the repeater device 802 by the base station 804*a* or a UE, such as the UE 806*a*, through the control channel. In other words, the NR bandwidth part(s) that the repeater device 802 should amplify and forward either in the downlink or uplink are sent to the repeater device 802 through the control channel. In another implementation, the ARFCN and bandwidth of the passband (could be contiguous or non-contiguous) may be sent to the repeater device 802 through the control channel. Alternatively, the repeater device 802 may be further configured to schedule a target UE (e.g. the UE 806*a*) such that the target UE is able to transmit or receive within a certain NR frequency range.

It is known that 5G New Radio (NR) operates in two frequency ranges (FR): FR1 for sub-6 GHz frequencies and FR2 for mmWave frequencies. Typically, maximum channel bandwidth increases to 100 MHz for FR1 and 400 MHz for FR2, where having a suitable channel frequency response is more challenging for 5G NR FR2 signals with wider bandwidths and higher frequencies. The filter 824 is highly programmable and filter coefficients (and algorithms) can be remotely updated by the RNM server 808 to meet any new requirements and allow or reject one or more bandwidth parts (BWPs) of one or more NR frequency bands. In an exemplary implementation, the baseband processor 812 may be further configured to calibrate amplitude and phase to correct frequency responses for 5G NR signals. For example, the frequency response for amplitude may be less than ±0.1 dB (e.g. ±0.04 to ±0.09 dB) and 0.2 to 0.3 degrees for phase, which represents superior performance.

In another example, the filter 824 corresponds to the channel select filter bank 410 of FIG. 4, and may include one or more channel select filters. The baseband processor 812 may be further configured to suppress adjacent channel signals by applying the filter 824 so as to allow a defined bandwidth part (BWPs) of a NR frequency band. By suppression of the adjacent channel signals, the baseband processor 812 may be configured to increase accuracy of the RSSI measurement in digital domain (similar to that as described in FIG. 4), which in turn enables more accurate beam forming in the uplink as well as the downlink.

In accordance with an embodiment, the baseband processor 812 of the repeater device 802 may be further configured to apply a defined power back-off from a set of amplifiers in a downlink radio frequency chain at the service side 802*b*. Similarly, the baseband processor 812 of the repeater device 802 may be further configured to apply a defined power back-off from a set of amplifiers in an uplink radio frequency chain at the donor side 802*a*. In an implementation, Modulation and Coding Scheme (MCS) or other properties of a data channel may be sent to the repeater device 802 and the baseband processor 812 of the repeater device 802 adjusts the back off needed for the corresponding MCS. It is known that various modulation schemes and coding rates are represented by a MCS index value (e.g. Index 0, 1, 2 . . . , N representing different MCS). In another implementation, a request in the form of a control message may be communicated to the repeater device 802 to increase or decrease a power back-off (i.e. an amount of power level) a certain decibels, for example, by 1 dB. The set of amplifiers refers to a set of power amplifiers and/or other amplifiers (e.g. LNAs) in the downlink RF chain 818 or the uplink RF chain 816. An example of amplifiers is shown and described in FIG. 3. The power control (e.g. the defined power back-off) is used by the repeater device 802 to minimize (i.e. substantially reduce) the impact of interference (echo or noise signals) and hence only use as much power as needed to achieve low error communication with the base station 804*a* in the uplink or the UEs, such as the UE 806*a*, 806*n*, or 806*c* in the downlink. Moreover, a certain back-off may be determined for the uplink as well as the downlink to meet the Error Vector Magnitude (EVM) specification (i.e. desired EVM to be achieved).

In accordance with an embodiment, the repeater device 802 may be further configured to set at least one of: an idle mode, a sleep mode, or an ultra-low-power mode for a scheduled period of time, based on network traffic information. Based on the activity of the base station 804*a* or 804*b*, that the repeater device 802 is servicing, a synchronization with the base station 804*a* for the idle mode and the sleep mode may be done. Moreover, based on the type of deployment requirements for the repeater device 802, whether the deployment expects an ultra-reliable low latency communications, or some acceptable delays (e.g. 5 ms, 10 ms, etc) is acceptable, different new low power modes may be configured.

In accordance with an embodiment, the ultra-low-power mode may be a new mode for improved power savings in the repeater device 802. In an implementation, the baseband processor 812 may be further configured to partition a set of antenna elements of an antenna array (e.g. one or more first antenna arrays 814) into a plurality of spatially separated antenna sub-arrays. The partition may be done dynamically and may be a logical partition. An example of the portioning is shown and described, for example, in the FIG. 5A. In such a case, only one partitioned antenna sub-array of the plurality of spatially separated antenna sub-arrays, may be active (e.g. Tx/Rx mode) to serve a limit number of users in the ultra-low-power mode while other partitioned antenna sub-arrays of the plurality of spatially separated antenna sub-arrays may be set to the idle mode or the sleep mode based on the partitioning. In the ultra-low-power mode, the RF components for only a portion of the antenna array may be active while other are set to the sleep mode or the idle mode to achieve significant power savings at the repeater device 802 in the ultra-low-power mode. In some implementations, the one partitioned antenna sub-array of the plurality of spatially separated antenna sub-arrays may be set such that it scatters the received signal in both uplink or downlink direction at different time slots and at a specific angle and direction to establish a connectivity between one or more UEs and the base station 804*a*.

Figure 8C:
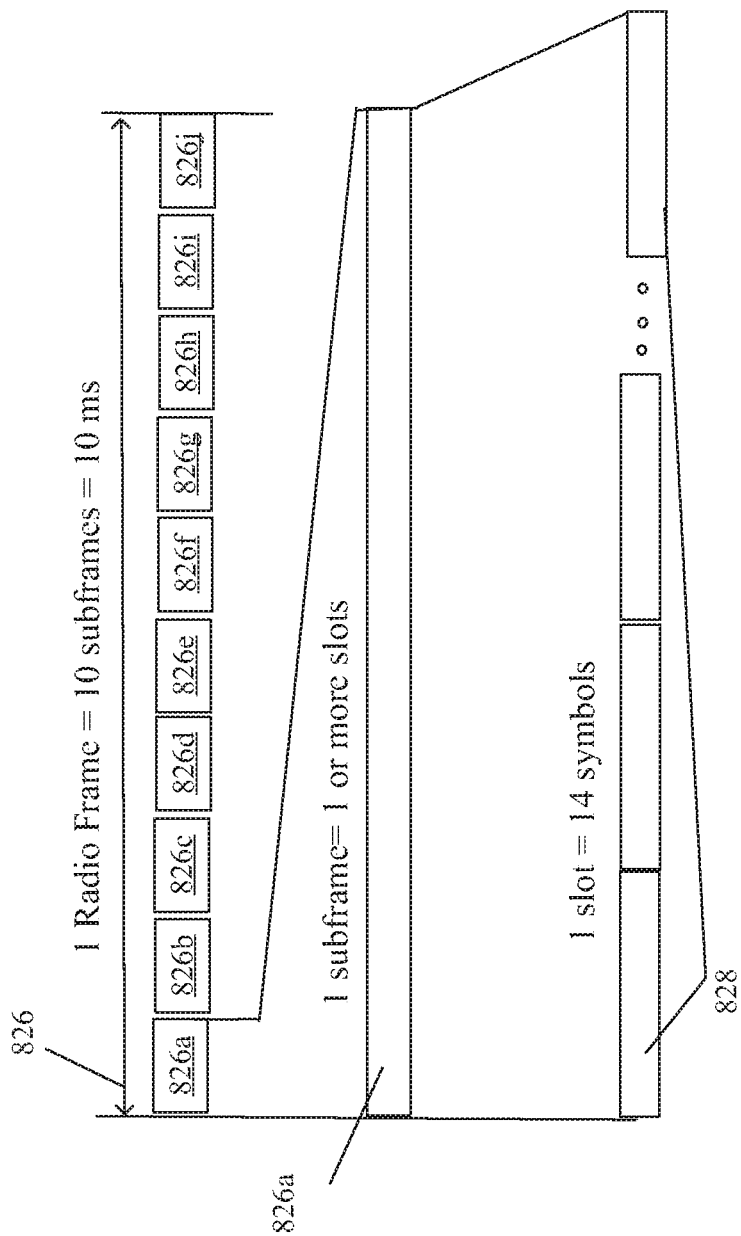
FIG. 8C illustrates an exemplary 5G NR radio frame structure to depict a relation among a radio frame, a sub-frame, slots, and symbols, in accordance with an exemplary embodiment of the disclosure.

FIG. 8C illustrates an exemplary 5G NR radio frame structure to depict a relation among a radio frame, a subframe, slots, and symbols, in accordance with an exemplary embodiment of the disclosure. FIG. 8C is described in conjunction with the FIGS. 1A to 1F, 2A to 2C, 3, 4, 5A to 5D, 6A to 6C, 7A to 7C, 8A, and 8B. With reference to FIG. 8C, there is shown an exemplary 5G NR frame structure of one radio frame, such as a radio frame 826. The radio frame 826 includes ten subframes 826*a* to 826*j*, as shown in an example. Each subframe, such as the first subframe 826*a* includes one or more slots based on different configurations. In this case, the first subframe 826*a* includes one slot, where each slot includes 14 symbols 828 (e.g. 14 ODFM symbols). In a case where a subframe has two slots, then the radio frame has 20 slots. Similarly, in case where the subframe has four slots, then the radio frame has 40 slots, where the number of OFDM symbols within a slot is 14. Generally, slot format which symbols are used for uplink (U) and which symbols are used for downlink (D) within a specific slot, and which are flexible (F). NR TDD uses flexible slot configuration, where the flexible symbol can be configured either for uplink or for downlink transmissions. It is to be understood that 5G NR radio frame structure is known, and specified in 3GPP for 5G NR frame, and is shown here to explain some exemplary operations of the repeater device 802 of the present disclosure.

In an exemplary operation, the base station 804*a* may be configured to send TDD pattern in a symbol-by-symbol format, for example, U/D/D/U/G at symbol level, where U means one uplink symbol, D means one downlink symbol and G means one gap symbol. The control information may include the TDD pattern, which may be decoded at the repeater device 802 by the baseband processor 812 in order to align the timing reference for the uplink or the downlink TDD switching. In another example, the baseband processor 812 may be further configured to obtain a NR TDD slot format or a plurality of NR TDD slot formats in a periodic sequence. The NR TDD slot format or the plurality of NR TDD slot formats may be obtained through the control channel as a part of the control information, which is the decoded to obtain the NR TDD slot format or the plurality of NR TDD slot formats at the repeater device 802. For example, in DDXU format, where D means slot NR format 0, X means the NR slot format 11 and U means the NR slot format 1, or for example, according to 3GPP 38.213 v15.7-Table 11.1.1-1 definitions.

Furthermore, beneficially, the baseband processor 812 may be further configured to measure an uplink signal quality information of specified uplink slots and beam settings and communicate the measured uplink signal quality information to a network or the base station as a feedback (such as a feedback 809a or 809b). The measurement is based on a control instruction and configuration from the network (e.g. in-band, out-of-band, or any wireless network such as Wi-Fi, LTE, Internet, and the like) or the base station 804a received at the repeater device 802. Examples of the uplink signal quality information include, but is not limited to signal strength, BER, and a distance of the repeater device 802 or the UEs to be serviced from the base station 804a. The baseband processor 812 may be further configured to obtain a quality indicator index (e.g. 0, 1, . . . , 15) as a part of the control information (e.g. in channel state information) based on which SSB it sees (i.e. the SSB location that indicates suitable NR carrier). The network (e.g. the base station 804a) may use these feedbacks (e.g. the feedback 809a, such as the received quality information) to schedule the uplink synchronization signals or configure beamforming towards other network nodes (such as the repeater device 802) or configure beamforming for the repeater device 802. For example, the network may return the RSSI or other channel quality information or metrics with the SSB to the repeater device 802 (or the base station 804a). The repeater device 802 also uses such RSSI to adjust one or more of the beams at the service side 802b or the donor side 802a based on the RSSI or other channel quality information or metrics. The repeater device enables provisioning of full coverage in 5G NR cellular network deployments without any adverse user experience, to meet QoS for 5G NR communication. Moreover, the adjustment of the power back-off is used by the repeater device 802 to minimize (i.e. substantially reduce) the impact of interference (echo or noise signals) and hence only use as much power as needed to achieve low error communication with the base station 804a in the uplink or the UEs (e.g. UEs 806a, 806b, or 806c) in the downlink.

Figure 9A:
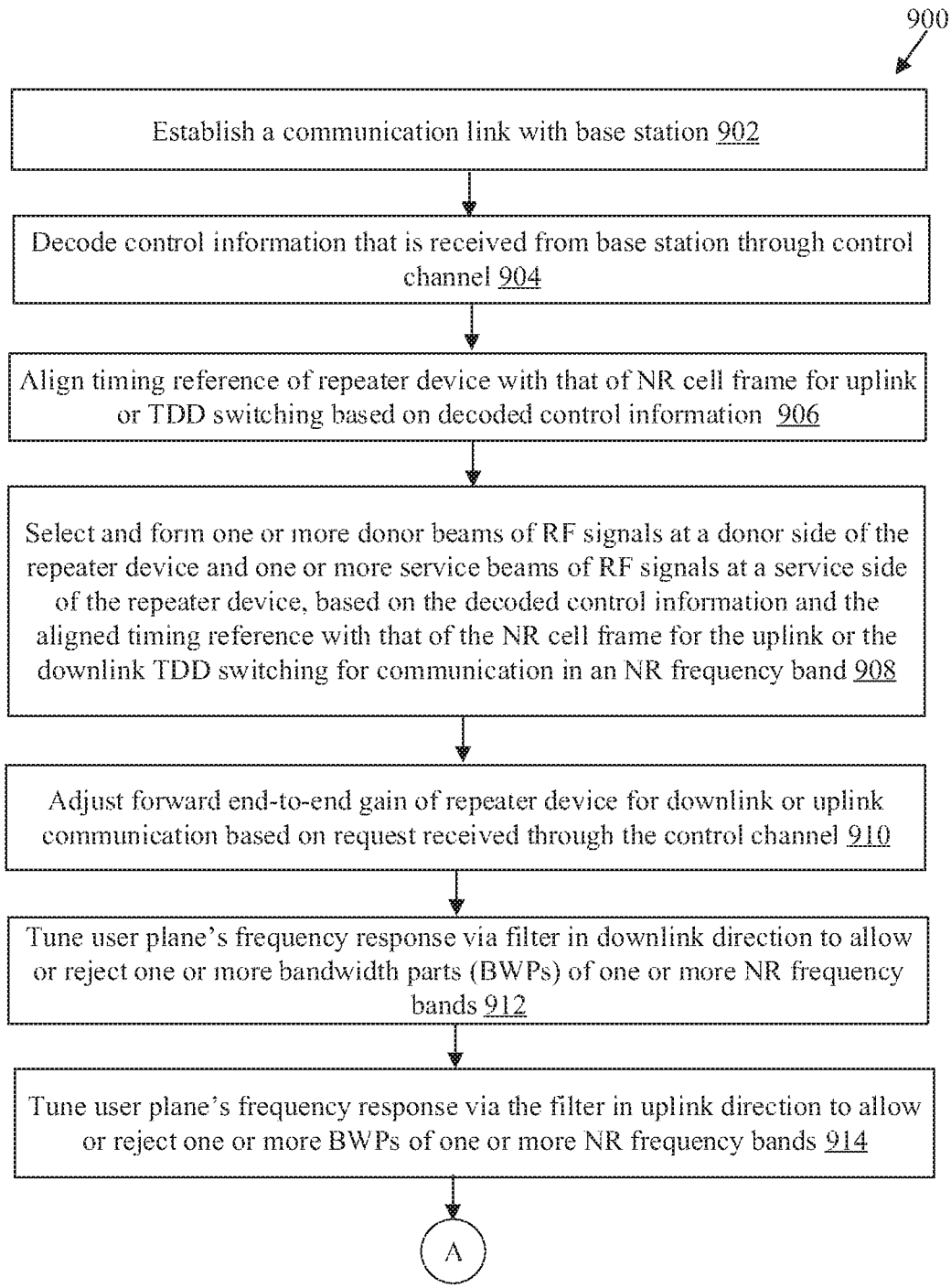
FIGS. 9A and 9B, collectively, depict a flow chart that illustrates an exemplary method implemented in a repeater device for New Radio (NR) communication, in accordance with an embodiment of the disclosure.
Figure 9B:
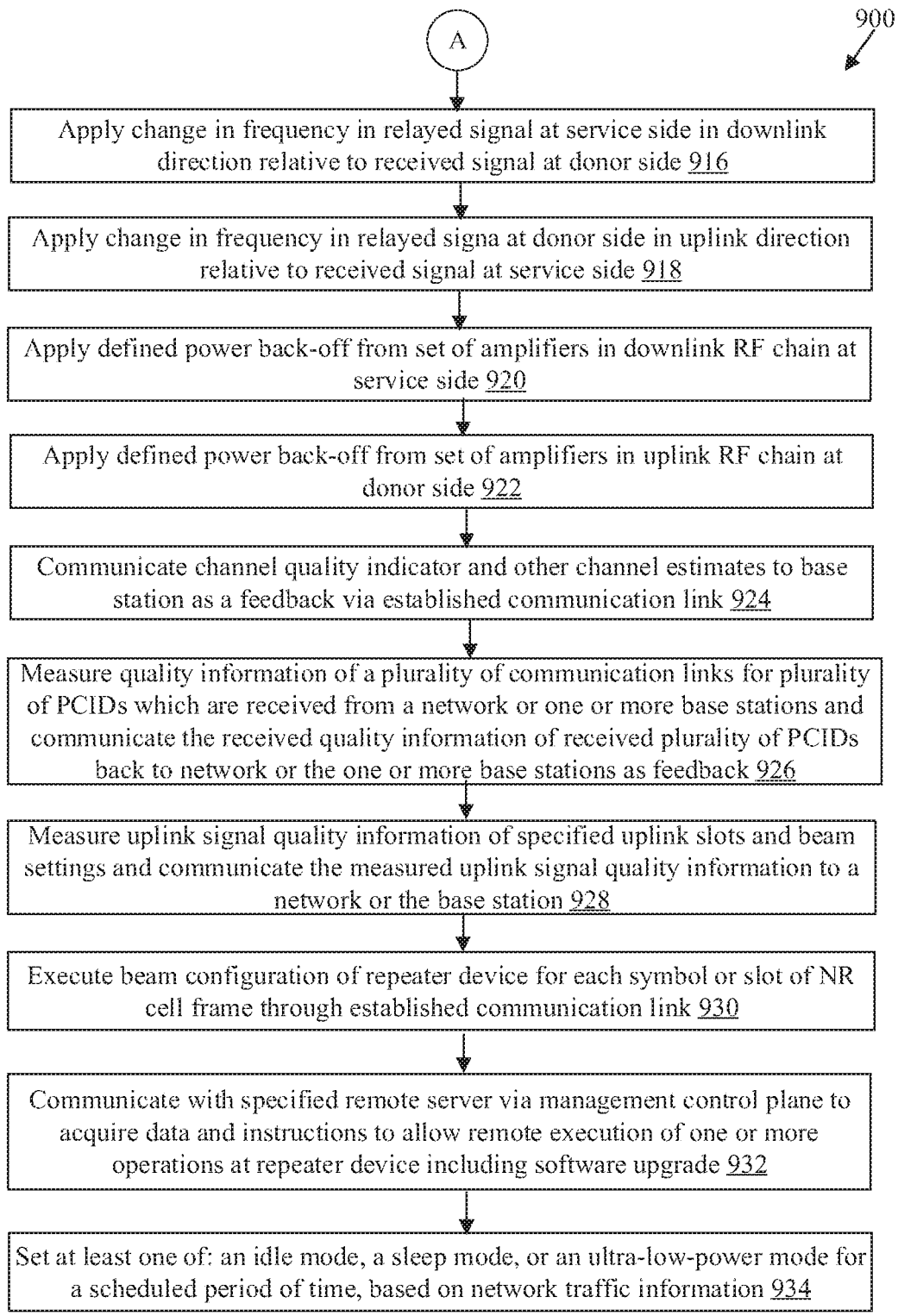

FIGS. 9A and 9B, collectively, depict a flow chart that illustrates an exemplary method implemented in a repeater device for New Radio (NR) communication, in accordance with an embodiment of the disclosure. With reference to FIGS. 9A and 9B, there is shown a flow chart 900. The flow chart 900 is described in conjunction with the FIGS. 1A to 1F, 2A to 2C, 3, 4, 5A to 5D, 6A to 6C, 7A to 7C, 8A, 8B, and 8C. Referring to FIGS. 9A and 9B, there is shown a flow chart 900 comprising exemplary operations 902 through 934. The exemplary operations 902 through 934 may be executed by the repeater device 802 (or the active repeater device 102) for the 5G NR communication with various other network nodes, such as one or more base stations, one or more UEs or CPEs, or other repeater devices. In an implementation, the exemplary operations 902 through 934 may be executed by the repeater device 802 either immediately or at a scheduled time (e.g. at a certain system frame number or symbol number) contained in control information.

At 902, a communication link may be established with the base station 804a. The baseband processor 812 (or the first controller 322 or the second controller 404) may be configured to establish the communication link 803a with the base station 804a (or the base station 804b via the communication link 803b or 104). The communication link established with the base station 804a (or the base station 804b or 104) is one of: an in-band link, an out-of-band link, or a sidelink (which may be also out-of-band or in-band).

At 904, control information received from the base station 804a through a control channel may be decoded. The baseband processor 812 (or the second controller 404) may be configured to decode the control information that is received from the base station 804a (or the base station 804b or 104) through a control channel. In other words, the repeater device 802 may be configured to decode a side control channel (either in-band or out-of-band) from a gNB (e.g. the base station 804a, 804b, or 104) and utilize the decoded control information for various purposes, for example, for the exemplary operations 906 to 928. In an example, the decoded control information may comprise NR synchronization signals, PBCHs, a periodicity and a downlink/uplink cycle ratio, a TDD pattern, a NR TDD slot format, or a plurality of NR TDD slot formats in a periodic sequence.

At 906, a timing reference of the repeater device 802 may be aligned with that of an NR cell frame for an uplink or a downlink time division duplex (TDD) switching, based on the decoded control information. The baseband processor 812 (or the second controller 404) may be further configured to align the timing reference of the repeater device 802 with that of an NR cell frame for an uplink or a downlink TDD switching, based on the decoded control information. Various implementations of how the timing reference may be aligned has been described, for example, in FIG. 8A. In an example, the baseband processor 812 (or the second controller 404) may be further configured to obtain the control information associated with the TDD switching from the base station 804a (or the base station 804b or 104) as a modulated pulse through the control channel in order to align the timing reference for the uplink or the downlink TDD switching. In another example, the baseband processor 812 (or the second controller 404) may be further configured to decode NR synchronization signals and PBCHs as a part of the decoded control information in order to align the timing reference for the uplink or the downlink TDD switching.

At 908, one or more donor beams of RF signals at the donor side 802a of the repeater device 802 and one or more service beams of RF signals at the service side 802b of the repeater device 802 may be selected and formed, based on the decoded control information and the aligned timing reference with that of the NR cell frame for the uplink or the downlink TDD switching for communication in an NR frequency band. The baseband processor 812 (or in an implementation, the first controller 322 or the second controller 404) may be further configured to select and form the one or more donor beams of RF signals (i.e. 5G NR RF signals, such as the donor beam 805a and 805b) at the donor side (e.g. the donor side 802a) of the repeater device 802 (or the active repeater device 102) and one or more service beams of RF signals (e.g. (i.e. 5G NR RF signals, such as single broad service beam 807d or multiple service beams 807a to 807c) at the service side (e.g. the service side 802b) of the repeater device 802 (or the active repeater device 102). In an example, the baseband processor 812 (or in an implementation, the first controller 322 or the second controller 404) may be further configured to obtain a PCID, an ARFCN, and other properties of the base station 804a (or the base station 804b or 104) through the control channel in order to automatically align at least one donor beam of the one or more donor beams of the RF signals towards the base station 804a (or the base station 804b or 104).

In an implementation, the baseband processor 812 (or in an implementation, the first controller 322 or the second controller 404) may be further configured to form the one or more donor beams of RF signals (i.e. 5G NR RF signals) at the donor side (e.g. the donor side 802a) of the repeater device 802 (or the active repeater device 102) and one or more service beams of RF signals i.e. 5G NR RF signals) at the service side (e.g. the service side 802b) of the repeater device 802 (or the active repeater device 102) based on dynamic selection of one or more operating modes of the plurality of operating modes, such as the beam widening mode (e.g. the service beam 807d), the switching multi-beam mode (e.g. for the switched service beams 807a to 807c), the concurrent multi-beam mode (e.g. the concurrently sent service beams 807a to 807c), and the static beam mode, or the operating mode that includes one or more specified combination of the static beam mode, the beam widening mode, the switching multi-beam mode, and the concurrent multi-beam mode. For example, an operating mode may be a combination of the beam widening mode and the switching multi-beam mode, where the beams that are switched are wider beams in comparison to the beam received from the base station 804a (or the base station 104). The selection may be made by at least one of a control command received from the base station 804a (or the base station 104) (or the RNM server 808 from a remote location that is different than an installation location of the repeater device 802, a user-input to change a configuration setting at the repeater device 802, or an automatic estimation of a number, distances, and a spatial distribution of the plurality of UEs, such as the UEs 806a, 806b, and 806c to be serviced. For example, in the FIG. 1A, certain operations of a first operating mode, such as the beam widening mode of the plurality of operating modes is described, for example. The switching multi-beam mode is discussed, for example, in FIGS. 1B, 1C, and 1D. The concurrent multi-beam mode is discussed, for example, also in FIGS. 1B, 1E, and 1F. The plurality of operating modes and their corresponding operations are discussed for example, for example, in FIGS. 6A, 6B, 7A, 7B, and 7C.

At 910, a forward end-to-end gain of the repeater device 802 may be adjusted for a downlink or an uplink communication based on a request received through the control channel. The baseband processor 812 (or in an implementation, the first controller 322 and/or the second controller 404) may be further configured to adjust the forward end-to-end gain of the repeater device 802 for the downlink or the uplink communication based on the request (e.g. via a control message) received through the control channel.

At 912, a user plane's frequency response may be tuned via the filter 824 in a downlink direction to allow or reject one or more bandwidth parts (BWPs) of one or more NR frequency bands. The information corresponding to the one or more bandwidth parts that the repeater device 802 (or the active repeater device 102) is expected to amplify and forward in the downlink direction is send to the repeater device 802 (or the active repeater device 102) by the base station 804a (or the base station 804b or 104) through the control channel. The baseband processor 812 (or in an implementation, the second controller 404) may be further configured to tune the user plane's frequency response via the filter 824 in the downlink direction.

At 914, a user plane's frequency response may be tuned via the filter 824 in an uplink direction to allow or reject one or more bandwidth parts (BWPs) of one or more NR frequency bands. The information corresponding to the one or more bandwidth parts that the repeater device 802 (or the active repeater device 102) is expected to amplify and forward in the uplink direction is send to the repeater device 802 (or the active repeater device 102) by the base station 804a (or the base station 804b or 104) or a user equipment (e.g. the UE 806a, 806b, or 806c, or the UE 106A or 106B, or the CPE 107A, 107B, 107C, or 107D), through the control channel. The baseband processor 812 (or in an implementation, the second controller 404) may be further configured to tune the user plane's frequency response via the filter 824 in the uplink direction, for example, towards the base station 804a (or the base station 804b or 104).

At 916, a change in a frequency in a relayed signal at the service side 802b may be applied in a downlink direction relative to a received signal at the donor side 802a. The baseband processor 812 (or in an implementation, the second controller 404) may be further configured to apply the change in the frequency (e.g. from first frequency to a second frequency) in a relayed signal at the service side 802b may be applied in a downlink direction relative to a received signal at the donor side 802a. In an implementation, the first frequency of the received signal may be down converted to a second frequency of the relayed signal at the service side 802b.

At 918, a change in a frequency in a relayed signal at the donor side 802a may be applied in an uplink direction relative to a received signal at the service side 802b. The baseband processor 812 (or in an implementation, the second controller 404) may be further configured to apply the change in the frequency (e.g. from first frequency to a second frequency) in a relayed signal at the donor side 802a in the uplink direction relative to a received signal at the service side 802b. In an implementation, the first frequency of the received signal may be up converted to a second frequency of the relayed signal at the donor side 802a.

At 920, a defined power back-off from a set of amplifiers may be applied in the downlink RF chain 818 at the service side 802b. The baseband processor 812 (or in an implementation, the second controller 404 or the first controller 322) may be further configured to apply the defined power back-off from the set of amplifiers (e.g. power amplifiers or other amplifiers) in the downlink RF chain 818 at the service side 802b.

At 922, a defined power back-off from the set of amplifiers may be applied in an uplink RF chain 816 at the donor side 802a. The baseband processor 812 (or in an implementation, the second controller 404 or the first controller 322) may be further configured to apply the defined power back-off from the set of amplifiers (e.g. power amplifiers or other amplifiers) in the uplink RF chain 816 at the donor side 802a.

At 924, a channel quality indicator and other channel estimates may be communicated to the base station 804a as a feedback via the established communication link. The baseband processor 812 (or in an implementation, the second controller 404 or the first controller 322) may be further configured to communicate the channel quality indicator and other channel estimates to the base station 804a (or the base station 804b or 104) as a feedback via the established communication link.

At 926, quality information of a plurality of communication links for a plurality of physical cell identifier (PCIDs) which are received from a network or one or more base stations (e.g. the base station 804b, 804b, or 104) or may be measured. The measured quality information of the received plurality of PCIDs may be communicated back to the network or the one or more base stations as a feedback (e.g. the feedback 809a or 809b). In other words, for each PCID detected at the repeater device 802 (or the active repeater device 102), the quality information may be communicated. The plurality of communication links may correspond to in-band links with one or more base stations, such as the base stations 804a and 804b to receive beams of RF signals, from which PCIDs are decoded. The plurality of communication links may also be out-of-band links or sidelinks to acquire PCIDs from the network. The baseband processor 812 (or in an implementation, the second controller 404 or the first controller 322) may be further configured to measure quality information of the plurality of communication links for the plurality of PCIDs, which are received from a network or one or more base stations and communicate the measured quality information of the received plurality of PCIDs back to the network or the one or more base stations as a feedback.

At 928, an uplink signal quality information of specified uplink slots and beam settings may be measured, and the measured uplink signal quality information may be communicated to the network or the base station. The measurement is based on a control instruction and configuration from the network or the base station received at the repeater device 802 (or the active repeater device 102). The baseband processor 812 (or in an implementation, the second controller 404 or the first controller 322), on command and configured from the network or a gNB, may be configured to measure the uplink signal quality information of certain uplink slots and beam settings and convey the signal quality information to the network or the gNB.

At 930, a beam configuration of the repeater device 802 (or the active repeater device 102) for each symbol or slot of the NR cell frame may be executed through the established communication link (e.g. the communication link 803*a*). The beam configuration is statically or dynamically configured based on a control instruction communicated by the network or the base station 804*a* through the established communication link 803*a*.

At 932, it may be communicated with a specified remote server via a management control plane to acquire data and instructions to allow remote execution of one or more operations at the repeater device including a software upgrade. The baseband processor 812 (or in an implementation, the second controller 404 or the first controller 322) may be further configured to communicate with the specified remote server (e.g. the RNM server 808) via the management control plane to acquire data and instructions to allow remote execution of one or more operations at the repeater device 802 (or the active repeater device 102) including various software upgrades at the repeater device 802 (or the active repeater device 102). In an example, a gNB, such as the base station 804*a*, may have the capability to establish an in-band link or an out-of-band link with the repeater device 802 for management and control.

At 934, at least one of: an idle mode, a sleep mode, or an ultra-low-power mode may be set for a scheduled period of time, based on network traffic information. The baseband processor 812 (or in an implementation, the second controller 404 or the first controller 322) may be further configured to set the at least one of: the idle mode, the sleep mode, or the ultra-low-power mode for a scheduled period of time.

Thus, as described in the FIGS. 1A to 1F, 2A to 2C, 3, 4, 5A to 5D, 6A to 6C, 7A to 7C, 8A, 8B, 8C, 9A, and 9B, the repeater device 802 performs various intelligent processing of incoming and outgoing signals without adding to any noticeable increase in latency. In other words, smart amplify-and-forward operations are executed by the repeater device (e.g. the repeater device 802 or the active repeater device 102). In a first case, only header portion of the received signal may be decoded in the control path by the repeater device (e.g. the repeater device 802 or the active repeater device 102) to extract control information and not data portion. This is done to achieve near-zero-latency while maintaining a final error vector magnitude (EVM) target at end destination point (i.e. the one or more remote UEs 106A, 106B, and 106C or the UEs 806*a*, 806*b*, and 806*c*) without relying on complete demodulation or re-modulation at an intermediate point, such as the deployment location of the repeater device, for boosting EVM. For example, the received stream may be digitized for low-latency processing in digital domain (such as channel selection filtering, IQ correction, forward end-to-end gain, power back-off), without demodulating the data stream. In some embodiments, where latency of demodulation and re-modulation of data stream can be afforded (i.e. acceptable), and/or the quality (i.e. the SNR) of the received stream is not sufficient for re-transmission as is, the repeater device (e.g. the repeater device 802 or the active repeater device 102) may de-modulate, de-code, re-encode, re-modulate the stream before re-transmitting the stream through a transmitting antenna array (such as the one or more second antenna arrays 820). Thus, the repeater device (e.g. the repeater device 802 or the active repeater device 102) acts as an intelligent device, which is highly configurable and performs intelligent processing of incoming and outgoing signals based on deployment needs, such as expected latency, and network conditions, network traffic, presence of echo signals or interference, and the like.

In an example, the repeater device (e.g. the repeater device 802 or the active repeater device 102) while processing of incoming and outgoing signals does not amplify noise. For example, the echo signal from the RF signals received from the base station 804*a* or the one or more UEs, such as the UEs 806*a*, 806*b*, and 806*c*, may be removed. An example of the operations of a repeater device for cancellation of echo channel path that is caused by self-interference of RF signals transmitted by RF transmitters of repeater device, has been described in the patent application Ser. No. 16/031,007 filed on Jul. 10, 2018 entitled "RECONFIGURABLE AND MODULAR ACTIVE REPEATER DEVICE". Similar to the operations for cancellation of echo channel path, other noise, if present, in the received signals at the repeater device 802, may be detected using noise or echo canceller in the repeater device 802.

In accordance with an embodiment, for the 5G NR communication, different protocol stacks, are defined as layer 1, layer 2, and layer 3. The 5G layer-1 is the physical layer, layer-2 include MAC, RLC, and PDCP, and layer-3 is RRC layer. In an implementation, the repeater device (e.g. the repeater device 802 or the active repeater device 102) may utilize mainly the 5G layer-1 (i.e. the physical layer in the control plane), to perform various functions to reduce device complexity and latency, for example, the exemplary operations 902 to 934. In another implementation, the repeater device 802 may operate at a RF layer that lies just below the physical layer, in the user plane, whereas may operate at the RF layer as well as the physical layer at the control plane.

In another implementation, alternatively, a combination of the layer 1 and layer 2 may be employed in the control plane. In yet another implementation, a combination of the layer 1, 2, and 3, may be employed in the control plane. In yet another implementation, the user plane aggregation may occur at layer 2, for example, to enable to integration of features like cross-carrier scheduling.

Moreover, in a conventional directional antenna or other beamforming antennas, the radio waves may be emitted in one particular direction with most of its power in directed in the desired direction, and thus a radiation pattern in main lobe appears as larger than the others, called side lobes. In contradiction to conventional systems, the repeater device

802 may be further configured to radiate maximum power in each radiated direction, and thus multiple main lobes may be formed.

Various embodiments of the disclosure may provide a non-transitory computer-readable medium having stored thereon, computer implemented instruction that when executed by a processor causes a communication device (e.g. the repeater device 802) to execute operations which, establish a communication link with a base station; decode control information that is received from the base station through a control channel. The operations may align a timing reference of the repeater device with that of an NR cell frame for an uplink or a downlink time division duplex (TDD) switching, based on the decoded control information. The operation may select and form one or more donor beams of RF signals at a donor side of the repeater device and one or more service beams of RF signals at a service side of the repeater device, based on the decoded control information and the aligned timing reference with that of the NR cell frame for the uplink or the downlink TDD switching for communication in an NR frequency band.

Various embodiments of the disclosure may provide a non-transitory computer-readable medium having stored thereon, computer implemented instruction that when executed by one or more circuits causes an active repeater device to receive, by a first antenna array in a primary sector of the active repeater device, a first beam of input RF signals having a first beam pattern from a base station. The first beam pattern may cover a first geographical area. Beamforming coefficients are generated to convert the first beam pattern of the first beam of input RF signals to a second beam pattern. A second beam of output RF signals in the second beam pattern is transmitted to a plurality of user equipment (UEs) based on the generated beamforming coefficients and the received first beam of input RF signals. The second beam pattern may be wider than the first beam pattern and covers a second geographical area greater than the first geographical area.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A repeater device for New Radio (NR) communication, comprising:
 a baseband processor configured to:
  establish a communication link with a base station, wherein the communication link established with the base station is a side link;
  receive, from the base station, control information as a modulated pulse through a control channel, wherein the control information is side control information and the control channel is a side control channel;
  decode the received control information which includes primary synchronization signals (PSS) that indicate a timing boundary of a 5G NR radio frame;
  align, based on the decoded control information, a timing reference of the repeater device with that of an NR cell frame for one of an uplink or a downlink time division duplex (TDD) switching;
  select a first operating mode from a plurality of operating modes of the repeater device based on at least one of a number of a plurality of user equipment (UEs), a distance of the plurality of UEs from the base station, or a spatial distribution of the plurality of UEs, wherein
   the plurality of operating modes includes a beam widening mode, a switching multi-beam mode, a concurrent multi-beam mode, and a static beam mode, and an operating mode that includes one or more specified combination of the static beam mode, the beam widening mode, the switching multi-beam mode, and the concurrent multi-beam mode;
  receive feedback from the plurality of UEs, wherein the feedback indicates one of:
   which type of beam is suitable for the plurality of UEs, or
   one of whether to cover one of the plurality of UEs by an individual beam, a group of UEs from the plurality of UEs by a single beam, or the group of UEs by multiple concurrent beams;
  select and form a plurality of donor beams of Radio Frequency (RF) signals at a donor side of the repeater device and a plurality of service beams of RF signals at a service side of the repeater device, based on the decoded control information, the aligned timing reference with that of the NR cell frame for one of the uplink or the downlink TDD switching for communication in an NR frequency band, and the first operating mode, wherein
   the selection and formation of the plurality of service beams of RF signals is further based on the received feedback;

form the plurality of donor beams of RF signals, concurrently towards one of a plurality of target base stations or a plurality of repeater devices different from the repeater device, based on the first operation mode, a plurality of requested donor beam identifiers, and a plurality of pre-stored donor beam identifiers, wherein the plurality of requested donor beam identifiers is shared by at least one of the plurality of target base stations through the control channel to reach the repeater device;

track a trajectory of motion of each of the plurality of UEs to be within a coverage area of the one or more service beams of RF signals without constantly tracking locations of each of the plurality of UEs; and dynamically adjust the coverage area of the plurality of service beams of RF signals based on the trajectory of motion of the plurality of UEs.

2. The repeater device according to claim 1, wherein the baseband processor is further configured to decode NR synchronization signals and Physical Broadcast Channels (PBCHs) as a part of the decoded control information for the alignment of the timing reference for one of the uplink or the downlink TDD switching.

3. The repeater device according to claim 2, wherein the decoded control information in addition to the NR synchronization signals and the Physical Broadcast Channels (PBCHs) further comprises one or more of: a periodicity and a downlink/uplink cycle ratio, a TDD pattern, a NR TDD slot format, or a plurality of NR TDD slot formats in a periodic sequence.

4. The repeater device according to claim 1, wherein the baseband processor is further configured to:

obtain a physical cell identifier (PCID), an absolute radio-frequency channel number (ARFCN), and properties of the base station through a network; and automatically align one donor beam of the one or more donor beams of the RF signals towards the base station based on the PCID, the ARFCN, and the properties of the base station.

5. The repeater device according to claim 1, wherein the baseband processor is further configured to form the plurality of service beams of RF signals concurrently towards one of the plurality of UEs or the plurality of repeater devices, based on a plurality of requested service beam identifiers, and the plurality of requested service beam identifiers is shared to the repeater device via one or more control messages by at least one of a plurality of base stations, or the plurality of UEs.

6. The repeater device according to claim 1, wherein the baseband processor is further configured to:

receive a request through the control channel; and adjust, based on the request, a forward end-to-end gain of the repeater device for one of a downlink or an uplink communication.

7. The repeater device according to claim 1, further comprising a filter, wherein the baseband processor is further configured to:

receive, from the base station, information that corresponds to one or more bandwidth parts (BWPs) of one or more NR frequency bands that the repeater device is expected to amplify and forward in a downlink direction or an uplink direction, wherein the information that corresponds to the one or more BWPs is received through the control channel; and tune, based on the received information that corresponds to the one or more BWPs, a user plane's frequency response via the filter in the downlink direction.

8. The repeater device according to claim 1, further comprising a filter, wherein the baseband processor is further configured to:

receive, from the base station, information that corresponds to one or more bandwidth parts (BWPs) of one or more NR frequency bands that the repeater device is expected to amplify and forward in a downlink direction or an uplink direction, wherein the information that corresponds to the one or more BWPs is received through the control channel; and tune, based on the received information that corresponds to the one or more BWPs, a user plane's frequency response via the filter in the uplink direction.

9. The repeater device according to claim 1, wherein the baseband processor is further configured to apply a change in a frequency in a relayed signal at the service side in a downlink direction relative to a received signal at the donor side.

10. The repeater device according to claim 1, wherein the baseband processor is further configured to apply a change in a frequency in a relayed signal at the donor side in an uplink direction relative to a received signal at the service side.

11. The repeater device according to claim 1, wherein the baseband processor is further configured to apply a defined power back-off from a set of amplifiers in a downlink radio frequency chain at the service side.

12. The repeater device according to claim 1, wherein the baseband processor is further configured to apply a defined power back-off from a set of amplifiers in an uplink radio frequency chain at the donor side.

13. The repeater device according to claim 1, wherein the baseband processor is further configured to communicate, via the established communication link, a channel quality indicator and a plurality of channel estimates to one of the base station or a network.

14. The repeater device according to claim 1, wherein the baseband processor is further configured to communicate with a specified remote server via a management control plane to acquire data and instructions to allow remote execution of one or more operations at the repeater device including a software upgrade.

15. The repeater device according to claim 1, wherein the baseband processor is further configured to:

receive a plurality of physical cell identifier (PCIDs) from one of a network or the base station;

measure quality information of a plurality of communication links for the received plurality of physical cell identifier (PCIDs); and communicate the measured quality information of the received plurality of PCIDs to one of the network or the base station.

16. The repeater device according to claim 1, wherein the baseband processor is further configured to:

receive a control instruction from one of a network or the base station;

measure, based on the received control instruction, uplink signal quality information of specified uplink slots and beam settings; and communicate the measured uplink signal quality information to one of the network or the base station.

17. The repeater device according to claim 1, wherein the baseband processor is further configured to:
receive, via the established communication link, a control instruction from one of a network or the base station; and
execute a beam configuration of the repeater device for each one of symbol or slot of the NR cell frame through the established communication link, and
the beam configuration is based on the control instruction.

18. A method implemented in a repeater device for New Radio (NR) communication, the method comprising:
establishing a communication link with a base station, wherein the communication link established with the base station is a side link;
receiving, from the base station, control information as a modulated pulse through a control channel, wherein the control information is side control information and the control channel is a side control channel;
decoding the received control information which includes primary synchronization signals (PSS) that indicate a timing boundary of a 5G NR radio frame;
aligning, based on the decoded control information, a timing reference of the repeater device with that of an NR cell frame for one of an uplink or a downlink time division duplex (TDD) switching;
selecting a first operating mode from a plurality of operating modes of the repeater device based on at least one of a number, a distance, or a spatial distribution of a plurality of user equipment (UEs), wherein
the plurality of operating modes includes a beam widening mode, a switching multi-beam mode, a concurrent multi-beam mode, and a static beam mode, and an operating mode that includes one or more specified combination of the static beam mode, the beam widening mode, the switching multi-beam mode, and the concurrent multi-beam mode;
receiving feedback from the plurality of UEs, wherein the feedback indicates one of
which type of beam is suitable for the plurality of UEs, or
one of whether to cover one of the plurality of UEs by an individual beam, a group of UEs from the plurality of UEs by a single beam, or the group of UEs by multiple concurrent beams;
selecting and forming a plurality of donor beams of Radio Frequency (RF) signals at a donor side of the repeater device and a plurality of service beams of RF signals at a service side of the repeater device, based on the decoded control information, the aligned timing reference with that of the NR cell frame for one of the uplink or the downlink TDD switching for communication in an NR frequency band, and the first operating mode, wherein
the selection and formation of the plurality of service beams of RF signals is further based on the received feedback;
forming the plurality of donor beams of RF signals, concurrently towards one of a plurality of target base stations or a plurality of repeater devices different from the repeater device, based on the first operation mode, a plurality of requested donor beam identifiers, and a plurality of pre-stored donor beam identifiers, wherein the plurality of requested donor beam identifiers is shared by at least one of the plurality of target base stations through the control channel to reach the repeater device;
tracking trajectory of motion of each of the plurality of UEs to be within a coverage area of the one or more service beams of RF signals without constantly tracking locations of each of the plurality of UEs; and
dynamically adjust the coverage area of the plurality of service beams of RF signals based on the trajectory of motion of the plurality of UEs.

19. The repeater device according to claim 1, wherein the at least one of the plurality of target base stations is further configured to transmit beam switching time event in terms of one of System Frame Number (SFN), Hyper Frame Number (HFN), subframe, or other coordinated timers of NR/LTE along with the plurality of requested donor beam identifiers.

20. The repeater device according to claim 1, wherein
the repeater device further comprises a donor beam book, and
the donor beam book includes the plurality of pre-stored donor beam identifiers.

21. The repeater device according to claim 1, wherein the first operating mode is a combination of the beam widening mode and the switching multi-beam mode.

22. The repeater device according to claim 1, further comprising an antenna array including a set of antenna elements, wherein
the baseband processor is further configured to:
set an ultra-low-power mode based on network traffic information; and
partition the set of antenna elements into a plurality of spatially separated antenna sub-arrays based on the set ultra-low-power mode,
only one antenna sub-array of the plurality of spatially separated antenna sub-arrays is active in the set ultra-low-power mode, and
the plurality of spatially separated antenna sub-arrays other than the one antenna sub-array is in one of a sleep mode or an idle mode in the set ultra-low-power mode.

23. The repeater device according to claim 1, wherein
the control information further includes a TDD pattern in a symbol-by-symbol format, and
the baseband processor is further configured to decode the TDD pattern included in the control information, and
the alignment of the timing reference of the repeater device with that of the NR cell frame is further based on the decoded TDD pattern.

24. The repeater device according to claim 13, wherein the channel quality indicator and the plurality of channel estimates indicate a specific modulation scheme and a code rate.

* * * * *